US011303590B2

(12) United States Patent
Pham

(10) Patent No.: US 11,303,590 B2
(45) Date of Patent: Apr. 12, 2022

(54) SUGGESTED RESPONSES BASED ON MESSAGE STICKERS

(71) Applicant: Google LLC, Mountain View, CA (US)

(72) Inventor: Hung Pham, Mountain View, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 17/224,949

(22) Filed: Apr. 7, 2021

(65) Prior Publication Data

US 2021/0243143 A1 Aug. 5, 2021

Related U.S. Application Data

(63) Continuation of application No. 16/703,699, filed on Dec. 4, 2019, now Pat. No. 10,979,373, which is a (Continued)

(51) Int. Cl.
H04L 12/58 (2006.01)
H04L 51/046 (2022.01)
(Continued)

(52) U.S. Cl.
CPC ........ H04L 51/046 (2013.01); G06F 3/04842 (2013.01); G06F 40/274 (2020.01);
(Continued)

(58) Field of Classification Search
CPC ...... G06F 17/24; G06F 17/277; G06F 3/0482; G06F 17/2765; H04L 51/04; H04L 51/10; H04L 51/20; H04L 51/02
See application file for complete search history.

(56) References Cited

U.S. PATENT DOCUMENTS 5,963,649 A 10/1999 Sako
6,092,102 A 7/2000 Wagner
(Continued)

FOREIGN PATENT DOCUMENTS

CN 1475908 2/2004
CN 1988461 6/2007
(Continued)

OTHER PUBLICATIONS

Australian Patent Office, Notice of Acceptance for Australian Patent Application No. 2015214298, dated Apr. 20, 2018, 3 pages.
(Continued)

Primary Examiner — Shean Tokuta
(74) Attorney, Agent, or Firm — IP Spring

(57) ABSTRACT

Implementations relate to automatic suggested responses based on message stickers provided in a messaging application. In some implementations, a computer-implemented method to provide message suggestions in a messaging application includes detecting a first message sent by a first user device to a second user device over a communication network, programmatically analyzing the first message to determine a semantic concept associated with the first message, identifying one or more message stickers based at least in part on the semantic concept, and transmitting instructions to cause the one or more message stickers to be displayed in a user interface displayed on the second user device.

20 Claims, 9 Drawing Sheets

Related U.S. Application Data continuation of application No. 15/709,423, filed on Sep. 19, 2017, now Pat. No. 10,547,574.

(60) Provisional application No. 62/397,316, filed on Sep. 20, 2016.

(51) Int. Cl.
| | |
|---|---|
| *H04L 51/02* | (2022.01) |
| *G06F 40/56* | (2020.01) |
| *G06F 40/274* | (2020.01) |
| *G06F 3/04842* | (2022.01) |
| *H04L 51/08* | (2022.01) |
| *H04W 4/14* | (2009.01) |
| *G06F 40/30* | (2020.01) |

(52) U.S. Cl.
CPC .............. *G06F 40/56* (2020.01); *H04L 51/02* (2013.01); *H04L 51/08* (2013.01); *H04W 4/14* (2013.01); *G06F 40/30* (2020.01)

(56) References Cited

U.S. PATENT DOCUMENTS

| | | | |
|---|---|---|---|
| 6,883,140 B1 | 4/2005 | Acker et al. | |
| 7,603,413 B1 | 10/2009 | Herold et al. | |
| 7,904,187 B2 | 3/2011 | Hoffberg et al. | |
| 8,266,109 B1 | 9/2012 | Bilsborough | |
| 8,391,618 B1 | 3/2013 | Chuang et al. | |
| 8,423,577 B1 | 4/2013 | Lee et al. | |
| 8,515,958 B2 | 8/2013 | Knight | |
| 8,554,701 B1 | 10/2013 | Dillard et al. | |
| 8,589,407 B2 | 11/2013 | Bhatia | |
| 8,645,697 B1 | 2/2014 | Emigh et al. | |
| 8,650,210 B1 | 2/2014 | Cheng et al. | |
| 8,688,698 B1 | 4/2014 | Black et al. | |
| 8,700,480 B1 | 4/2014 | Fox et al. | |
| 8,825,474 B1 | 9/2014 | Zhai et al. | |
| 8,938,669 B1 | 1/2015 | Cohen | |
| 8,996,639 B1 | 3/2015 | Faaborg et al. | |
| 9,019,415 B2 | 4/2015 | Ma et al. | |
| 9,020,956 B1 | 4/2015 | Barr et al. | |
| 9,043,407 B1 | 5/2015 | Gaulke et al. | |
| 9,191,786 B2 | 11/2015 | Davis | |
| 9,213,941 B2 | 12/2015 | Petersen | |
| 9,230,241 B1 | 1/2016 | Singh et al. | |
| 9,262,517 B2 | 2/2016 | Feng et al. | |
| 9,330,110 B2 | 5/2016 | Lin et al. | |
| 9,467,435 B1 | 10/2016 | Tyler et al. | |
| 9,560,152 B1 | 1/2017 | Jamdar et al. | |
| 9,595,059 B2 | 3/2017 | Knudson et al. | |
| 9,600,724 B2 | 3/2017 | Ko et al. | |
| 9,633,048 B1* | 4/2017 | Dutta .................. | G06F 16/5838 |
| 9,674,120 B2 | 6/2017 | Davis | |
| 9,715,496 B1 | 7/2017 | Sapoznik et al. | |
| 9,727,584 B2* | 8/2017 | Alldrin .............. | G06K 9/00664 |
| 9,805,371 B1 | 10/2017 | Sapoznik et al. | |
| 9,807,037 B1 | 10/2017 | Sapoznik et al. | |
| 9,817,813 B2 | 11/2017 | Faizakof et al. | |
| 9,973,705 B2 | 5/2018 | Kinugawa et al. | |
| 10,129,193 B2* | 11/2018 | Abou Mahmoud .... | H04L 51/32 |
| 10,146,748 B1 | 12/2018 | Barndollar et al. | |
| 10,146,768 B2 | 12/2018 | Fuxman et al. | |
| 10,404,636 B2 | 9/2019 | Rodriguez et al. | |
| 10,412,030 B2 | 9/2019 | McGregor et al. | |
| 10,440,279 B2 | 10/2019 | Ko et al. | |
| 10,547,574 B2* | 1/2020 | Pham .................... | H04L 51/046 |
| 10,979,373 B2* | 4/2021 | Pham .................... | H04L 51/08 |
| 2002/0040297 A1 | 4/2002 | Tsiao et al. | |
| 2002/0103837 A1 | 8/2002 | Balchandran et al. | |
| 2003/0105589 A1 | 6/2003 | Liu et al. | |
| 2003/0182374 A1 | 9/2003 | Haidar | |
| 2005/0146621 A1 | 7/2005 | Tanaka et al. | |
| 2006/0004685 A1 | 1/2006 | Pyhalammi et al. | |
| 2006/0021023 A1 | 1/2006 | Stewart et al. | |
| 2006/0029106 A1 | 2/2006 | Ott et al. |
| 2006/0150119 A1 | 7/2006 | Chesnais et al. |
| 2006/0156209 A1 | 7/2006 | Matsuura et al. |
| 2006/0172749 A1 | 8/2006 | Sweeney |
| 2007/0030364 A1 | 2/2007 | Obrador et al. |
| 2007/0094217 A1 | 4/2007 | Ronnewinkel |
| 2007/0162942 A1 | 7/2007 | Hamynen et al. |
| 2007/0244980 A1 | 10/2007 | Baker et al. |
| 2008/0120371 A1 | 5/2008 | Gopal |
| 2008/0153526 A1 | 6/2008 | Othmer |
| 2008/0189367 A1 | 8/2008 | Okumura |
| 2009/0007019 A1 | 1/2009 | Kobayashi et al. |
| 2009/0076795 A1 | 3/2009 | Bangalore et al. |
| 2009/0119584 A1 | 5/2009 | Herbst |
| 2009/0282114 A1 | 11/2009 | Feng et al. |
| 2009/0313194 A1 | 12/2009 | Amar et al. |
| 2009/0327436 A1 | 12/2009 | Chen |
| 2010/0077029 A1 | 3/2010 | Shook et al. |
| 2010/0118115 A1 | 5/2010 | Takahashi et al. |
| 2010/0228590 A1 | 9/2010 | Muller et al. |
| 2010/0260426 A1 | 10/2010 | Huang et al. |
| 2011/0074685 A1 | 3/2011 | Causey et al. |
| 2011/0091092 A1 | 4/2011 | Nepomniachtchi et al. |
| 2011/0098056 A1 | 4/2011 | Rhoads |
| 2011/0107223 A1 | 5/2011 | Tilton et al. |
| 2011/0145068 A1 | 6/2011 | King et al. |
| 2011/0164163 A1 | 7/2011 | Bilbrey et al. |
| 2011/0202836 A1 | 8/2011 | Badger et al. |
| 2011/0212717 A1 | 9/2011 | Rhoads et al. |
| 2011/0221912 A1 | 9/2011 | Yoshizawa |
| 2011/0230174 A1 | 9/2011 | Mandanapu et al. |
| 2011/0252108 A1 | 10/2011 | Morris et al. |
| 2011/0252207 A1 | 10/2011 | Janosik, Jr. et al. |
| 2012/0030289 A1 | 2/2012 | Buford et al. |
| 2012/0033876 A1 | 2/2012 | Momeyer et al. |
| 2012/0041941 A1 | 2/2012 | King et al. |
| 2012/0041973 A1 | 2/2012 | Kim et al. |
| 2012/0042036 A1 | 2/2012 | Lan et al. |
| 2012/0089847 A1 | 4/2012 | Tu et al. |
| 2012/0096097 A1 | 4/2012 | Morinaga et al. |
| 2012/0131520 A1 | 5/2012 | Tang et al. |
| 2012/0179717 A1 | 7/2012 | Kennedy et al. |
| 2012/0224743 A1 | 9/2012 | Rodriguez et al. |
| 2012/0239761 A1 | 9/2012 | Linner et al. |
| 2012/0245944 A1 | 9/2012 | Gruber et al. |
| 2012/0278164 A1 | 11/2012 | Spivack et al. |
| 2012/0322428 A1 | 12/2012 | Lupoli et al. |
| 2013/0021266 A1 | 1/2013 | Selim |
| 2013/0022231 A1 | 1/2013 | Nepomniachtchi et al. |
| 2013/0036162 A1 | 2/2013 | Koenigs |
| 2013/0050507 A1 | 2/2013 | Syed et al. |
| 2013/0061148 A1 | 3/2013 | Das et al. |
| 2013/0073366 A1 | 3/2013 | Heath |
| 2013/0218877 A1 | 8/2013 | Satyanarayanan |
| 2013/0260727 A1 | 10/2013 | Knudson et al. |
| 2013/0262574 A1 | 10/2013 | Cohen |
| 2013/0346235 A1 | 12/2013 | Lam |
| 2014/0004889 A1 | 1/2014 | Davis |
| 2014/0012927 A1 | 1/2014 | Gertzfield et al. |
| 2014/0035846 A1 | 2/2014 | Lee et al. |
| 2014/0047413 A1 | 2/2014 | Sheive et al. |
| 2014/0067371 A1 | 3/2014 | Liensberger |
| 2014/0071324 A1 | 3/2014 | Tokunaga et al. |
| 2014/0088954 A1 | 3/2014 | Shirzadi et al. |
| 2014/0108562 A1 | 4/2014 | Panzer |
| 2014/0129942 A1 | 5/2014 | Rathod |
| 2014/0150068 A1 | 5/2014 | Janzer |
| 2014/0156801 A1 | 6/2014 | Fernandes et al. |
| 2014/0163954 A1 | 6/2014 | Joshi et al. |
| 2014/0164506 A1 | 6/2014 | Tesch et al. |
| 2014/0171133 A1 | 6/2014 | Stuttle et al. |
| 2014/0189027 A1 | 7/2014 | Zhang et al. |
| 2014/0189538 A1 | 7/2014 | Martens et al. |
| 2014/0195621 A1 | 7/2014 | Rao Dv |
| 2014/0201675 A1 | 7/2014 | Joo et al. |
| 2014/0228009 A1 | 8/2014 | Chen et al. |
| 2014/0232889 A1 | 8/2014 | King et al. |
| 2014/0237057 A1 | 8/2014 | Khodorenko |
| 2014/0317030 A1 | 10/2014 | Shen et al. |

(56) References Cited

U.S. PATENT DOCUMENTS

| | | |
|---|---|---|
| 2014/0337438 A1 | 11/2014 | Govande et al. |
| 2014/0341476 A1 | 11/2014 | Kulick et al. |
| 2014/0344058 A1 | 11/2014 | Brown |
| 2014/0372349 A1 | 12/2014 | Driscoll |
| 2014/0372540 A1 | 12/2014 | Libin |
| 2015/0006143 A1 | 1/2015 | Skiba et al. |
| 2015/0026101 A1 | 1/2015 | Lin et al. |
| 2015/0026642 A1 | 1/2015 | Wilson et al. |
| 2015/0032724 A1 | 1/2015 | Thirugnanasundaram et al. |
| 2015/0058720 A1 | 2/2015 | Smadja et al. |
| 2015/0088998 A1 | 3/2015 | Isensee et al. |
| 2015/0095855 A1 | 4/2015 | Bai et al. |
| 2015/0100537 A1* | 4/2015 | Grieves ............... G06F 3/0236 706/52 |
| 2015/0127453 A1 | 5/2015 | Tew et al. |
| 2015/0171133 A1 | 6/2015 | Kim et al. |
| 2015/0178371 A1 | 6/2015 | Seth et al. |
| 2015/0178388 A1 | 6/2015 | Winnemoeller et al. |
| 2015/0185995 A1 | 7/2015 | Showmaker et al. |
| 2015/0207765 A1 | 7/2015 | Brantingham et al. |
| 2015/0220806 A1 | 8/2015 | Heller et al. |
| 2015/0222617 A1 | 8/2015 | Ebersman et al. |
| 2015/0227797 A1 | 8/2015 | Ko et al. |
| 2015/0244653 A1 | 8/2015 | Niu et al. |
| 2015/0248411 A1 | 9/2015 | Krinker et al. |
| 2015/0250936 A1 | 9/2015 | Thomas et al. |
| 2015/0286371 A1 | 10/2015 | Degani |
| 2015/0288633 A1 | 10/2015 | Ogundokun et al. |
| 2015/0302301 A1 | 10/2015 | Petersen |
| 2015/0347617 A1 | 12/2015 | Weinig et al. |
| 2015/0347769 A1 | 12/2015 | Espinosa et al. |
| 2015/0350117 A1 | 12/2015 | Bastide et al. |
| 2015/0370830 A1 | 12/2015 | Murphy-Chutorian et al. |
| 2016/0011725 A1 | 1/2016 | D'Argenio et al. |
| 2016/0037311 A1* | 2/2016 | Cho ..................... H04W 4/12 455/466 |
| 2016/0042252 A1 | 2/2016 | Sawhney et al. |
| 2016/0043817 A1 | 2/2016 | Handoush et al. |
| 2016/0043974 A1 | 2/2016 | Purcell et al. |
| 2016/0055246 A1 | 2/2016 | Marcin et al. |
| 2016/0065519 A1 | 3/2016 | Waltermann et al. |
| 2016/0072737 A1 | 3/2016 | Forster |
| 2016/0092044 A1 | 3/2016 | Laska et al. |
| 2016/0140447 A1 | 5/2016 | Cohen et al. |
| 2016/0140477 A1 | 5/2016 | Karanam et al. |
| 2016/0162791 A1 | 6/2016 | Petersen |
| 2016/0179816 A1 | 6/2016 | Glover |
| 2016/0196040 A1 | 7/2016 | Kapadia et al. |
| 2016/0210279 A1 | 7/2016 | Kim et al. |
| 2016/0210962 A1 | 7/2016 | Kim et al. |
| 2016/0224524 A1 | 8/2016 | Kay et al. |
| 2016/0226804 A1 | 8/2016 | Hampson et al. |
| 2016/0234553 A1 | 8/2016 | Hampson et al. |
| 2016/0283454 A1 | 9/2016 | Don et al. |
| 2016/0284011 A1 | 9/2016 | Dong et al. |
| 2016/0292217 A1 | 10/2016 | Sinha et al. |
| 2016/0308794 A1 | 10/2016 | Kim et al. |
| 2016/0321052 A1 | 11/2016 | Sharifi et al. |
| 2016/0342895 A1 | 11/2016 | Gao et al. |
| 2016/0350304 A1 | 12/2016 | Aggarwal et al. |
| 2016/0352656 A1 | 12/2016 | Galley et al. |
| 2016/0378080 A1 | 12/2016 | Uppala et al. |
| 2017/0004383 A1* | 1/2017 | Lin ..................... G06K 9/6215 |
| 2017/0017648 A1 | 1/2017 | Pearlman et al. |
| 2017/0031575 A1 | 2/2017 | Dotan-Cohen et al. |
| 2017/0075878 A1 | 3/2017 | Jon et al. |
| 2017/0093769 A1 | 3/2017 | Lind et al. |
| 2017/0098122 A1 | 4/2017 | el Kaliouby et al. |
| 2017/0098152 A1* | 4/2017 | Kerr .................... G06F 3/04842 |
| 2017/0118152 A1 | 4/2017 | Lee |
| 2017/0134316 A1 | 5/2017 | Cohen et al. |
| 2017/0142046 A1* | 5/2017 | Abou Mahmoud .... H04L 51/12 |
| 2017/0147202 A1* | 5/2017 | Donohue ............ G06F 3/04886 |
| 2017/0149703 A1 | 5/2017 | Willett et al. |
| 2017/0153792 A1 | 6/2017 | Kapoor et al. |
| 2017/0171117 A1 | 6/2017 | Carr et al. |
| 2017/0180276 A1 | 6/2017 | Gershony et al. |
| 2017/0180294 A1 | 6/2017 | Milligan et al. |
| 2017/0185236 A1* | 6/2017 | Yang ................... G06K 9/00671 |
| 2017/0187654 A1 | 6/2017 | Lee |
| 2017/0250930 A1 | 8/2017 | Ben-Itzhak |
| 2017/0250935 A1 | 8/2017 | Rosenberg |
| 2017/0250936 A1 | 8/2017 | Rosenberg et al. |
| 2017/0288942 A1 | 10/2017 | Plumb et al. |
| 2017/0293834 A1 | 10/2017 | Raison et al. |
| 2017/0308589 A1* | 10/2017 | Liu ..................... G06F 16/9535 |
| 2017/0324868 A1 | 11/2017 | Tamblyn et al. |
| 2017/0339076 A1 | 11/2017 | Patil |
| 2017/0344224 A1 | 11/2017 | Kay et al. |
| 2017/0357432 A1 | 12/2017 | King et al. |
| 2017/0357442 A1 | 12/2017 | Peterson et al. |
| 2017/0359279 A1 | 12/2017 | Peterson et al. |
| 2017/0359281 A1 | 12/2017 | Yip et al. |
| 2017/0359282 A1 | 12/2017 | Alsina et al. |
| 2017/0359283 A1 | 12/2017 | Bernstein |
| 2017/0359285 A1 | 12/2017 | Weinig et al. |
| 2017/0359701 A1 | 12/2017 | Sarma et al. |
| 2017/0359702 A1 | 12/2017 | Peterson et al. |
| 2017/0359703 A1 | 12/2017 | Ciechanowski et al. |
| 2017/0366479 A1 | 12/2017 | Ladha et al. |
| 2018/0004397 A1 | 1/2018 | Mazzocchi |
| 2018/0005272 A1 | 1/2018 | Todasco et al. |
| 2018/0012231 A1 | 1/2018 | Sapoznik et al. |
| 2018/0013699 A1 | 1/2018 | Sapoznik et al. |
| 2018/0032499 A1 | 2/2018 | Hampson et al. |
| 2018/0032997 A1* | 2/2018 | Gordon ............... G06Q 30/0269 |
| 2018/0060705 A1* | 3/2018 | Abou Mahmoud ... G06K 9/344 |
| 2018/0083894 A1 | 3/2018 | Fung et al. |
| 2018/0083898 A1* | 3/2018 | Pham .................. H04L 51/02 |
| 2018/0083901 A1* | 3/2018 | McGregor, Jr ........ G06K 9/726 |
| 2018/0089230 A1* | 3/2018 | Qi ....................... G06F 3/04842 |
| 2018/0090135 A1 | 3/2018 | Schlesinger et al. |
| 2018/0109526 A1 | 4/2018 | Fung et al. |
| 2018/0137097 A1* | 5/2018 | Lim .................... G06F 40/279 |
| 2018/0196854 A1 | 7/2018 | Burks |
| 2018/0210874 A1* | 7/2018 | Fuxman ............... G06F 40/35 |
| 2018/0227498 A1 | 8/2018 | Ko et al. |
| 2018/0293601 A1 | 10/2018 | Glazier |
| 2018/0309706 A1* | 10/2018 | Kim .................... H04M 1/72439 |
| 2018/0316637 A1 | 11/2018 | Desjardins |
| 2018/0322403 A1 | 11/2018 | Ron et al. |
| 2018/0336226 A1 | 11/2018 | Anorga et al. |
| 2018/0336415 A1 | 11/2018 | Anorga et al. |
| 2018/0352393 A1 | 12/2018 | Lottermoser et al. |
| 2018/0367483 A1 | 12/2018 | Rodriguez et al. |
| 2018/0367484 A1 | 12/2018 | Rodriguez et al. |
| 2018/0373683 A1 | 12/2018 | Hullette et al. |
| 2019/0204868 A1* | 7/2019 | Choi .................... H04M 1/725 |
| 2020/0106726 A1* | 4/2020 | Pham ................... H04W 4/14 |
| 2021/0243143 A1* | 8/2021 | Pham ................... H04W 4/14 |

FOREIGN PATENT DOCUMENTS

| | | |
|---|---|---|
| CN | 101159576 | 4/2008 |
| CN | 101983396 | 3/2011 |
| CN | 102158431 | 8/2011 |
| CN | 102222079 | 10/2011 |
| CN | 102395966 | 3/2012 |
| CN | 102467574 | 5/2012 |
| CN | 102667754 | 9/2012 |
| CN | 103226949 | 7/2013 |
| CN | 103493035 | 1/2014 |
| CN | 103548025 | 1/2014 |
| CN | 103995872 | 8/2014 |
| CN | 104035947 | 9/2014 |
| CN | 104202718 | 12/2014 |
| CN | 104836720 | 8/2015 |
| CN | 104951428 | 9/2015 |
| CN | 105068661 | 11/2015 |
| CN | 105141503 | 12/2015 |
| CN | 105262675 | 1/2016 |
| CN | 105306281 | 2/2016 |
| CN | 105683874 | 6/2016 |
| CN | 105786455 | 7/2016 |

(56) References Cited

FOREIGN PATENT DOCUMENTS

| | | | | |
|---|---|---|---|---|
| CN | 105814519 | 7/2016 | | |
| CN | 105830104 | 8/2016 | | |
| CN | 105898627 | 8/2016 | | |
| CN | 105940397 | 9/2016 | | |
| EP | 1376392 | 1/2004 | | |
| EP | 1394713 | 3/2004 | | |
| EP | 2523436 | 11/2012 | | |
| EP | 2560104 | 2/2013 | | |
| EP | 2688014 | 1/2014 | | |
| EP | 2703980 | 3/2014 | | |
| EP | 3091445 | 11/2016 | | |
| JP | 2000-298676 | 10/2000 | | |
| JP | 2002-132804 | 5/2002 | | |
| JP | 2010-44495 | 2/2010 | | |
| JP | 2012-027950 | 2/2012 | | |
| JP | 2012-221480 | 11/2012 | | |
| JP | 2014-86088 | 5/2014 | | |
| JP | 2014-142919 | 8/2014 | | |
| JP | 2014-170397 | 9/2014 | | |
| JP | 2015-531136 | 10/2015 | | |
| KR | 20110003462 | 1/2011 | | |
| KR | 20130008036 | 1/2013 | | |
| KR | 10-2013-0050871 | 5/2013 | | |
| KR | 20130061387 | 6/2013 | | |
| KR | 20140093949 | A | * | 7/2014 | ......... G06F 9/44505 |
| KR | 1020150037935 | 4/2015 | | |
| KR | 10-2015-0108096 | 9/2015 | | |
| KR | 10-2017-0032883 | 3/2017 | | |
| WO | 2004/104758 | 12/2004 | | |
| WO | 2011/002989 | 1/2011 | | |
| WO | 2015/183493 | 12/2015 | | |
| WO | 2016/072117 | 5/2016 | | |
| WO | 2016/130788 | 8/2016 | | |
| WO | 2016130788 | 8/2016 | | |
| WO | 2016/204428 | 12/2016 | | |
| WO | WO-2016204428 | A1 | * | 12/2016 | ........... G06F 40/284 |
| WO | 2018089109 | 5/2018 | | |

OTHER PUBLICATIONS

Australian Patent Office, Examination Report No. 1 for Australian Patent Application No. 2015214298, dated Apr. 24, 2017, 3 pages.
Australian Patent Office, Examination Report No. 2 for Australian Patent Application No. 2015214298, dated Nov. 2, 2017, 3 pages.
WIPO, International Search Report and Written Opinion for International Patent Application No. PCT/US2015/014414, dated May 11, 2015, 8 pages.
Blippar, "Computer Vision API", www.web.blippar.com/computer-vision-ani, 4 pages.
Chen, et al., "A Survey of Document Image Classification: problem statement, classifier architecture and performance evaluation", International Journal of Document Analysis and Recognition (IJDAR), vol. 10, No. 1, Aug. 3, 2006, pp. 1-16.
Chen, et al., "Bezel Copy: An Efficient Cross-0Application Copy-Paste Technique for Touchscreen Smartphones.", Advanced Visual Interfaces, ACM, New York, New York, May 27, 2014, pp. 185-192.
CNIPA, First Office Action for Chinese Patent Application No. 201780056982.8, dated Nov. 19, 2020, 10 pages.
CNIPA, Second Office Action (with English translation) for Chinese Patent Application No. 201680082643.2, dated Apr. 2, 2021, 13 pages.
CNIPA, First Office Action (with English translation) for Chinese Patent Application No. 201680082643.2, dated Aug. 5, 2020, 24 pages.
CNIPA, Second Office Action for Chinese Patent Application No. 201680070359.3, dated Jan. 6, 2021, 6 pages.
CNIPA, First Office Action for Chinese Patent Application No. 201580016692.1, dated Nov. 2, 2018, 7 pages.
CNIPA, First Office Action for Chinese Patent Application No. 201680070359.3, dated Jun. 3, 2020, 9 pages.
EPO, Summons to Attend Oral Proceedings for European Patent Application No. 17794825.4, dated Feb. 12, 2021, 10 pages.
WIPO, International Search Report and Written Opinion for PCT Application No. PCT/US2017/046858, dated Oct. 11, 2017, 10 Pages.
WIPO, Written Opinion of the International Preliminary Examining Authority for International Patent Application No. PCT/US2018/021028, dated Jun. 14, 2019, 11 pages.
WIPO, International Search Report and Written Opinion for International Patent Application No. PCT/US2016/068083, dated Mar. 9, 2017, 13 pages.
WIPO, International Search Report for International Patent Application No. PCT/US2017/052713, dated Dec. 5, 2017, 4 Pages.
WIPO, International Search Report for International Patent Application No. PCT/US2016/068083, dated Mar. 9, 2017, 4 pages.
WIPO, International Search Report for International Patent Application No. PCT/US2018/022501, dated May 14, 2018, 4 pages.
EPO, Communication Pursuant to Article 94(3) EPC for European Patent Application No. 16825663.4, dated Apr. 16, 2019, 5 pages.
WIPO, International Search Report for International Patent Application No. PCT/US2017/052349, dated Dec. 13, 2017, 5 pages.
WIPO, International Search Report for International Patent Application No. PCT/US2017/057044, dated Jan. 18, 2018, 5 pages.
EPO, Communication Pursuant to Article 94(3) EPC for European Patent Application No. 16825663.4, dated May 7, 2020, 5 pages.
WIPO, Written Opinion for International Patent Application No. PCT/US2017/052713, dated Dec. 5, 2017, 6 Pages.
EPO, Communication Pursuant to Article 94(3) EPC for European Patent Application No. 16825666.7, dated Apr. 23, 2019, 6 pages.
WIPO, International Search Report for International Patent Application No. PCT/US2018/022503, dated Aug. 16, 2018, 6 pages.
WIPO, Written Opinion for International Patent Application No. PCT/US2017/052349, dated Dec. 13, 2017, 6 pages.
EPO, Communication Pursuant to Article 94(3) EPC for European Patent Application No. 17780938.1, dated Dec. 9, 2020, 6 pages.
EPO, Communication Pursuant to Article 94(3) EPC for European Patent Application No. 18716399.3, dated Jul. 3, 2020, 6 pages.
EPO, Communication Pursuant to Article 94(3) EPC for European Patent Application No. 16825666.7, dated Jun. 18, 2020, 6 pages.
WIPO, Written Opinion for International Patent Application No. PCT/US2018/022501, dated May 14, 2018, 6 pages.
WIPO, Written Opinion of the International Preliminary Examining Authority for International Patent Application No. PCT/US2017/052713, dated Oct. 15, 2018, 6 pages.
EPO, Extended European Search Report for European Patent Application No. 15746410.8, dated Sep. 5, 2017, 7 pages.
WIPO, Written Opinion for International Patent Application No. PCT/US2018/022503, dated Aug. 16, 2018, 8 pages.
EPO, Communication Pursuant to Article 94(3) EPC for European Patent Application No. 17794825.4, dated Aug. 4, 2020, 8 pages.
WIPO, Written Opinion of the International Preliminary Examination Authority for International Patent Application No. PCT/US2017/057044, dated Dec. 20, 2018, 8 pages.
WIPO, Written Opinion for International Patent Application No. PCT/US2017/057044, dated Jan. 18, 2018, 8 pages.
WIPO, Written Opinion of the International Preliminary Examining Authority for International Patent Application No. PCT/US2017/052349, dated Aug. 6, 2018, 9 pages.
EPO, Communication Pursuant to Article 94(3) EPC for European Patent Application No. 18716400.9, dated Mar. 11, 2021, 9 pages.
WIPO, Written Opinion for International Patent Application No. PCT/US2016/068083, dated Mar. 9, 2017, 9 pages.
Fuxman, Ariel, ""Aw, so cute!": Allo helps you respond to shared photos", Google Research Blog, https://research.googleblog.com/2016/05/aw-so-cute-allo-helps-you-respond-to.html, May 18, 2016, 6 pages.
WIPO, International Preliminary Report on Patentability for International Patent Application No. PCT/US2018/021028, dated Nov. 28, 2019, 10 pages.
WIPO, International Preliminary Report on Patentability for International Patent Application No. PCT/US2018/022501, dated Dec. 17, 2019, 7 pages.

(56) References Cited

OTHER PUBLICATIONS

WIPO, International Preliminary Report on Patentability for International Patent Application No. PCT/US2017/046858, dated Feb. 19, 2019, 7 pages.
WIPO, International Preliminary Report on Patentability for International Patent Application No. PCT/US2017/052349, dated Mar. 26, 2019, 7 pages.
WIPO, International Preliminary Report on Patentability for International Patent Application No. PCT/US2018/022503, dated Dec. 17, 2019, 9 pages.
WIPO, International Preliminary Report on Patentability for International Patent Application No. PCT/US2017/057044, dated Jul. 30, 2019, 9 pages.
WIPO, International Preliminary Report on Patentability for International Patent Application No. PCT/US2016/068083, dated Jul. 5, 2018, 9 pages.
IPO, First Examination Report for Indian Patent Application No. 201947015830, dated Mar. 17, 2021, 6 pages.
IPO, First Examination Report for Indian Patent Application No. 201847024288, dated Jan. 22, 2021, 7 pages.
IPO, First Examination Report for Indian Patent Application No. 201847014172, dated Jun. 17, 2020, 7 pages.
IPO, First Examination Report for Indian Patent Application No. 201947014236, dated Mar. 29, 2021, 7 pages.
JPO, Office Action for Japanese Patent Application No. 2018-532399, dated Jun. 16, 2020, 3 pages.
JPO, Office Action for Japanese Patent Application No. 2018-551908, dated Aug. 20, 2019, 4 pages.
JPO, Office Action for Japanese Patent Application No. 2018-532399, dated Mar. 10, 2020, 4 pages.
JPO, Office Action for Japanese Patent Application No. 2019-518995, dated Jan. 19, 2021, 5 pages.
JPO, Office Action for Japanese Patent Application No. 2019-518995, dated Jul. 28, 2020, 5 pages.
JPO, Office Action for Japanese Patent Application No. 2019-547462, dated Feb. 18, 2020, 6 pages.
JPO, Office Action for Japanese Patent Application No. 2018-532399, dated Jul. 23, 2019, 6 pages.
Kannan, et al., "Smart Reply: Automated Response Suggestions for Email", Proceedings of the 22nd ACM SIGKDD International Conference on Knowledge Discovery and Data Mining, KDD '16, ACM Press, New York, New York, Aug. 13, 2016, pp. 955-965.
Kannan, Anjuli et al., "Smart reply: Automated response suggestion for email", Proceedings of the 22nd ACM SIGKDD International Conference on Knowledge Discovery and Data Mining, Aug. 13, 2016, 10 pages.
Khandelwal, "Hey Allo! Meet Google's AI-powered Smart Messaging App", The Hacker News, http://web.archive.org/web/20160522155700/https://thehackernews.com/2016/05/google-allo-messenger.html, May 19, 2016, 3 pages.
KIPO, Notice of Preliminary Rejection for Korean Patent Application No. 10-2019-7011687, dated May 7, 2019, 3 pages.
KIPO, Notice of Final Rejection for Korean Patent Application No. 10-2018-7019756, dated Nov. 25, 2019, 3 pages.
KIPO, Notice of Final Rejection for Korean Patent Application No. 10-2018-7019756, dated Jan. 17, 2020, 4 pages.
KIPO, Notice of Final Rejection for Korean Patent Application No. 10-2018-7013953, dated Jun. 13, 2019, 4 pages.
KIPO, Notice of Final Rejection for Korean Patent Application No. 10-2019-7020465, dated Jun. 29, 2020, 4 pages.
KIPO, Notice of Final Rejection for Korean Patent Application No. 10-2018-7013953, dated May 8, 2019, 4 pages.
KIPO, Preliminary Rejection for Korean Patent Application No. 10-2018-7013953, dated Oct. 29, 2018, 5 pages.
KIPO, Notice of Preliminary Rejection (with English translation) for Korean Patent Application No. 10-2019-7020465, dated Jan. 10, 2020, 9 pages.
KIPO, Notice of Preliminary Rejection for Korean Patent Application No. 10-2018-7019756, dated May 13, 2019, 9 pages.
KIPO, Notice of Preliminary Rejection for Korean Patent Application No. 10-2019-7024479, dated Sep. 18, 2019, 9 pages.
Lardinois, F, "Allo brings Google's smarts to messaging", https://techcrunch.com/2016/09/20/allo-brings-googles-smarts-to-messaging/, Sep. 2016, 14 pages.
Lee, Jang Ho et al., "Supporting multi-user, multi-applet workspaces in CBE", Proceedings of the 1996 ACM conference on Computer supported cooperative work, ACM, Nov. 16, 1996, 10 pages.
Mathur, Vishal, "How Google Allo stands out from WhatsApp, WeChat, Facebook Messenger", Retrieved from Internet https://www.livemint.com/Leisure/6BcwmziLgEueyaL8VIgvHP/GoogleAllo-Machine-learning-smart-features-could-stumble-o.html, Sep. 21, 2016, 8 pages.
Microsoft Corporation, "Windows Messenger for Windows XP", Retrieved from Internet: http://web.archive.org/web/20030606220012/messenger.msn.com/support/features.asp?client=0 on Sep. 22, 2005, Jun. 6, 2003, 3 pages.
WIPO, "International Search Report and Written Opinion for International Application No. PCT/US2018/021028", dated Jun. 15, 2018, 11 Pages.
Pieterse, et al., "Android botnets on the rise: trends and characteristics", 2012 Information Security for South Africa, Aug. 15-17, 2012, 5 pages.
Pinterest, "Pinterest Lens", www.help.pinterest.com/en/articles/pinterest-lens, 2 pages.
Russell, "Google Allo is the Hangouts Killer We've Been Waiting For", Retrieved from the Internet: http://web.archive.org/web/20160519115534/https://www.technobuffalo.com/2016/05/18/google-allo-hangouts-replacement/, May 18, 2016, 3 pages.
USPTO, Non-final Office Action for U.S. Appl. No. 15/386,162, dated Nov. 27, 2018, 11 Pages.
USPTO, Final Office Action for U.S. Appl. No. 15/386,760, dated Jan. 10, 2020, 12 pages.
USPTO, Non-final Office Action for U.S. Appl. No. 15/386,162, dated Nov. 27, 2018, 12 pages.
USPTO, Non-final Office Action for U.S. Appl. No. 15/386,760, dated Oct. 11, 2019, 12 pages.
USPTO, Final Office Action for U.S. Appl. No. 15/386,162, dated Jun. 5, 2019, 13 pages.
USPTO, Final Office Action for U.S. Appl. No. 15/386,760, dated May 30, 2019, 13 pages.
USPTO, Final Office Action for U.S. Appl. No. 15/238,304, dated Nov. 23, 2018, 14 pages.
USPTO, Non-final Office Action for U.S. Appl. No. 15/709,418, dated Nov. 21, 2017, 15 pages.
USPTO, Non-final Office Action for U.S. Appl. No. 16/881,816, dated Nov. 27, 2020, 15 pages.
USPTO, First Action Interview, Office Action Summary for U.S. Appl. No. 16/003,661, dated Dec. 14, 2018, 16 pages.
USPTO, Non-final Office Action for U.S. Appl. No. 16/560,815, dated May 18, 2020, 16 pages.
USPTO, Non-final Office Action for U.S. Appl. No. 15/238,304, dated Jun. 7, 2018, 17 pages.
USPTO, First Action Interview, Office Action Summary for U.S. Appl. No. 15/912,809, dated Feb. 18, 2020, 18 pages.
USPTO, Notice of Allowance for U.S. Appl. No. 15/709,423, dated Oct. 9, 2019, 19 pages.
USPTO, Non-final Office Action for U.S. Appl. No. 15/709,423, dated May 2, 2019, 21 Pages.
USPTO, Non-final Office Action for U.S. Appl. No. 16/569,273, dated Oct. 18, 2019, 21 pages.
USPTO, Non-final Office Action for U.S. Appl. No. 14/618,962, dated Feb. 26, 2016, 25 pages.
USPTO, Non-final Office Action for U.S. Appl. No. 15/428,821, dated May 18, 2017, 30 pages.
USPTO, First Action Interview, Pre-Interview Communication for U.S. Appl. No. 15/709,440, dated May 16, 2019, 4 pages.
USPTO, First Action Interview, Pre-Interview Communication for U.S. Appl. No. 15/624,637, dated Oct. 19, 2018, 4 pages.
USPTO, First Action Interview, Office Action Summary for U.S. Appl. No. 15/350,040, dated Oct. 30, 2018, 4 pages.
USPTO, Non-final Office Action for U.S. Appl. No. 15/946,342, dated Jul. 26, 2018, 40 pages.

(56) References Cited

OTHER PUBLICATIONS

USPTO, First Action Interview, Pre-Interview Communication for U.S. Appl. No. 15/415,506, dated Apr. 5, 2018, 5 pages.
USPTO, First Action Interview, Pre-Interview Communication for U.S. Appl. No. 16/436,632, dated Aug. 14, 2020, 5 pages.
USPTO, First Action Interview, Office Action Summary for U.S. Appl. No. 15/624,637, dated Jan. 25, 2019, 5 pages.
USPTO, First Action Interview, Pre-Interview Communication for U.S. Appl. No. 15/912,796, dated Jan. 8, 2020, 5 pages.
USPTO, First Action Interview, Pre-Interview Communication for U.S. Appl. No. 15/350,040, dated Jul. 16, 2018, 5 pages.
USPTO, First Action Interview, Office Action Summary for U.S. Appl. No. 15/912,796, dated Mar. 13, 2020, 5 pages.
USPTO, First Action Interview, Pre-Interview Communication for U.S. Appl. No. 15/912,809, dated Nov. 22, 2019, 5 pages.
USPTO, First Action Interview, Pre-Interview Communication for U.S. Appl. No. 15/386,760, dated Nov. 6, 2018, 5 pages.
USPTO, First Action Interview, Office Action Summary for U.S. Appl. No. 16/436,632, dated Nov. 6, 2020, 5 pages.
USPTO, First Action Interview, Pre-Interview Communication for U.S. Appl. No. 16/003,661, dated Aug. 29, 2018, 6 pages.
USPTO, First Action Interview, Office Action Summary for U.S. Appl. No. 15/386,760, dated Jan. 30, 2019, 8 pages.
USPTO, Final Office Action for U.S. Appl. No. 15/912,809, dated Jun. 24, 2020, 8 pages.
USPTO, Notice of Allowance for U.S. Appl. No. 16/703,699, dated Dec. 11, 2020, 9 pages.
USPTO, Non-final Office Action for U.S. Appl. No. 29/503,386, dated Feb. 1, 2016, 9 pages.
Vinyals, O. et al., "Show and Tell: A Neural Image Caption Generator", arXiv:1411.4555v2 [cs.CV], Apr. 20, 2015, pp. 1-9.
WIPO, International Preliminary Report on Patentability for International Patent Application No. PCT/US2017/52333, dated Dec. 4, 2018, 15 pages.
WIPO, Written Opinion of the International Preliminary Examining Authority for International Patent Application No. PCT/US2017/52333, dated Aug. 17, 2018, 5 pages.
WIPO, "International Search Report and Written Opinion PCT application No. PCT/US2017/052333", dated Nov. 30, 2017, 15 pages.
Yeh, et al., "Searching the web with mobile images for location recognition", Proceedings of the 2004 IEEE Computer Society Conference on Pattern Recognition, vol. 2, Jun.-Jul. 2004, pp. 1-6.
Zhao, et al., "Cloud-based push-styled mobile botnets: a case study of exploiting the cloud to device messaging service", Proceedings ACSAC '12, Proceedings of the 28th Annual Computer Security Applications Conference, ACM Digital Library, Dec. 3, 2012, pp. 119-128.
IPO, First Examination Report for Indian Patent Application No. 201947035964, dated Jul. 15, 2021, 7 pages.
CNIPA, First Office Action (with English translation) for Chinese Patent Application No. 201880019712.4, dated Jun. 22, 2021, 10 pages.
USPTO, First Action Interview, Pre-Interview Communication for U.S. Appl. No. 16/999,702, dated Jul. 26, 2021, 6 pages.
EPO, Communication Pursuant to Article 94(3) EPC for European Patent No. 17780938.1, dated May 18, 2021, 7 pages.
EPO, Communication Under Rule 71(3) EPC for European Patent Application No. 16825666.7, dated Oct. 18, 2021, 7 pages.
JPO, Decision of Rejection for Japanese Patent Application No. 2019-518995, dated Sep. 1, 2021, 5 pages.
USPTO, Non-final Office Action for U.S. Appl. No. 16/692,821, dated Aug. 18, 2021, 16 pages.
USPTO, First Action Interview, Pre-Interview Communication for U.S. Appl. No. 17/129,010, dated Oct. 20, 2021, 4 pages.
USPTO, First Action Interview, Office Action Summary for U.S. Appl. No. 16/999,702, dated Sep. 28, 2021, 5 pages.
CNIPA, First Office Action (with English translation) for Chinese Patent Application No. 201780069884.8, dated Dec. 17, 2021, 49 pages.
USPTO, Final Office Action for U.S. Appl. No. 16/692,821, dated Dec. 22, 2021, 17 pages.
EPO, Summons to Attend Oral Proceedings for European Patent Application No. 18716399.3, dated Jan. 13, 2022, 10 pages.
EPO, Summons to Attend Oral Proceedings for European Patent Application No. 17780938.1, dated Nov. 29, 2021, 11 pages.
USPTO, Final Office Action for U.S. Appl. No. 16/999,702, dated Feb. 1, 2022, 17 pages.

\* cited by examiner

SUGGESTED RESPONSES BASED ON MESSAGE STICKERS

CROSS REFERENCE TO RELATED APPLICATIONS

This application is a continuation of U.S. patent application Ser. No. 16/703,699, filed Dec. 4, 2019 and titled SUGGESTED RESPONSES BASED ON MESSAGE STICKERS, which is a continuation of U.S. patent application Ser. No. 15/709,423, filed Sep. 19, 2017 and titled SUGGESTED RESPONSES BASED ON MESSAGE STICKERS (now U.S. Pat. No. 10,547,574), which claims priority to U.S. Provisional Patent Application No. 62/397,316, filed Sep. 20, 2016 and titled SUGGESTED RESPONSES BASED ON MESSAGE STICKERS, the contents of all of which are incorporated herein by reference in their entirety.

BACKGROUND

The popularity and convenience of digital devices as well as the widespread of use of Internet communications have caused communications between user devices to become ubiquitous. Users can use their user devices to send various forms of media to each other to be displayed or otherwise output on the devices, including text, emoji, images, videos, and animations. For example, a user can input text and select images or other media forms to send to another user's device over a communication network.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of this application relate to automatic suggested responses based on message stickers provided in a messaging application. In some implementations, a computer-implemented method to provide message suggestions in a messaging application includes detecting a first message sent by a first user device to a second user device over a communication network, programmatically analyzing the first message to determine a semantic concept associated with the first message, identifying one or more message stickers based at least in part on the semantic concept, and transmitting instructions to cause the one or more message stickers to be displayed in a user interface displayed on the second user device.

Various implementations and examples of the method are described. For example, in some implementations, the first message is part of a communication between a first user of the first user device and a second user of the second user device in the messaging application, and the method further includes programmatically analyzing the communication to determine one or more additional semantic concepts associated with the communication, where identifying the one or more message stickers is further based on the one or more additional semantic concepts. In some implementations, identifying the one or more message stickers includes determining one or more suggested responses based on the semantic concept, comparing one or more descriptors associated with a plurality of message stickers with the one or more suggested responses, and selecting the one or more message stickers from the plurality of message stickers based on the comparing.

In some examples, selecting the one or more message stickers from the plurality of message stickers based on the comparing includes checking for correspondence between the one or more descriptors and the one or more suggested responses, where the correspondence includes letter matches between words of the one or more descriptors and the one or more suggested responses, and/or semantic similarities between the one or more descriptors and the one or more suggested responses; and determining that the one or more message stickers have the correspondence between the one or more descriptors and the one or more suggested responses. In further examples, the one or more message stickers include multiple message stickers, and further comprising determining a respective rank of the multiple message stickers based on one or more correspondences between a description of each of the multiple message stickers and the one or more suggested responses, where transmitting instructions to cause the multiple message stickers to be displayed includes transmitting instructions indicating the rank of the plurality of message stickers.

In some implementations, selecting the one or more message stickers from the plurality of message stickers based on the comparing includes determining similarity scores between the one or more descriptors and the one or more suggested responses, and selecting the one or more message stickers based on the similarity scores of the one or more message stickers. In some implementations, at least one message sticker of the one or more message stickers includes image data to be displayed and a sticker identification (ID) effective to identify the at least one message sticker.

The method further includes, in some implementations, receiving a selection via user input of a particular message sticker of the one or more message stickers, and in response to receiving the selection, providing the particular message sticker to the first user device in the messaging application, where providing the particular message sticker includes one or more of: sending a sticker ID of the message sticker to the first user device over the communication network, and sending image data of the message sticker to the first user device over the communication network. In some implementations, identifying the one or more message stickers includes determining that the first message is part of a conversation between the first user device and the second user device in the messaging application, and the method further includes identifying the one or more message stickers based at least in part on one or more semantic concepts in one or more messages received previously in the conversation.

In some implementations, a computer-implemented method to provide message suggestions in a messaging application, the method including detecting a first message sent by a first user device to a second user device over a communication network, where the first message includes a message sticker. The method includes programmatically analyzing the message sticker to determine a semantic concept associated with the first message, determining one or more suggested responses based at least in part on the semantic concept, and transmitting instructions to cause the one or more suggested responses to be displayed by the second user device.

Various implementations and examples of the method are described. For example, in some implementations, the suggested responses include at least one suggested message sticker response that includes a message sticker. In some implementations, determining the one or more suggested responses further includes comparing one or more descriptors associated with a plurality of message stickers with the one or more suggested responses, and selecting the at least one suggested message sticker response from the plurality of message stickers based on the comparing. In some examples, the method further comprises determining that the message sticker is stored on the second user device.

In some implementations, the method further includes receiving a selection of at least one suggested response of the one or more suggested responses based on received user input to the second user device, and in response to receiving the selection, transmitting the at least one suggested response to the first user device over the communication network. In some examples, the message sticker is associated with image data and a sticker identification (ID).

In some implementations, a system to provide message suggestions in a messaging application includes a memory and at least one processor configured to access the memory and configured to perform operations. The operations include receiving, at a second user device, a first message sent by a first user device over a communication network, and obtaining a suggested response associated with the first message, where the suggested response is based on a semantic concept determined by programmatically analyzing the first message. The operations include identifying one or more message stickers based at least in part on the suggested response, where the one or more message stickers are stored on the second user device, and causing the one or more message stickers to be displayed in a user interface displayed on the second user device.

Various implementations and examples of the system are described. For example, in some implementations, the operation to obtain the suggested response includes receiving the suggested response from a server device, where the server device programmatically analyzes the first message to determine the semantic concept and determines the suggested response based on a mapping of the semantic concept to a library of stored suggested responses. In some implementations, operations further include obtaining a plurality of semantic concepts associated with a plurality of message stickers stored on the second user device, and comparing the plurality of semantic concepts with the suggested response, where identifying the one or more message stickers based at least in part on the suggested response includes selecting the one or more message stickers from the plurality of semantic concepts based on the comparing.

In some implementations of the system, further operations include receiving a selection of at least one suggested response of the one or more suggested responses based on received user input to the second user device, and in response to receiving the selection, transmitting the at least one suggested response to the first user device over the communication network. In some examples, at least one message sticker of the one or more message stickers includes image data to be displayed and a sticker identification (ID) to identify the at least one message sticker.

DETAILED DESCRIPTION

Figure 1:
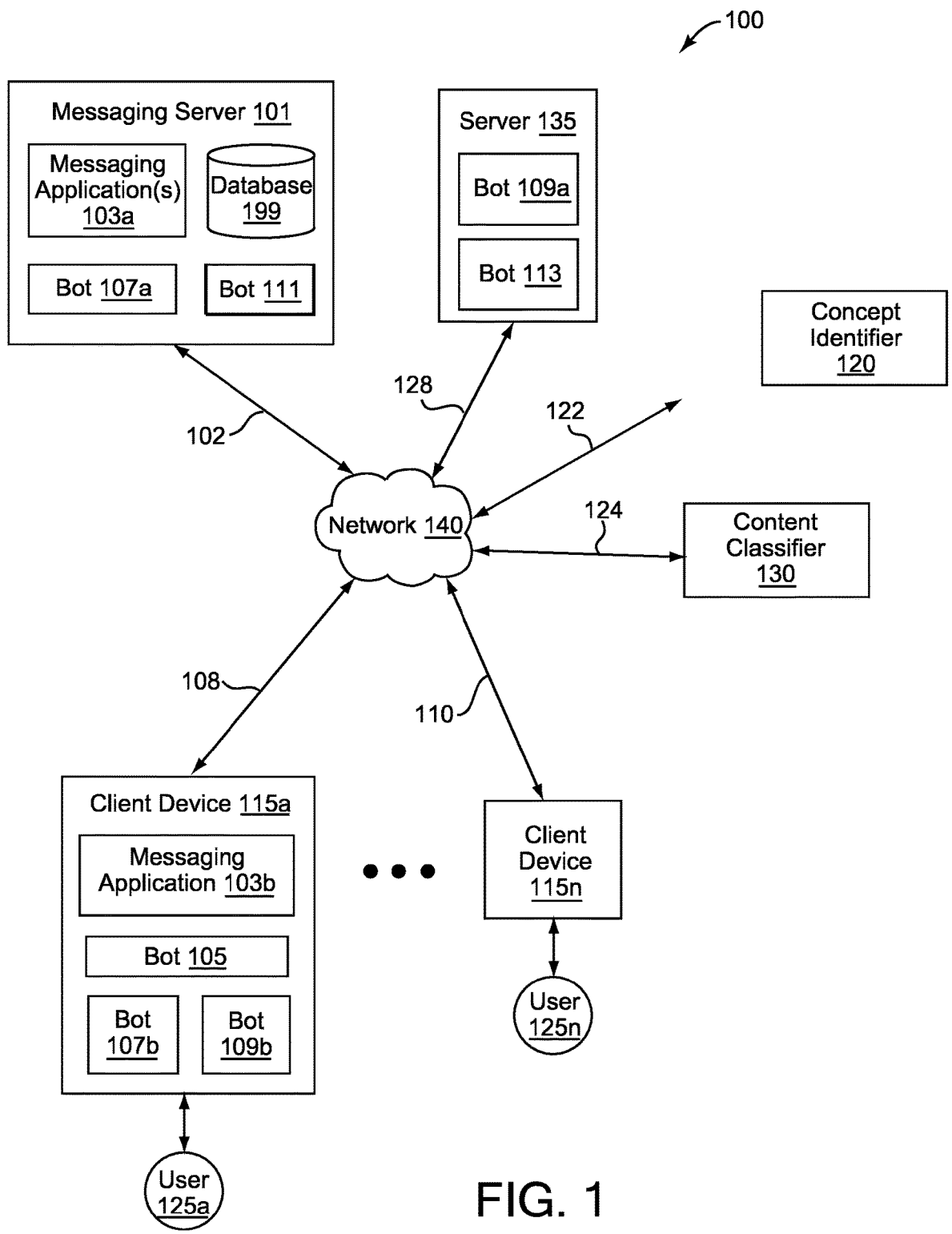
FIG. 1 is a block diagram of example systems and a network environment which may be used for one or more implementations described herein.

One or more implementations described herein relate to automatic suggested responses based on message stickers provided in messaging applications. In some implementations, a device detects a message sent over a communication network from a first device of a first user to a second device of a second user. The message is programmatically analyzed by the device to determine a semantic concept associated with the message. One or more message stickers are identified based at least in part on the semantic concept, and the one or more message stickers are displayed in a user interface on the second device as suggested responses selectable by the second user. In response to a suggested message sticker being selected, e.g., by user input, the selected message sticker is transmitted as a response to the message in the conversation, e.g., to the first device and any other devices that are in the conversation in which the message is sent. For example, the sent message sticker is displayed as a response message in the messaging application executed on the first device.

In various implementations, suggested responses are determined for the received message based on the semantic concept determined to be present in the message. Descriptors such as description and keywords associated with multiple message stickers are obtained, the descriptors are compared with the suggested responses, and the suggested message stickers are selected from the multiple message stickers based on the comparison. In various implementations, message stickers are associated with image data that is to be displayed, and associated with sticker identification (ID) to identify the message sticker, and/or a sticker set ID to identify a set or group of stickers in which the message sticker is included.

In some implementations, a server device can store message stickers, can determine message responses to a received message, can determine the message stickers that correspond to the suggested responses for the received message, and can send the message stickers to the second device to display as suggested responses. In some implementations, the suggested responses for the received message is determined by a server device and sent to the second device, and the second device can determine locally-stored message stickers that correspond to the suggested responses for the received message and display such message stickers as suggested responses.

In further implementations, received message(s) include one or more message stickers. Semantic concepts can be identified for the message stickers, e.g., by obtaining descriptors (e.g., description and/or keywords) associated with the standardized message stickers. One or more suggested responses are determined based on the semantic concepts of the received message stickers, where the suggested responses can be text, images, and/or can include message stickers. The suggested responses can be displayed by the second user device for selection by the second user, and a selected suggested response is sent to the first user device and/or other user devices in the conversation.

In some implementations, described computer-implemented methods, systems, and/or computer-readable media enable receiving a message at a device, e.g., over a communication network from a second device operated by a user, and automatically generating suggested responses from which the user can select to send in response to the received message. The received message can include one or more message stickers, and/or the generated suggested responses can include one or more message stickers available to be sent by the second device.

In some implementations, at various times during a conversation between user devices, users may not be able to provide sufficient attention or focus to respond to received messages with pertinent responses, and/or may not be able to provide detailed user input to a device to create such pertinent responses. In some examples, a user may be performing an activity or be in an environment where appropriate responses are not possible or more difficult for the user to provide. For example, a user may not have the opportunity to browse through a list of available stickers and select stickers to send to other users in the conversation.

One or more features described herein advantageously provide automatic message suggestions for a user in response to a message, including message sticker suggestions and message suggestions for a received message sticker. For example, one or more suggested message responses are automatically suggested based on a received message in a messaging conversation between user devices, and the user may simply select a response from the suggestions for posting in the conversation. Such suggestions allow a user to simply and quickly respond to received messages with reduced user input and reduced time to compose responses on a device, thus reducing consumption of device resources that would otherwise be needed to enable and process added input from the user to compose responses and/or otherwise participate in conversations held via electronic devices.

One or more features described herein advantageously provide automatic message suggestions based on message stickers in response to obtaining a message on a device. One or more features described herein allow message stickers to be easily and quickly used by users in conversations and other device communications, regardless of language used in messages, device preference, etc. Sending message stickers in electronic messages allows users to express themselves to other users in chats and other communications provided via user devices. For example, if the user receives a message sticker received in a messaging conversation between user devices, one or more automatic message responses are suggested based on the message sticker (e.g., text responses, message sticker responses, or other types of content responses), and the user may simply select a desired response from the suggestions. In another example, if the user receives a message in a device conversation (e.g., text message or other type of content message), one or more automatic message sticker responses are suggested based on the message, and the user may simply select a desired message sticker response from the suggestions to send to other user devices.

Furthermore, the described message response suggestions are relevant to the received message. For example, use of predefined associations of semantic concepts and suggested responses, mapping models, machine learning models, etc. enables relevant message suggestions to be determined for concepts detected in message. The use of descriptions and keywords associated with standardized message stickers allows relevant message stickers to be determined and presented as suggested responses to a message, and allows relevant response suggestions to be determined for received message stickers in a message. Such relevant suggestions allow a user to simply and quickly respond to received messages with reduced user input and reduced time to compose the responses on a device, thus reducing consumption of device resources that would otherwise be needed to enable and process added input from the user to compose responses instead of selecting less relevant suggestions, or resources that would otherwise be needed to display a large set of possible responses (e.g., including less relevant suggestions). Furthermore, such features enable reduction of consumption of device resources that would otherwise be needed to enable and process added input from the user to compose responses, search, edit, or complete suggested responses, and/or otherwise participate in conversations held via electronic devices.

Consequently, a technical effect of one or more described implementations is that creation and transmission of responses in device-implemented conversations is achieved with less computational time and resources expended to obtain results. For example, a technical effect of described features is a reduction in the consumption of system processing resources utilized to create and send message responses than in a system that does not provide one or more of the described features, as indicated above.

In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

"Stickers" or "message stickers" offer users of messaging applications an intuitive visual mechanism to interact with other users. Stickers include visual content displayed by a device, e.g., image pixel content, animations, video, and may include other types of content, e.g., text, audio data, etc. For example, stickers may be based on one or more characters and can use the characters to express a variety of emotions. Stickers may also be based on themes, such as a movie theme (e.g., "Sky and Stars" movie stickers), a cartoon character, a genre (e.g., food, drink, dance, etc.), a message ("call me"), and so on. In some implementations, stickers may be larger than emoji. In some implementations, stickers may include motion and/or audio, in addition to or alternatively to static images. In some implementations, stickers when received in a messaging application may be displayed in a larger size (e.g., full-screen, or a large portion of a user interface of the messaging application) and may collapse to a smaller size, e.g., after a particular amount of time has elapsed since reception of the sticker. In some implementations, a sticker may be displayed as an overlay, e.g., on top of a conversation in a messaging application. Stickers may enable users to reduce the time spent in entering text and may make communications via a messaging application easier and/or faster.

In some implementations, a message sticker include image data (e.g., pixel data) indicating the visual display appearance of the message sticker. A message sticker can also be associated with sticker information, e.g., metadata. For example, a message sticker can be included in a group of related message stickers, e.g., a "sticker set." A message sticker can be associated with metadata such as a sticker identification (ID) that identifies the sticker, and a sticker set ID that identifies the sticker set to which the sticker belongs. A message sticker can be associated with metadata including one or more thumbnail versions of the sticker, e.g., lower resolution or smaller versions of the image data. A message sticker can be associated with a metadata including descriptors, such as a description (e.g., a text description) related to the sticker and/or one or more keywords related to the sticker, as described in examples below. In some implementations, message stickers and sticker sets are defined, created, and/or provided by one or more providers that can maintain the stickers in a standardized format, e.g., maintain the sticker image data and metadata. In some implementations, users of user devices are not able to modify message sticker data directly, and can obtain modified message sticker data from a provider.

An image as referred to herein is a digital image having pixels with one or more pixel values (e.g., color values, brightness values, etc.). An image can be a still image or single image, or can be an image included in a series of images, e.g., a frame in a video sequence of video frames, or an image in a different type of sequence or animation of images. For example, implementations described herein can be used with single images, video sequences of images, or animated images (e.g., cinemagraphs, animated Graphics Interchange Format images (GIFs), or other animations).

FIG. 1 illustrates a block diagram of an example environment 100 for providing messaging services that enable and, in some embodiments, provide automatic assistive agents, e.g., bots. The exemplary environment 100 includes messaging server 101, one or more client devices 115a, 115n, server 135, and network 140. Users 125a-125n may be associated with respective client devices 115a, 115n. Server 135 may be a third-party server, e.g., controlled by a party different from the party that provides messaging services. In various implementations, server 135 may implement bot services, as described in further detail below. In some implementations, environment 100 may not include one or more servers or devices shown in FIG. 1 or may include other servers or devices not shown in FIG. 1. In FIG. 1 and the remaining figures, a letter after a reference number, e.g., "115a," represents a reference to the element having that particular reference number. A reference number in the text without a following letter, e.g., "115," represents a general reference to implementations of the element bearing that reference number.

In the illustrated implementation, messaging server 101, client devices 115, and server 135 are communicatively coupled via a network 140. In various implementations, network 140 may be a conventional type, wired or wireless, and may have numerous different configurations including a star configuration, token ring configuration or other configurations. Furthermore, network 140 may include a local area network (LAN), a wide area network (WAN) (e.g., the Internet), and/or other interconnected data paths across which multiple devices may communicate. In some implementations, network 140 may be a peer-to-peer network. Network 140 may also be coupled to or include portions of a telecommunications network for sending data in a variety of different communication protocols. In some implementations, network 140 includes Bluetooth® communication networks, Wi-Fi®, or a cellular communications network for sending and receiving data including via short messaging service (SMS), multimedia messaging service (MMS), hypertext transfer protocol (HTTP), direct data connection, email, etc. Although FIG. 1 illustrates one network 140 coupled to client devices 115, messaging server 101, and server 135, in practice one or more networks 140 may be coupled to these entities.

Messaging server 101 may include a processor, a memory, and network communication capabilities. In some implementations, messaging server 101 is a hardware server. In some implementations, messaging server 101 may be implanted in a virtualized environment, e.g., messaging server 101 may be a virtual machine that is executed on a hardware server that may include one or more other virtual machines. Messaging server 101 is communicatively coupled to the network 140 via signal line 102. Signal line 102 may be a wired connection, such as Ethernet, coaxial cable, fiber-optic cable, etc., or a wireless connection, such as Wi-Fi, Bluetooth, or other wireless technology. In some implementations, messaging server 101 sends and receives data to and from one or more of client devices 115a-115n, server 135, and bot 113 via network 140. In some implementations, messaging server 101 includes messaging application 103a that provides client functionality to enable a user (e.g., any of users 125) to exchange messages with other users and/or with a bot. Messaging application 103a may be a server application, a server module of a client-server application, or a distributed application (e.g., with a corresponding client messaging application 103b on one or more client devices 115).

Messaging server 101 may also include database 199 which may store messages exchanged via messaging server 101, data and/or configuration of one or more bots, and user data associated with one or more users 125, all upon explicit permission from a respective user to store such data. In some embodiments, messaging server 101 may include one or more assistive agents, e.g., bots 107a and 111. In other embodiments, the assistive agents may be implemented on the client devices 115a-n and not on the messaging server 101.

Messaging application 103a may be code and routines operable by the processor to enable exchange of messages among users 125 and one or more bots 105, 107a, 107b, 109a, 109b, 111, and 113. In some implementations, messaging application 103a may be implemented using hardware including a field-programmable gate array (FPGA) or an application-specific integrated circuit (ASIC). In some implementations, messaging application 103a may be implemented using a combination of hardware and software.

In various implementations, when respective users associated with client devices 115 provide consent for storage of messages, database 199 may store messages exchanged between one or more client devices 115. In some implementations, when respective users associated with client devices 115 provide consent for storage of messages, database 199 may store messages exchanged between one or more client devices 115 and one or more bots implemented on a different device, e.g., another client device, messaging server 101, and server 135, etc. In the implementations where one or more users do not provide consent, messages received and sent by those users are not stored.

In some implementations, messages may be encrypted, e.g., such that only a sender and recipient of a message can view the encrypted messages. In some implementations, messages are stored. In some implementations, database 199 may further store data and/or configuration of one or more bots, e.g., bot 107a, bot 111, etc. In some implementations when a user 125 provides consent for storage of user data (such as social network data, contact information, images, etc.) database 199 may also store user data associated with the respective user 125 that provided such consent.

In some implementations, messaging application 103a/103b may provide a user interface that enables a user 125 to create new bots. In these implementations, messaging application 103a/103b may include functionality that enables user-created bots to be included in conversations between users of messaging application 103a/103b.

Client device 115 may be a computing device that includes a memory and a hardware processor, for example, a camera, a laptop computer, a tablet computer, a mobile telephone, a wearable device, a mobile email device, a portable game player, a portable music player, a reader device, head mounted display or other electronic device capable of wirelessly accessing network 140.

In the illustrated implementation, client device 115a is coupled to the network 140 via signal line 108 and client device 115n is coupled to the network 140 via signal line 110. Signal lines 108 and 110 may be wired connections, e.g., Ethernet, or wireless connections, such as Wi-Fi, Bluetooth, or other wireless technology. Client devices 115a, 115n (e.g., user devices) are accessed by users 125a, 125n, respectively. The client devices 115a, 115n in FIG. 1 are used by way of example. While FIG. 1 illustrates two client devices, 115a and 115n, the disclosure applies to a system architecture having one or more client devices 115.

In some implementations, client device 115 may be a wearable device worn by a user 125. For example, client device 115 may be included as part of a clip (e.g., a wristband), part of jewelry, or part of a pair of glasses. In another example, client device 115 is a smartwatch. In various implementations, user 125 may view messages from the messaging application 103a/103b on a display of the device, may access the messages via a speaker or other output device of the device, etc. For example, user 125 may view the messages on a display of a smartwatch or a smart wristband. In another example, user 125 may access the messages via headphones (not shown) coupled to or part of client device 115, a speaker of client device 115, a haptic feedback element of client device 115, etc.

In some implementations, messaging application 103b is stored on a client device 115a. In some implementations, messaging application 103b (e.g., a thin-client application, a client module, etc.) may be a client application stored on client device 115a with a corresponding a messaging application 103a (e.g., a server application, a server module, etc.) that is stored on messaging server 101. For example, messaging application 103b may transmit messages created by user 125a on client device 115a to messaging application 103a stored on messaging server 101.

In some implementations, messaging application 103a may be a standalone application stored on messaging server 101. A user 125a may access the messaging application 103a via a web page using a browser or other software on client device 115a. In some implementations, messaging application 103b that is implemented on the client device 115a may include the same or similar modules as that are included on messaging server 101. In some implementations, messaging application 103b may be implemented as a standalone client application, e.g., in a peer-to-peer or other configuration where one or more client devices 115 include functionality to enable exchange of messages with other client devices 115. In these implementations, messaging server 101 may include limited or no messaging functionality (e.g., client authentication, backup, etc.). In some implementations, messaging server 101 may implement one or more bots, e.g., bot 107a and bot 111.

A response suggestion generator 150 is a module used to generate relevant responses based on particular semantic concepts which are input to the response suggestion generator 150. Some examples of using a response suggestion generator 150 are described herein. In various implementations, response suggestion generator 150 is a separate device or incorporated in one or more other devices of environment 100, e.g., messaging server 101 or other server.

Server 135 may include a processor, a memory and network communication capabilities. In some implementations, server 135 is a hardware server. Server 135 is communicatively coupled to the network 140 via signal line 128. Signal line 128 may be a wired connection, such as Ethernet, coaxial cable, fiber-optic cable, etc., or a wireless connection, such as Wi-Fi, Bluetooth, or other wireless technology. In some implementations, server 135 sends and receives data to and from one or more of messaging server 101 and client devices 115 via network 140. Although server 135 is illustrated as being one server, various implementations may include one or more servers 135. Server 135 may implement one or more bots as server applications or server modules, e.g., bot 109a and bot 113.

In various implementations, server 135 may be part of the same entity that manages messaging server 101, e.g., a provider of messaging services. In some implementations, server 135 may be a third party server, e.g., controlled by an entity different than the entity that provides messaging application 103a/103b.

In some implementations, one or more components of the environment 100 provides or hosts bots. A bot is an automated service, implemented on one or more computers, that users interact with via user input, e.g., text, such as via messaging application 103a/103b or other applications, etc. Bots are described in greater detail below.

In some implementations, messaging application 103a/103b may also provide one or more suggestions, e.g., suggested responses, to users 125 via a user interface. In some implementations, suggested responses are provided in response to user input, e.g., via a button or other user interface element. Suggested responses can enable faster interaction, e.g., by reducing or eliminating the need for a user to type a response. Suggested responses may enable users to respond to a message quickly and easily, e.g., when a client device lacks text input functionality (e.g., a smartwatch that does not include a keyboard or microphone). Suggested responses may also enable users to respond quickly to messages, e.g., when the user selects suggested response (e.g., by selecting a corresponding a user interface element on a touchscreen). Suggested responses may be generated using predictive models, e.g., machine learning models, that are trained to generate responses.

For example, messaging application 103a/103b may implement machine learning, e.g., a deep learning model, that can enhance user interaction with messaging application 103. In some implementations, machine learning can implemented on one or more components of the environment 100. Machine-learning models may be trained using synthetic data, e.g., data that is automatically generated by a computer, with no use of user information. In some implementations, machine-learning models may be trained, e.g., based on sample data, for which permissions to utilize user data for training have been obtained expressly from users. For example, sample data may include received messages and responses that were sent to the received messages. Based on the sample data, the machine-learning model can predict responses to received messages, which may then be provided as suggested responses.

User interaction is enhanced, e.g., by reducing burden on the user to compose a response to a received message, by providing a choice of responses that are customized based on the received message and the user's context. For example, when users provide consent, suggested responses may be customized based on the user's prior activity, e.g., earlier messages in a conversation, messages in different conversations, etc. For example, such activity may be used to determine an appropriate suggested response for the user, e.g., a playful response, a formal response, etc. based on the user's interaction style. In another example, when the user specifies one or more preferred languages and/or locales, messaging application 103a/103b may generate suggested responses in the user's preferred language. In various examples, suggested responses may be text responses, images, multimedia, etc.

In some implementations, machine learning may be implemented on messaging server 101, on client devices 115, or on both messaging server 101 and client devices 115. In some implementations, a simple machine learning model may be implemented on client device 115 (e.g., to permit operation of the model within memory, storage, and processing constraints of client devices) and a complex machine learning model may be implemented on messaging server 101. If a user does not provide consent for use of machine learning techniques, such techniques are not implemented. In some implementations, a user may selectively provide consent for machine learning to be implemented only on a client device 115. In these implementations, machine learning may be implemented on client device 115, such that updates to a machine learning model or user information used by the machine learning model are stored or used locally, and are not shared to other devices such as messaging server 101, server 135, or other client devices 115. Some further examples of machine learning implementations are described below.

For the users that provide consent to receiving suggestions, e.g., based on machine-learning techniques, suggestions may be provided by messaging application 103. For example, suggestions may include suggestions of content (e.g., movies, books, etc.), schedules (e.g., available time on a user's calendar), events/venues (e.g., restaurants, concerts, etc.), and so on. In some implementations, if users participating in a conversation provide consent to use of conversation data, suggestions may include suggested responses to incoming messages that are based on conversation content.

For example, if a first user of two users that have consented to suggestions based on conversation content, sends a message "do you want to grab a bite? How about Italian?" a response may be suggested to the second user, e.g. "@assistant lunch, Italian, table for 2." In this example, the suggested response includes a bot (identified by the symbol @ and bot handle assistant). If the second user selects this response, the assistant bot is added to the conversation and the message is sent to the bot. A response from the bot may then be displayed in the conversation, and either of the two users may send further messages to the bot. In this example, the assistant bot is not provided access to the content of the conversation, and suggested responses are generated by the messaging application 103.

In certain implementations, the content of a suggested response may be customized based on whether a bot is already present in a conversation or is able to be incorporated into the conversation. For example, if it is determined that a travel bot could be incorporated into the messaging app, a suggested response to a question about the cost of plane tickets to France could be "Let's ask travel bot!"

In different implementations, suggestions, e.g., suggested responses, may include one or more of: text (e.g., "Terrific!"), emoji (e.g., a smiley face, a sleepy face, etc.), images (e.g., photos from a user's photo library), text generated based on templates with user data inserted in a field of the template (e.g., "her number is <Phone Number>" where the field "Phone Number" is filled in based on user data, if the user provides access to user data), links (e.g., Uniform Resource Locators), message stickers, etc. In some implementations, suggested responses may be formatted and/or styled, e.g., using colors, fonts, layout, etc. For example, a suggested response that includes a movie recommendation may include descriptive text about the movie, an image from the movie, and a link to buy tickets. In different implementations, suggested responses may be presented as different types of user interface elements, e.g., text boxes, information cards, etc.

In different implementations, users are offered control over whether they receive suggestions (e.g., suggested responses), what types of suggestions they receive, a frequency of the suggestions, etc. For example, users may decline to receive suggestions altogether, or may choose specific types of suggestions, or to receive suggestions only during certain times of day. In another example, users may choose to receive personalized suggestions. In this example, machine learning may be used to provide suggestions, based on the user's preferences relating to use of their data and use of machine learning techniques.

Figure 2:
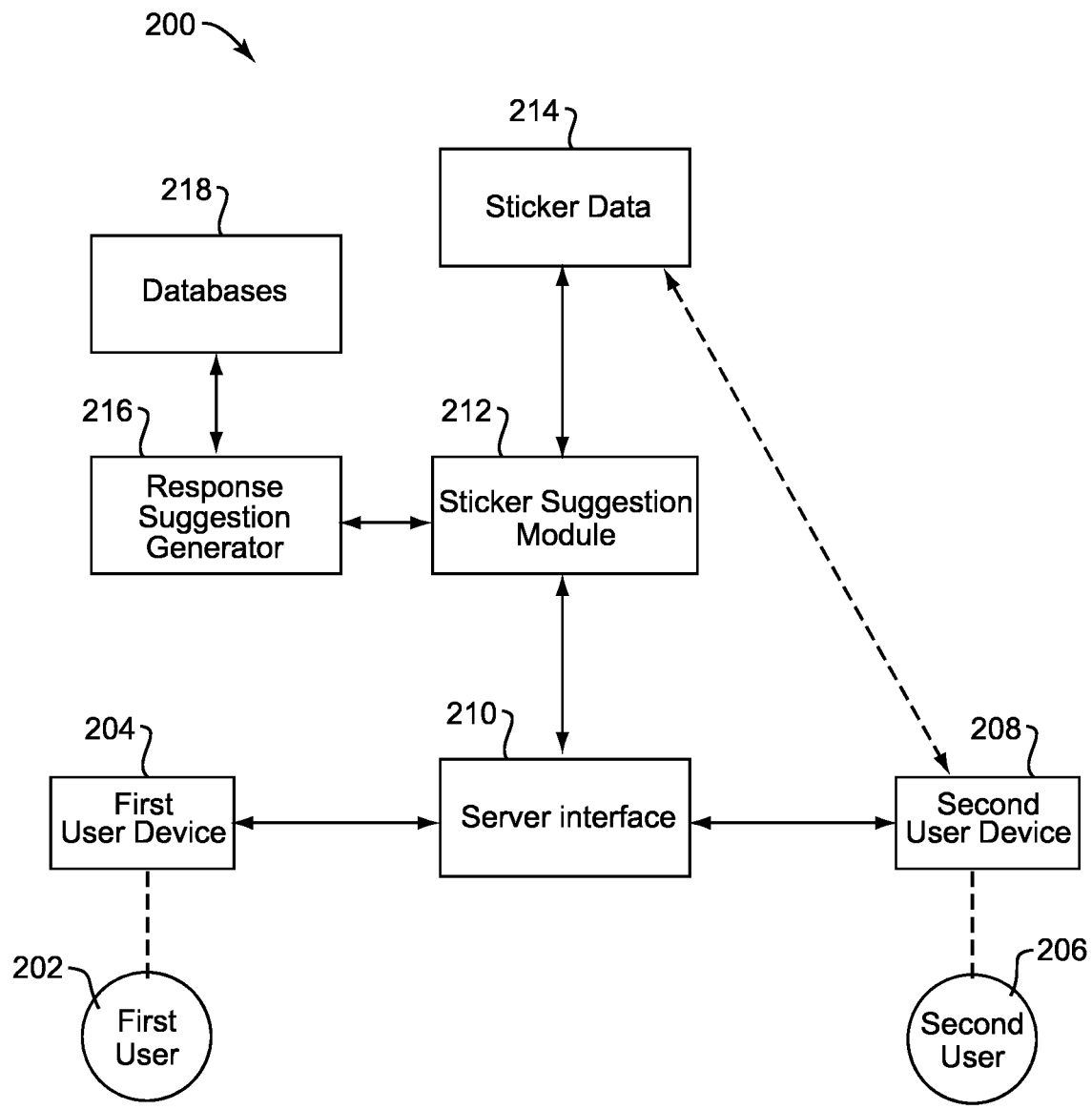
FIG. 2 is a block diagram illustrating an example system implementing one or more features described herein, according to some implementations.

FIG. 2 is a block diagram illustrating one example system that can implement one or more features described herein. In some implementations, one or more of the modules shown in FIG. 2 are components of a messaging application 103a/103b and/or are implemented in other components of the system. In some implementations, one or more of the modules shown in FIG. 2 are components of a server system, e.g., one or more individual servers or components of a single server.

A first user 202 can operate a first user device 204. In various implementations, the first user device 204 is a client device 115 of FIG. 1, for example, or is a server device. A second user 206 can operate a second user device 208, which can be a client device 115 or can be a server device.

A server interface 210 can be provided on a server device or client device, and can receive messages sent by first user device 204 and/or second user device 208 can forward such messages to one or more recipient devices. For example, server interface 210 can be a component of a messaging server 101 and a messaging application 103a/103b can be provided to control messaging functions.

A sticker suggestion module 212 can be used in some implementations. Sticker suggestion module 212 can receive messages and message sticker information (e.g., sticker metadata), communicate with other modules to obtain additional information, and send suggestion information to server interface 210 such that the suggestion information is obtained by user devices such as first user device 204 and second user device 208 via server interface 210 (e.g., the first and second user devices retrieve the suggestion information and/or the server interface 210 sends the suggestion information to the first and second user devices). For example, the suggestion information can include suggested replies that are responses to a message sticker received by the user device(s), and/or suggested message stickers in reply to a message received by the user device(s).

In some implementations, a sticker data module 214 can store sticker data (e.g., metadata) related to standardized message stickers that have been issued to many devices and which are accessible to devices including the first user device 204 and the second user device 208. Sticker data module 214 can be included in one or more modules of environment 100. For example, the sticker data can include descriptors (e.g., descriptions and keywords) for sets of available message stickers. In some examples, message stickers can each be associated with an identification of that message sticker, e.g., a sticker identification (ID) that indicates the identity of the individual message sticker. Some implementations can organize message stickers into sticker sets, and respective sticker sets can have an identification, e.g., a sticker set ID. Further, some implementations can provide a version number for a message sticker (and/or for a sticker set), where the version number can be compared to a stored reference version number that indicates the latest version of a sticker that has been issued.

In some implementations, a particular message sticker may be associated with a sticker ID, one or more sticker set IDs (indicating the sticker sets in which particular message sticker is included), and a version number (indicating the version of the particular message sticker, e.g., indicating when or the order in which it was issued and made available to users). In some implementations, sticker IDs and/or sticker set IDs can be referenced on one or more standard lists of message stickers available from various providers, e.g. where the sticker IDs, other parameters, and associated image data are downloadable over the Internet, where these respective sticker IDs reference particular image data (and/or other data) to be displayed for the associated sticker IDs on devices using the sticker IDs.

Sticker data module 214 can store descriptors, e.g., descriptions and keywords, for associated individual stickers and/or for sticker sets. For example, the sticker data module can store sticker IDs and associated descriptions for those sticker IDs. A description can be considered to provide one or more semantic concepts that are present in (or related to) the associated sticker. A description, for example, can be text that relates to the associated sticker. For example, the description can be text (e.g., one or more words or phrases) indicating a visual appearance of the message sticker, an action associated with the message sticker, a category in which the message sticker is included, an emotional state or connotation, a command, declaration, observation, or exclamation, a saying or proverb, a symbol, or other concept associated with the message sticker. In some examples, descriptions can include "cooking," "traffic," "rise and shine," "on my way," "call me," "bored," "coffee," "bye," "love," "cool lemonade," "urghh," etc. For example, in some implementations message sticker descriptions are output as audio (e.g., spoken by a recorded voice or voice synthesizer) to indicate receiving that message sticker.

One or more keywords can also be associated with a message sticker. Similarly to descriptions, keywords can be considered semantic concepts that describe one or more aspects of the visual appearance of the message sticker, e.g., a type or category of the subject of the message sticker, an action, mood, emotion, etc. related to the subject of the message sticker, etc. In some implementations, keywords are used to group, classify, or otherwise organize message stickers, for example. In some examples, keywords are searched to locate associated particular message stickers related to a particular search term or query, or related to a particular generated suggested response or concept as described below.

In some implementations, user devices can receive sticker data directly from sticker data module 214, as indicated by the connection between second user device 208 and the sticker data module 214 shown in FIG. 2.

Response suggestion generator 216 can be a module provided in some system implementations to generate relevant responses based on particular semantic concepts which are input to the response suggestion generator 216. For example, the suggestion generator 216 can access databases 218 and use one or more models stored in the databases and/or accessing data stored in the databases to determine suggested responses. For example, the databases 218 can store a knowledge base or knowledge graph that can include a taxonomy of different semantic concepts and provide hierarchical relationships and connections between the semantic concepts.

Databases 218 can include stored, constructed graphs indicating appropriate responses to particular concepts. Databases 218 can also include defined grammars that may provide defined rules indicating a particular response for a particular semantic concept. For example, text keywords and descriptions that are input to the response suggestion generator 216 can be used as labels that indicate concepts, and these labels can be input to such graphs and grammars of databases 218 by the suggestion generator 216 to determine relevant response suggestions to those keywords and descriptions. The generated response suggestions can be returned to the sticker suggestion module 212.

In some implementations, generated response suggestions are ranked, e.g., by the sticker suggestion module 212, and a particular number of the top-ranked response suggestions are sent via the server interface 210 to one or more user devices 204 and/or 208 to be displayed or otherwise output on the user devices. In some implementations, received suggested responses from the response suggestion generator 216 are matched to particular stickers (e.g., matched to descriptors, e.g., keywords and/or description, of the stickers), where the matched stickers are considered suggested stickers and can be ranked, e.g., based on ranks of their associated suggested responses and/or based on the strength of their correspondence to their associated suggested responses. A particular number of the top ranking message sticker suggestions can be sent via the server interface 210 to one or more user devices 204 and/or 208 to be displayed or otherwise output on the user devices. One or more of these response suggestions and/or sticker suggestions can be selected by user input at the user devices to send one or more messages to other devices, where the one or more messages include the content indicated by the selected suggestion(s).

Figure 3:
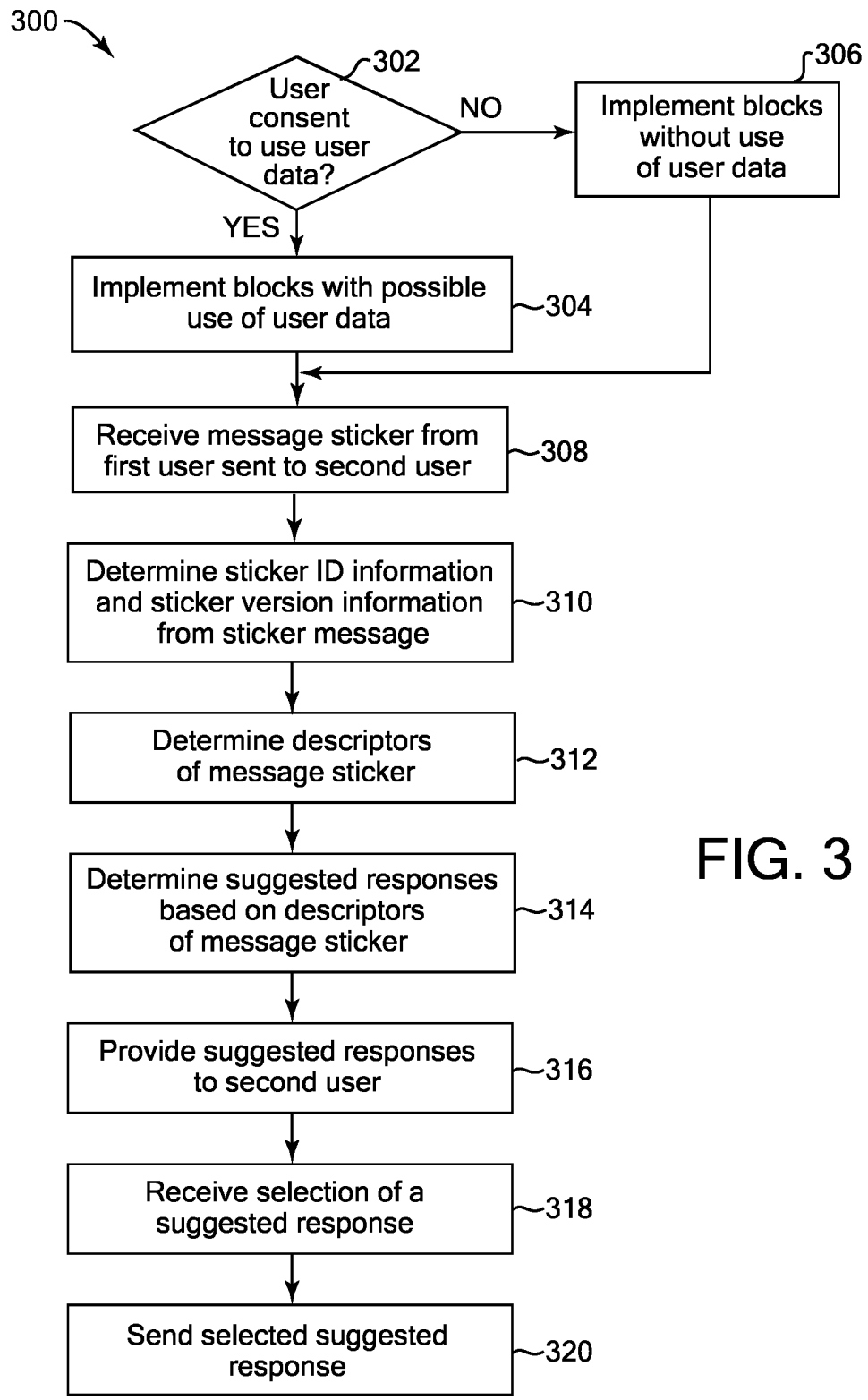
FIG. 3 is a flow diagram illustrating an example method to provide suggested responses to a received message sticker, according to some implementations.

FIG. 3 is a flow diagram illustrating an example method 300 to provide one or more response suggestions to a received message sticker, according to some implementations. In some implementations, method 300 is implemented, for example, on a server system, e.g., messaging server 101, as shown in FIG. 1. In some implementations, some or all of the method 300 is implemented on a system such as one or more client devices 115 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients perform different blocks or other parts of the method 300.

In block 302, it is checked whether user consent (e.g., user permission) has been obtained to use user data in the implementation of method 300. For example, user data can include messages sent or received by a user, e.g., using messaging application 103, user preferences, user biometric information, user characteristics (identity, name, age, gender, profession, etc.), information about a user's social network and contacts, social and other types of actions and activities, content, ratings, and opinions created or submitted by a user, a user's current location, historical user data, images generated, received, and/or accessed by a user, videos viewed or shared by a user, etc. One or more blocks of the methods described herein may use such user data in some implementations.

If user consent has been obtained from the relevant users for which user data may be used in the method 300, then in block 304, it is determined that the blocks of the methods herein can be implemented with possible use of user data as described for those blocks, and the method continues to block 308.

If user consent has not been obtained, it is determined in block 306 that blocks are to be implemented without use of user data, and the method continues to block 308. In some implementations, if user consent has not been obtained, blocks are to be implemented without use of user data and with generic, synthetic, and/or publicly-accessible data.

Some implementations described herein, e.g., related to FIG. 3, may provide suggested message responses based on obtaining standardized message stickers, e.g., a message sticker that has a particular associated image data and sticker ID due to the message sticker originating from a particular official source. Suggested responses may be provided in a variety of contexts. For example, suggested responses may be provided in response to receiving a message sticker at a server and/or at a client device 115*a* of a particular user (e.g., user 125*a*) from any of client devices 115, e.g., by a messaging application 103. For example, messaging application 103*a*/103*b* may be an instant messaging application, a social network application, an email application, a multimedia messaging application, and the like.

Suggested responses may be generated and provided to the particular user automatically, without user input or intervention, if consent has been obtained from the particular user and one or more other users that sent and/or received the image. For example, if the messaging application is an instant messaging application, a message sticker may be received as part of an instant messaging communication between the particular user 125*a* of a user (e.g., client) device and one or more other users 125 of user devices, e.g., in a messaging session (e.g., chat) having two participants, in a group messaging session that includes more than two participants, etc.

In various implementations, one or more of the users may be bots. In some implementations, bots may be automated agents that are implemented in software and/or hardware. In some implementations, bots may represent or be associated with cameras (e.g., security cameras, web cameras, surveillance cameras, etc.), appliances (e.g., a smart refrigerator, an alarm device, an industrial appliance, etc.), imaging devices (e.g., microscopes, medical imaging devices, etc.) and send one or more images via messaging application 103. In the implementations that include one or more of the users that are bots, consent is obtained from an owner or operator of the bot to use messages generated by the bot. In some implementations, consent may be specified as a configuration parameter of the bot, camera, appliance, etc. and be provided to the messaging application 103*a*/103*b* upon the bot interacting with the messaging application 103.

In some implementations, suggested responses may be provided specifically to those users that have provided consent to access user data. In some implementations, suggested responses may be provided automatically or based on user input, e.g., a user may be provided a user interface to request suggestions.

In block 308, a message sticker is received, which has been sent from a first user of a first device to a second user of a second device, e.g., over a communication network. In various implementations, the message sticker may be an image, e.g., a static image (e.g., a photograph, an emoji, or other image), a cinemagraph or animated image (e.g., an image that includes motion, a sticker that includes animation and audio, etc.), a video, audio data for an audio message, etc. In some implementations, the received message sticker is included in a message that also includes one or more other types of content (e.g., text, emojis, video, audio, etc.). The message sticker can be a standardized message image, e.g., an image that has been issued from a particular source (e.g., network service, company, or other organization) and which has a particular sticker ID and/or sticker set ID, as described above.

In some implementations, the received message sticker includes image data indicating the visual display appearance of the message sticker (e.g., pixel data) and includes metadata associated with the message sticker, e.g., sticker ID, sticker set ID, etc. In some implementations, the received message sticker includes some or all of associated metadata without image data and/or some metadata, e.g., where the image data and non-received associated metadata can be obtained from a storage device. In some implementations, the received message sticker includes image data without some or all of the associated metadata, e.g., where metadata that is associated with the image data can be obtained from a storage device.

In some examples, the message sticker is sent by a first device that is one or more client devices 115 (or other devices), or by a bot that sends messages, and the message sticker is received by a second device that is a client device 115 (or other device) via network 140. In some examples, the message sticker is sent in a communication between the first device and the second device. In another example, the communication is a one-on-one (1:1) messaging session with two participants, and the message sticker is received by a client device of a particular user. In another example, the communication is a group messaging session, and the message sticker is received by two or more client devices of participants in the group messaging session.

In some implementations, the message sticker is obtained from storage, e.g., local storage of a client device 115 (e.g., memory, storage drive, etc.) and/or remote storage accessible to a client device over network 140 (e.g., storage drives of a remote client device, server device, or storage device). For example, in some implementations, the first device stores the message sticker on the storage device, and the second device obtains the message sticker from the storage device.

In an example relating to the system 200 of FIG. 2, the message sticker can be sent by first user 202 using first user device 204. In some implementations, the message sticker is included in a message that may include, e.g., text or other data in addition to the message sticker.

In some example implementations, in block 308, the message sticker sent by the first user device 204 is received by a server, e.g., server interface 210 as shown in FIG. 2. The server interface 210 then sends the received message sticker to its intended recipient (e.g., to second user device 208) and one or more server modules can also process a copy of the received message sticker as in one or more blocks of method 300. In some implementations, in block 308, the message sticker is received by a client device, e.g., the second user device 208, and the client device can process the received message sticker as in one or more blocks of method 300. Some implementations can use both server and client devices to process one or more blocks of method 300.

In block 310, sticker ID information and sticker version information are determined from the received sticker message. For example, a sticker ID that identifies the particular message sticker, and a sticker set ID that identifies a collection of message stickers to which the message sticker belongs, can be determined. The sticker version information can include a version number of the message sticker as described above. In some implementations, e.g., with respect to FIG. 2, the server interface 210 forwards a copy of the message sticker to the sticker suggestion module 212. In some examples of such implementations, after detecting that the received message is or includes a message sticker, the sticker suggestion module 212 extracts the sticker ID, sticker set ID, and version information from the message sticker. In some implementations, these three parameters uniquely define the message sticker.

In some implementations, the sticker ID information, version information, and/or other information can be obtained by the receiving second device from the received data in the message sticker.

In block 312, one or more descriptors of the message sticker are determined. For example, the descriptors can include description and one or more keywords associated with the message sticker. For example, the descriptors may be embedded or otherwise included in the message sticker, or may be stored in separate storage and accessed based on sticker parameters, e.g., the sticker ID, sticker set ID, version ID, and/or sticker parameters of the message sticker. In some implementations, e.g., with respect to FIG. 2, the descriptors for message stickers is stored in sticker data module 214. For example, the sticker suggestion module 212 can access the sticker data module 214 using the sticker parameters of the message stickers as search criteria, and find and retrieve the descriptors associated with the message sticker from the sticker data module 214. In some implementations, other parameters of the message sticker may be used to uniquely identify the descriptors in the sticker data module 214, e.g., a location zone for the message sticker, which, e.g., can be determined from the message sticker and/or from other data sources.

In block 314, one or more suggested responses are determined or generated based on the descriptors of the message sticker. The suggested responses can be text responses, or in some implementations, can be (or include) other forms of media content (e.g., audio, image, video, etc.). In some implementations, suggested responses are generated based on semantic concepts, e.g., by using stored associations between concepts and predefined responses, models that provide responses based on concepts and their relationships to responses as defined in one or more graphs, machine learning models, etc. In some implementations, one or more suggested responses are determined as message stickers, similarly as described below with respect to FIGS. 4 and 5. For example, suggested responses can be generated based on a mapping of the semantic concepts to particular suggested responses. For example, the suggested responses can be obtained from a set or library of stored suggested responses, e.g., that are synthetic responses or responses obtained from actual users in previous device communications (e.g., using messaging applications), if user consent has been obtained.

The descriptors (e.g., description and keywords) of the received message sticker can be used as semantic concepts, and/or concepts can be obtained from the descriptors, to determine such responses. For example, words in the description can be provided as individual concepts, and each keyword can be considered an individual concept, used to determine suggested responses using defined relationships. In some examples, a string that includes the words of the description and/or keywords can be searched for matches in a list of predefined messages that are associated with predefined responses, and the messages that best match the string (e.g., have the greatest number of matching letters, have the highest similarity score in a matching process, etc.) are selected to determine the associated suggested responses.

In some implementations of block 314, e.g., with respect to FIG. 2, the sticker suggestion module 212 can send the descriptors to the response suggestion generator 216. The suggestion generator 216 can consult databases 218 including a knowledge graph, grammars, and/or other defined relationships, to determine suggested responses (e.g., text responses) based on the descriptors, and send the determined responses to the sticker suggestion module 212. In some examples, the suggestion generator 216 can use predefined associations between concepts and suggested responses, one or more mapping models, and/or one or more machine learning models to determine suggested responses from concepts, similarly as described below for block 416 of FIG. 4. For example, the suggestion generator 216 may use one or more mapping models and/or machine learning models to determine responses based on the descriptors used as concepts.

In some examples, a message sticker may depict an image that requests or indicates that the receiving user should call the person who is sending the message sticker. The message sticker may have an associated description of "call me." This description can be input as a label to the suggestion generator 216, and the suggestion generator 216 can determine one or more suggested responses based on accessed relationships, knowledge graphs, databases, models, and other data. For example, the suggestion generator 216 may output responses to the sticker suggestion module including "I will," and "later," which are responses defined in the databases associated with or based on the input label, and/or responses obtained from a mapping model or machine learning model similarly as described below.

In additional examples, a message sticker that is an image of a smiling face may have a description of "be happy" and two keywords of "smile" and "face." These descriptors (labels) can be input as individual semantic concepts to the suggestion generator 216, and the suggestion generator 216 can determine one or more suggested responses based on these individual semantic concepts and/or based on a combination of two or more of these semantic concepts. For example, the suggestion generator 216 may output responses to the sticker suggestion module including "thanks," "same to you," and "nice smile," which were responses associated with or defined in the databases based on the combination of input concepts, and/or responses output by a mapping model or machine learning model similarly as described below.

In some implementations, one or more of the generated suggested responses are or include one or more message stickers. For example, suggested message sticker responses can be determined by the sticker suggestion module 212 or second user device using descriptors associated with available message stickers and finding correspondences of the message stickers to suggested responses generated as described above, e.g., where the suggested message sticker responses can be determined similarly as described below with reference to FIG. 4 (e.g., with message sticker responses stored on a server) and FIG. 5 (e.g., with message sticker responses stored on the second user device). In some implementations, the semantic concept(s) determined from the message are compared directly to stored semantic concepts which are associated with one or more particular message sticker responses, such that if a message semantic concept corresponds (e.g., matches or is similar) to a stored semantic concept, the associated message sticker responses can be selected for block 314, e.g., similarly as described below for FIG. 4. For example, the stored semantic concepts can include descriptors of available message stickers in some implementations.

In some implementations, the determined suggested responses can include suggested responses that are in response to one or more previous messages received by the second user device. For example, one or more previous messages (e.g., including message stickers) may have been received in a same messaging conversation in which the message of block 308 is received, e.g., a conversation in which messages have been exchanged between the first user device and the second user device. One or more suggested responses may have been generated previously for the second user device in response to the second user device receiving those previous messages, and may be stored in accessible storage. One or more of such previously-generated suggested responses may be retrieved and included in the suggested responses determined for the currently-received message. In some implementations, one or more suggested responses are generated in block 314 for one or more previously-received message stickers and included in the set of suggested responses determined for the currently-received message. Similarly, descriptors of previously-received message stickers (e.g., received in the same conversation) may have been stored, and such semantic concepts can be used for determining message suggestions in block 416.

In block 316, at least one of the suggested responses are provided to the second user that is the recipient of the message sticker. In some implementations, these provided suggested responses are sent to the second user device. For example, with respect to FIG. 2, the suggested responses can be sent from sticker suggestion module 212, via server interface 210, to second user device 208. In some examples, instructions are transmitted with the suggested responses to the second user device 208 that cause the second user device to display the suggested responses. Some implementations or cases may have multiple recipients of the message sticker and the suggested responses.

The provided suggested responses can be displayed and/or otherwise output by the second user device (e.g., audio output). In some implementations, the suggested responses determined in block 314 are ranked, and a particular number of the top-ranked suggested responses are provided to the second user. For example, in some implementations the suggested responses are ranked based on a closeness of match of the descriptors to data entities (e.g., predefined messages) used to determine the suggested responses.

In block 318, a selection of one or more of the displayed suggested responses is received. For example, the selection can be based on user input provided by the user at the user device, e.g., via an input device such as a touchscreen or trackpad receiving a user touch, a microphone receiving a voice command, a button, mouse, or joystick receiving user manipulation, etc. In some implementations, e.g., with respect to FIG. 2, the second user 206 provides the user input at the second user device 208. In some implementations, one or more of the suggested responses are selected automatically (without user input), e.g., based on user preferences, user context (e.g., geographic location, time or date, etc., if user consent has been obtained), or other predefined conditions.

In block 320, the selected suggested response(s) are output as one or more messages to one or more recipient devices. For example, a message can be sent over the network 140 to one or more other client devices 115 via messaging server 101 and/or directly to the other client devices 115. In some implementations, the message is sent to the user device that sent the image obtained in block 308. For example, with respect to FIG. 2, the second user device 208 sends the selected response(s) to the first user device 204. In some implementations, the message is sent to multiple user devices participating in a chat conversation or session, including the first user device 204. The method can then return to block 308 in some implementations, e.g., if another image has been obtained.

Figure 4:
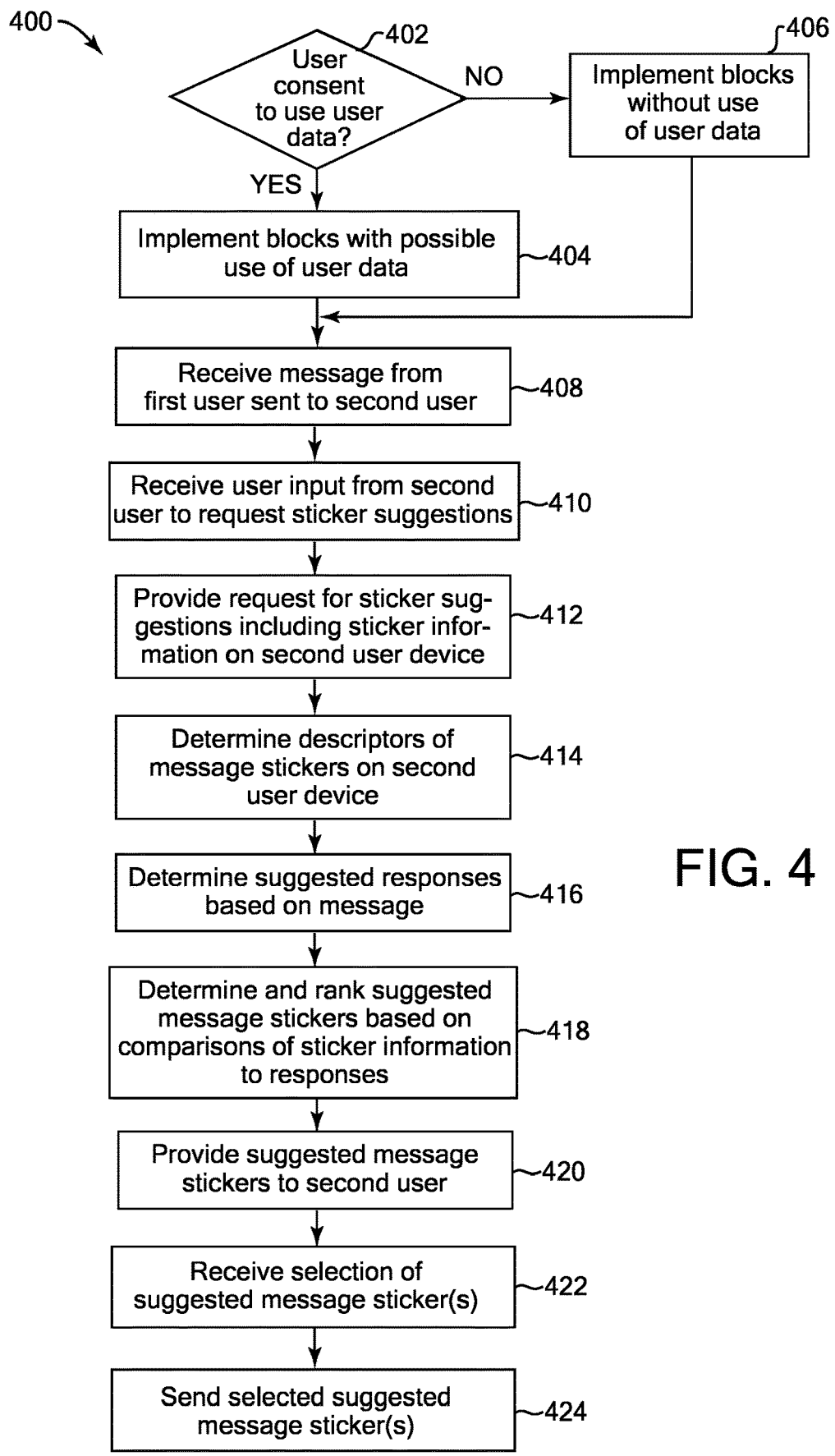
FIG. 4 is a flow diagram illustrating an example method to provide message sticker suggestions in response to a received message, according to some implementations.

FIG. 4 is a flow diagram illustrating an example method 400 to provide one or more message sticker suggestions in response to a received message, according to some implementations. In some implementations, method 400 is implemented, for example, on a server system, e.g., messaging server 101, as shown in FIG. 1. In some implementations, some or all of the method 400 is implemented on a system such as one or more client devices 115 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 400.

In block 402, it is checked whether user consent (e.g., user permission) has been obtained to use user data in the implementation of method 400. For example, user data can include messages sent or received by a user, e.g., using messaging application 103, user preferences, user biometric information, user characteristics (identity, name, age, gender, profession, etc.), information about a user's social network and contacts, social and other types of actions and activities, content, ratings, and opinions created or submitted by a user, a user's current location, historical user data, images generated, received, and/or accessed by a user, videos viewed or shared by a user, etc. One or more blocks of the methods described herein may use such user data in some implementations.

If user consent has been obtained from the relevant users for which user data may be used in the method 400, then in block 404, it is determined that the blocks of the methods herein can be implemented with possible use of user data as described for those blocks, and the method continues to block 408.

If user consent has not been obtained, it is determined in block 406 that blocks are to be implemented without use of user data, and the method continues to block 408. In some implementations, if user consent has not been obtained, blocks are to be implemented without use of user data and with generic, synthetic, and/or publicly-accessible data.

Some implementations described herein, e.g., related to FIG. 4, may provide suggested standardized message stickers to be used as responses to received messages. Suggested message stickers may be provided in a variety of contexts. For example, suggested message stickers may be provided in response to receiving a message at a server and/or at a client device 115a of a particular user (e.g., user 125a) from any of client devices 115, e.g., by a messaging application 103. For example, messaging application 103a/103b may be an instant messaging application, a social network application, an email application, a multimedia messaging application, and the like.

Suggested message stickers may be generated and provided to the particular user automatically, upon consent from the particular user and one or more other users that sent and/or received the image. For example, if the messaging application is an instant messaging application, a message may be received as part of an instant messaging communication between the particular user 125a and one or more other users 125, e.g., in a messaging session (e.g., chat) having two participants, in a group messaging session that includes more than two participants, etc. In various implementations, one or more of the users may be bots, similarly as described for FIG. 3.

In some implementations, suggested message stickers may be provided specifically to those users that have provided consent to access user data. In some implementations, suggested message stickers may be provided automatically or based on user input, e.g., a user may be provided a user interface to request suggestions.

In block 408, a message is received, which has been sent from a first user to a second user, e.g., over a communication network. In various implementations, the message may be a text message, an image (e.g., a static image, a cinemagraph or animated image, etc.), a video, audio data for an audio message, etc. In some implementations, the message can include a message sticker, e.g., similarly as described for FIG. 3. In some implementations, a combination of two or more of these types of content can be included in the message.

In some examples, the message may have been sent by a first device that is one or more client devices 115 (or other devices), or by a bot that sends messages, and the message may be received by a second device that is a client device 115 (or other device) via network 140. In a further example, in a one-on-one (1:1) messaging session with two participants, the message is received by a client device of a particular user. In a further example, in a group messaging session, the message is received by two or more client devices of participants in the group messaging session. In some implementations, the message may be obtained from storage, e.g., local storage of a client device 115 (e.g., memory, storage drive, etc.) and/or remote storage accessible to a client device over network 140 (e.g., storage drives of a remote client device, server device, or storage device). For example, in some implementations, the first device stores the message on the storage device, and the second device obtains the message from the storage device. In some cases or implementations, the message is included in a communication that also includes one or more other messages or data, e.g., provided from the first user device to the second user device.

In an example relating to the system 200 of FIG. 2, the received message is sent by first user 202 using first user device 204. In some implementations, in block 408, the message sent by the first user device 204 is received by a client device, e.g., second user device 208 as shown in FIG. 2, and/or by a server device, e.g., the server interface 210 of FIG. 2. For example, the server interface 210 can receive the message from the first user device and forward the message to the second user device 208 and provide a copy of the message to the sticker suggestion module 212, similarly as described above for FIG. 3.

In block 410, user input from the second user requests one or more sticker suggestions to be displayed, from which the second user can select. For example, in some implementations, block 410 is implemented on the second user device 208, where the user input is provided to the second user device 208 to command a display of a user interface (e.g., window or other display area) that displays a list of message stickers. The user is able to select one or more message stickers from the list to send in response to the received message (or to a newly-designated recipient user), as described below. In some implementations, some or all of the one or more sticker suggestions are commanded by the system to be displayed automatically in response to, e.g., receiving the message in block 408 and/or based on stored user preferences, and not in response to user input received in block 410.

In block 412, a request for sticker suggestions is provided in response to the user input of block 410, where the request includes sticker information (e.g., metadata) that identifies or indicates the message sticker data that is currently stored on the second user device 208. For example, with respect to FIG. 2, the request can be sent from the second user device 208 to the server interface 210. In some implementations, the request can also include the received message, e.g., if it was not previously provided to the sticker suggestion module 212.

In some implementations, the sticker information includes a list of the sticker IDs, sticker set IDs, and version information for all message stickers, or a designated set of message stickers, that are installed and available on the second user device 208 for display and transmission. In some implementations, the request for sticker suggestions is provided at other times or under other conditions instead of in response to the user input of block 410, e.g., upon startup of the second user device, in response to the second user device installing additional message stickers, etc.

In block 414, one or more descriptors, e.g., description and/or keyword(s), of the message stickers stored on the second user device are determined. For example, the descriptors may be embedded or otherwise included in the message sticker, or may be stored in separate storage and accessed based on the sticker parameters including sticker ID, sticker set ID, version ID, and/or other sticker parameters of the message stickers. In some implementations, e.g., with respect to FIG. 2, the descriptors for message stickers are stored in sticker data module 214. For example, the sticker suggestion module 212 can access the sticker data module 214 using the sticker parameters of the message stickers as search criteria, and find and retrieve the descriptors associated with the message stickers of the second user device 208.

In some implementations, other parameters of the message stickers may be used to uniquely identify the descriptors in the sticker data module 214, similarly as described for FIG. 3. In some implementations, the determination of the descriptors of the message stickers on the second user device are performed upon startup of the second user device or at other times or in response to predefined conditions (e.g., receiving the message in block 408, the user input in block 410, or other condition).

In block 416, one or more suggested responses are determined or generated based on the received message. In some implementations, suggested responses are generated based on semantic concepts determined to be associated with the received message, e.g., semantic concepts determined to be included in text data, image data, or other data of the message. For example, suggested responses can be generated based on a mapping of the semantic concepts to particular suggested responses. For example, the suggested responses can be obtained from a set or library of stored suggested responses, e.g., that are synthetic responses or responses obtained from actual users in previous device communications (e.g., using messaging applications), if user consent has been obtained.

The message can be used to provide one or more concepts used to determine the suggested responses. For example, words in the message can be parsed or extracted and provided as concepts, used to determine responses using defined relationships. In some implementations, labels detected in image content of an image or video that is included in the message are provided as concepts (e.g., labels added to image by a user to describe image content features, and/or labels detected automatically using one or more image detection or image recognition techniques to determine image content features). In some implementations, semantic concepts can also be determined for one or more additional messages included in a communication to the second user device, where these semantic concepts can also be used to determine suggested responses.

The suggested responses can be generated based on the determined semantic concepts. For example, the suggested responses can be generated using stored associations between concepts and predefined responses, models that provide responses based on concepts and their relationships to responses as defined in one or more graphs, etc., similarly as described above for FIG. 3. In one example, a received message of "Happy Birthday!" is associated with a suggested response of "Thank you." In some implementations of block 416, e.g., with respect to FIG. 2, the sticker suggestion module 212 can send the received message(s) and/or the descriptors to the response suggestion generator 216 to determine semantic concepts and suggested responses. In some examples, the suggestion generator 216 can consult databases 218 including mapping models, a knowledge graph, grammars, and/or other defined relationships, to determine responses (e.g., text responses) based on the message.

For example, a mapping model can be used to map concepts to message suggestions. In some examples, the mapping model can include machine learning models. For example, the mapping model can include a graph-based machine learning model, which can include a model that is trained based on training data. The graph-based model can be generated in a training stage based on the training data, prior to receiving the concepts for which message suggestions are to be generated. Upon receiving the concepts, e.g., in block 416 in an inference stage after the model has been trained, the message suggestions can be generated using the model. In some examples, the training data may be message data that includes concepts and responses to those concepts. For example, the message data can be synthetic data, e.g., based on simulated conversations where no human users are participants. In additional examples, training data may include images and messages exchanged among users who agree to provide such data for training purposes. Training data is treated before use to remove user identifiers and other information.

In further examples, the mapping model can include one or more grammars (e.g., each grammar being a set of particular rules governing the composition of message suggestions) to provide message suggestions in response to particular concepts. A grammar can use a stored, hierarchical taxonomy of concepts accessible to the suggestion generator 216. In some examples, a number of grammars can be predefined and stored in accessible storage to allow the suggestion generator 216 to determine message suggestions based on message concepts that are matched to particular related concepts that are stored in the taxonomy.

Some grammars can be used for a particular concept if that particular concept is related to a concept specified by the grammar, e.g., higher or lower in the hierarchy than the specified concept. In an example, a stored grammar may specify that if a concept c is a child concept of the specified concept "dog" in the hierarchy of the referenced taxonomy, then that grammar's provided message suggestion can be used for the concept c. For example, this grammar can specify to output a suggested response of "cute [c]", where [c] is the concept c.

In some implementations, the suggestion generator 216 uses other types of machine learning models to determine responses based on the received message and/or based on descriptors. For example, the machine learning model can be trained in a training stage based on training data, prior to receiving the concepts for which message suggestions are to be generated. Upon receiving concepts, e.g., in block 416 in an inference stage after the machine learning model has been trained, the message suggestions can be generated using the machine learning model. In some examples, the training data may be message data that includes concepts and responses to those concepts, similarly as described above, if user consent has been obtained for the use of such data. Further examples of machine learning models are described below with reference to FIG. 12.

In some implementations, the determined suggested responses of block 416 include suggested responses that are in response to one or more previous messages received by the second user device. For example, one or more previous messages (e.g., including message stickers) may have been received in a same messaging conversation in which the message of block 408 is received, e.g., a conversation in which messages have been exchanged between the first user device and the second user device. One or more suggested responses may have been generated previously for the second user device in response to the second user device receiving those previous messages, and may be stored in accessible storage. One or more of such previously-generated suggested responses may be retrieved and included in the suggested responses determined for the currently-received message.

In some implementations, one or more suggested responses are generated in block 416 for one or more previously-received messages and included in the set of suggested responses determined for the currently-received message. Similarly, semantic concepts may have been previously detected in the previously-received messages (e.g., received in the same conversation) and stored, and such semantic concepts can be used for determining message suggestions in block 416.

In some implementations, the message suggestions are ranked with respect to each other based on a strength of the message suggestion correspondence to the semantic concepts of the message. In some examples, the strength of the correspondence can be based on the closeness of the match between message concepts and stored concepts used to determine associated suggested responses, and/or the frequency of occurrence of the message suggestion as a response in training data indicating previous responses to previous messages.

In block 418, one or more suggested message stickers are determined and ranked based on comparisons and matches of sticker information (e.g., descriptors) to the suggested responses determined in block 416. In some implementations with respect to FIG. 2, the response suggestion generator 216 and/or the sticker suggestion module 212 can determine and rank suggested message stickers.

In some implementations, the descriptors of the message stickers on the second user device are compared to the generated suggested responses, and if any descriptor corresponds to a suggested response, the message sticker that corresponds to that matching description or keyword is selected as a suggested message sticker. In some implementations, matches are checked for the correspondence, e.g., matches between the letters of words that are in the same sequence, and/or matches of multiple words in the same sequence. In some implementations, exact and inexact matches are used or allowed for the correspondences, and a similarity between the descriptors and suggested responses can be checked (e.g., differences caused by past tense and plural forms of words can be ignored, etc.). In some examples, a similarity score can be determined for descriptors with respect to suggested responses (e.g., each descriptor with respect to each suggested response), which indicates the degree of similarity between a descriptor and a suggested response. For example, the similarity score can be based on the number or percentage of letters in a particular order that match.

In some implementations, the system checks for a semantic similarity as the correspondence, e.g., using an accessible dictionary, thesaurus, knowledge graph, and/or other reference information to determine whether the meanings of the descriptors and the suggested responses are the same. In some implementations, a sticker similarity score can be determined for a message sticker and a suggested response, based on individual similarity scores determined for each descriptor of that message sticker. For example, the sticker similarity score can be a sum of the individual similarity scores determined for the descriptors.

In some implementations, the message sticker having the highest similarity to a suggested response is selected for that suggested response, e.g., based on the similarity score. In some examples, the message sticker having the highest similarity score for a suggested response is selected for that response. In further examples, message stickers can be selected based on a degree of similarity, where higher similarity can be determined based on, e.g., the greater number of words in the descriptors of the message sticker corresponding (e.g., matching or similar words as described herein) to words in the suggested response, and/or the highest score in a determination of semantic similarity between descriptors and the suggested response. In some implementations, multiple message stickers are determined to correspond to a particular message suggestion, e.g., a particular number of message stickers having the highest similarity to the message suggestion.

In some implementations, the semantic concepts that were determined in the received message (message concepts) are compared to stored semantic concepts that have been associated directly with particular suggested message sticker responses. These suggested stickers have been stored in association with the stored concepts as suggested responses to the stored concepts. For example, the message concepts can be checked for correspondence to the stored concepts similarly as described herein (e.g., checked for matches, semantic similarity, partial matches, etc.), and if the message concept matches or corresponds to a stored concept, then the suggested sticker response(s) that are associated with that stored concept are selected for block 418. For example, the stored semantic concepts can include descriptors of available message stickers in some implementations.

The determined suggested message stickers can be ranked with respect to each other. For example, the placement or rank of a message sticker in the ranking can be based on a rank of the message suggestion associated with that message sticker with respect to other message suggestions. In further examples, the ranking of suggested message stickers are based on a strength of correspondence between the suggested message stickers and their associated suggested responses. For example, the placement or rank of a message sticker in the ranking can be based on the number of matches (correspondences) between the associated suggested response and the descriptors of that message sticker.

In some examples, the number of matches can be the number of words or phrases in the descriptors that match the words of a suggested response. In some examples, if there are 5 matches between the words suggested response and the keywords of a first message sticker, the first message sticker has a stronger (e.g., higher) rank than a second message sticker that has 3 keywords that match the words of the suggested response.

In some implementations, confidence scores are used in determining correspondence between suggested responses and message stickers (e.g., to determine correspondence of semantic meaning), and these scores are used to rank the message stickers based on the confidence of the correspondence between message stickers and the suggested responses. In some implementations, a particular number of the top-ranking message stickers are determined as suggested message stickers. For example, in some implementations with respect to FIG. 2, the response suggestion generator 216 can send the particular number of top-ranked message stickers to the sticker suggestion module 212.

In block 420, at least one of the suggested message stickers are provided to the second user. In some implementations, the suggested message stickers are sent to the second user device. In some examples, a particular number of the top-ranked suggested message stickers are sent. For example, with respect to FIG. 2, the suggested message stickers can be sent from sticker suggestion module 212, via server interface 210, to second user device 208. In some examples, instructions are transmitted with the message stickers to the second user device 208 that cause the second user device to display the message stickers. In some implementations or cases, there may be multiple recipient devices receiving the message and the suggested message stickers. The provided suggested message stickers can be displayed by the second user device, e.g., in a user interface as requested by the second user in block 410. For example, the top-ranking message stickers can be displayed in an order or configuration based on their ranks.

In block 422, a selection of one or more of the displayed suggested message stickers is received. For example, the selection can be based on user input provided by the user at the user device, e.g., via an input device such as a touchscreen or trackpad receiving a user touch, a microphone receiving a voice command, a button, mouse, or joystick receiving user manipulation, etc. In some implementations with respect to FIG. 2, the second user 206 provides the user input at the second user device 208. In some implementations, one or more of the suggested message stickers are selected automatically (without user input), e.g., based on user preferences, user context (e.g., geographic location, time or date, etc., if user consent has been obtained), or other predefined conditions.

In block 424, the selected suggested message sticker(s) are output as one or more messages to one or more recipient devices. For example, a message including the selected message sticker can be sent over the network 140 to one or more other client devices 115 via messaging server 101 and/or directly to the other client devices 115. In some implementations, the message is sent to the user device that sent the image obtained in block 408. For example, with respect to FIG. 2, the second user device 208 sends the selected message sticker(s) to the first user device 204. The method can then return to block 408 in some implementations, e.g., if another image has been obtained.

Figure 5:
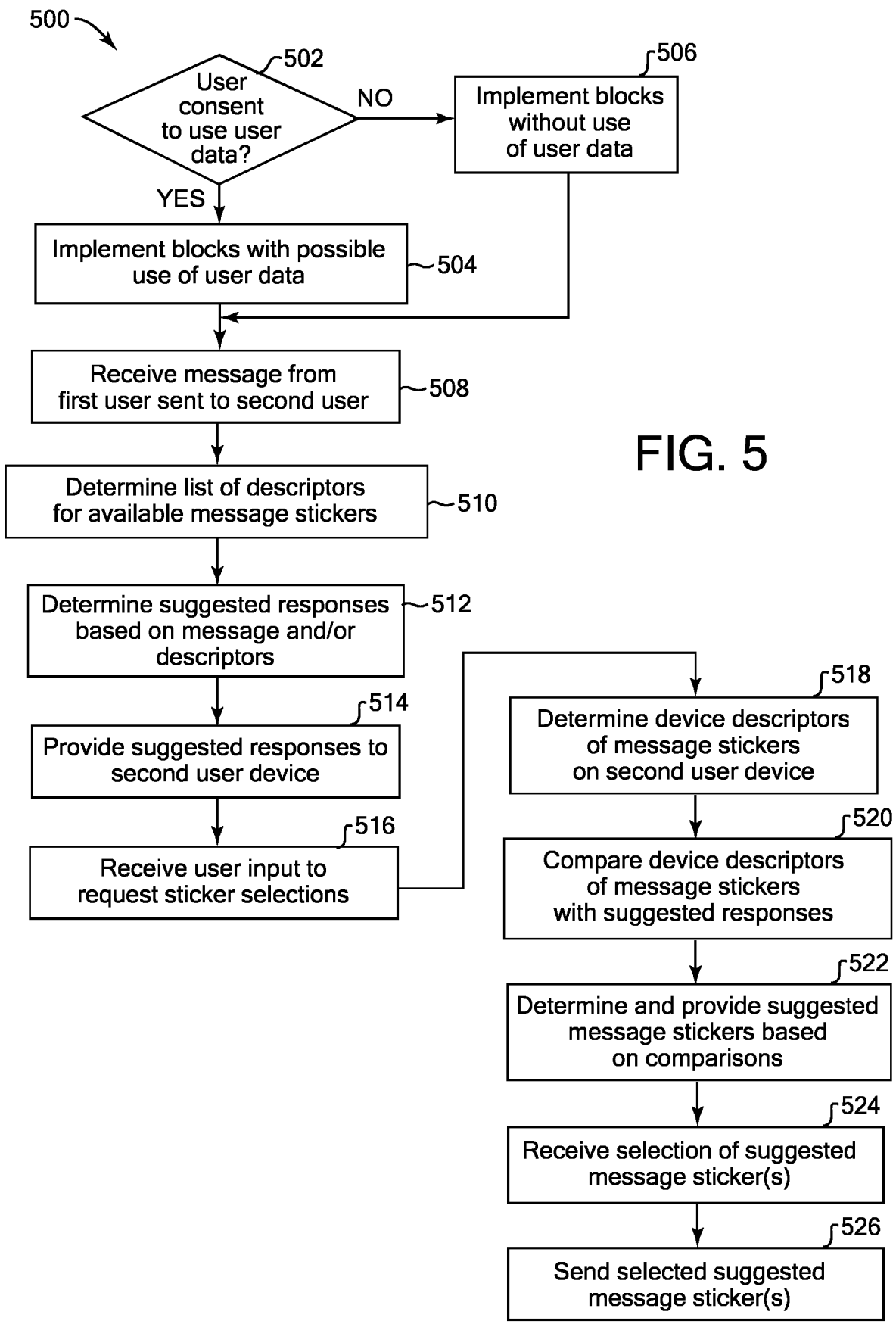
FIG. 5 is flow diagram illustrating another example method to provide message sticker suggestions in response to a received message, according to some implementations.

FIG. 5 is a flow diagram illustrating another example method 500 to provide one or more message sticker suggestions in response to a received message, according to some implementations. In some implementations, method 500 is implemented, for example, on a server system, e.g., messaging server 101, as shown in FIG. 1. In some implementations, some or all of the method 500 is implemented on a system such as one or more client devices 115 as shown in FIG. 1, and/or on both a server system and one or more client systems. In described examples, the implementing system includes one or more processors or processing circuitry, and one or more storage devices such as a database or other accessible storage. In some implementations, different components of one or more servers and/or clients can perform different blocks or other parts of the method 500.

In block 502, it is checked whether user consent (e.g., user permission) has been obtained to use user data in the implementation of method 500. For example, user data can include messages sent or received by a user, e.g., using messaging application 103, user preferences, user biometric information, user characteristics (identity, name, age, gender, profession, etc.), information about a user's social network and contacts, social and other types of actions and activities, content, ratings, and opinions created or submitted by a user, a user's current location, historical user data, images generated, received, and/or accessed by a user, videos viewed or shared by a user, etc. One or more blocks of the methods described herein may use such user data in some implementations.

If user consent has been obtained from the relevant users for which user data may be used in the method 500, then in block 504, it is determined that the blocks of the methods herein can be implemented with possible use of user data as described for those blocks, and the method continues to block 508.

If user consent has not been obtained, it is determined in block 506 that blocks are to be implemented without use of user data, and the method continues to block 508. In some implementations, if user consent has not been obtained, blocks are to be implemented without use of user data and with generic or publicly-accessible data.

Some implementations described herein, e.g., related to FIG. 5, may provide suggested standardized message stickers to be used as responses to received messages. Suggested message stickers may be provided in a variety of contexts. For example, suggested message stickers may be provided in response to receiving a message at a server and/or at a client device 115*a* of a particular user (e.g., user 125*a*) from any of client devices 115, e.g., by a messaging application 103. For example, messaging application 103*a*/103*b* may be an instant messaging application, a social network application, an email application, a multimedia messaging application, and the like.

Suggested message stickers may be generated and provided to the particular user automatically, if consent for such operations has been obtained from the particular user and one or more other users that sent and/or received the image. For example, if the messaging application is an instant messaging application, a message may be received as part of an instant messaging communication between the particular user 125*a* and one or more other users 125, e.g., in a messaging session (e.g., chat) having two participants, in a group messaging session that includes more than two participants, etc. In various implementations, one or more of the users may be bots, similarly as described for FIG. 3.

In some implementations, suggested message stickers may be provided specifically to those users that have provided consent to access user data. In some implementations, suggested message stickers may be provided automatically or based on user input, e.g., a user may be provided a user interface to request suggestions.

In block 508, a message is received, which has been sent from a first user to a second user, e.g., over a communication network. In various implementations, the message may be a text message, an image (e.g., a static image, a cinemagraph or animated image, etc.), a video, audio data for an audio message, etc. In some implementations, the message can include a message sticker, e.g., similarly as described for FIG. 3. In some implementations, a combination of two or more of these types of content are included in the message.

In some examples, the message may have been sent by a first device that is one or more client devices 115 (or other devices), or by a bot that sends messages, and the message may be received by a second device that is a client device 115 (or other device) via network 140. In a further example, in a one-on-one (1:1) messaging session with two participants, the message is received by a client device of a particular user.

In a further example, in a group messaging session, the message is received by two or more client devices of participants in the group messaging session. In some implementations, the message may be obtained from storage, e.g., local storage of a client device 115 (e.g., memory, storage drive, etc.) and/or remote storage accessible to a client device over network 140 (e.g., storage drives of a remote client device, server device, or storage device). For example, in some implementations, the first device stores the message on the storage device, and the second device obtains the message from the storage device.

In an example relating to the system 200 of FIG. 2, the received message is sent by first user 202 using first user device 204. In some implementations, in block 408, the message sent by the first user device 204 is received by a client device, e.g., second user device 208 as shown in FIG. 2, and/or by a server device, e.g., the server interface 210 of FIG. 2. For example, the server interface 210 can receive the message from the first user device and forward the message to the second user device 208 and provide a copy of the message to the sticker suggestion module 212, similarly as described above for FIG. 3.

In block 510, a list of descriptors (e.g., description and/or keyword(s)) is determined for available message stickers. For example, in some implementations the list can include the descriptions and keywords for all of the available message stickers (or a subset thereof) that can be used by the first user device 204 and the second user device 208. In some implementations, the message stickers that are used to provide this information are the message stickers having the latest version number. For example, the descriptors can be stored in storage, e.g., in sticker data module 214 as described above. In some implementations, a server (e.g., server interface 210 or sticker suggestion module 212) can access the sticker data module 214 to obtain the list of descriptors. In some implementations, the descriptors (e.g., which can include words determined from the descriptions) are grouped into a single list of descriptors. Some implementations can cache the list of descriptors in memory of the performing device (e.g., a server in some implementations), e.g., if version numbers have not been changed for the cached message stickers.

In block 512, one or more suggested responses are determined or generated based on the received message. In some implementations, suggested responses are generated based on semantic concepts detected in the received message, e.g., a mapping of the semantic concepts to particular suggested responses, similarly as described above. The suggestion generator 216 can consult databases 218 to determine suggested responses (e.g., text responses) based on the message, e.g., using stored associations, mapping models, and/or machine learning models similarly as described for block 416 of FIG. 4. In some examples, the suggested responses can be obtained from a set or library of stored suggested responses, e.g., that are synthetic responses or responses obtained from actual users in previous device communications (e.g., using messaging applications), if user consent has been obtained.

In some implementations, one or more of the suggested responses can also be based on the list of descriptors of available message stickers determined in block 510. For example, one or more suggested responses can be generated in the form of one or more descriptors (e.g., keywords or descriptions) that are present in the list of descriptors. In some implementations, e.g., with respect to FIG. 2, the sticker suggestion module 212 can send the list of descriptors to the response suggestion generator 216. The sticker descriptors in the list can be used as or used to provide one or more concepts that are matched to concepts in the suggested responses determined as described above. For example, if a suggested response is determined as "cute dog!", the suggestion module 212 or suggestion generator 216 can check the list of descriptors to find keywords that match or partially match the words in this suggested response. For example, the keyword "dog", the keyword "cute", and the description "cute dog" may be found in the list (as separate descriptors) which match this suggested response. Additional suggested responses can then be generated in the form of these matched descriptors, e.g., a suggested response can be "dog" and another suggested response can be "cute." In some implementations, a suggested response of "cute dog!" can be modified to be "cute dog" that matches the description in the list of descriptors.

In some implementations, the semantic concepts detected in the received message can be directly compared to the list of sticker descriptors, and descriptors which match the detected concepts (e.g., match partially or exactly, and/or semantically as described herein) are generated as suggested responses.

In block 514, at least one of the suggested responses is provided to the second user. In some implementations, the provided suggested responses are sent from a server device to the second user device. For example, with respect to FIG. 2, the suggested responses can be sent from sticker suggestion module 212, via server interface 210, to second user device 208. In some implementations or cases, there may be multiple recipient devices receiving the suggested responses. Some implementations can alternatively or additionally send to the second user device the semantic concepts determined in the received message, e.g., to allow the second user device to compare such semantic concepts to stored associations as described below.

In some implementations, the suggested responses are displayed by the second device as response options (e.g., text responses) which can be selected by user input at the second user device to cause the second user device to send a message corresponding to the selected response option. For example, such suggested responses can be displayed and selected in addition to suggested message sticker responses determined and displayed as described below.

In block 516, user input from the second user requests that one or more sticker suggestions be provided, from which the second user can select. For example, in some implementations, block 516 is implemented by the second user device 208, where the user input is provided to the second user device 208 to command a display of a user interface (e.g., window or other display area) that displays a list of message stickers.

In block 518, in response to the user input of block 516, descriptors (e.g., keywords and descriptions) are determined for message stickers available on the second user device (e.g., "device descriptors"). For example, the second user device can scan through the message stickers stored on the second user device and determine the descriptions and keywords for these message stickers. In some implementations, the second user device can retrieve descriptors from a data source such as sticker data module 214 similarly as described above, e.g., via direct access to the sticker data module 214 or via server interface 210 and/or sticker suggestion module 212. In some implementations, block 518 is performed at other times or under other conditions instead of in response to the user input of block 516, e.g., upon startup of the second user device, in response to the second user device installing additional message stickers, etc.

In block 520, the device descriptors for message stickers on the second user device are compared to the suggested responses determined in block 512, e.g., by the second user device, and one or more device descriptors are matched with one or more of the suggested responses. For example, if the suggested responses are in a form of suggested descriptors obtained from the list of descriptors of available message stickers as described above, these received descriptors can be compared to the device descriptors of the message stickers stored on the second user device. For example, the descriptors of a message sticker can be considered semantic concepts associated with that message sticker.

In some implementations, the matches are correspondences that include approximate or inexact matches. For example, if there is a threshold percentage of matching letters, if there is a similarity score or confidence score over a threshold in a matching process, past tense and plural forms of words can be ignored, etc. In some implementations, the correspondence is a semantic similarity that is checked, e.g., using an accessible dictionary, thesaurus, knowledge graph, and/or other reference information to determine whether the meanings of the descriptors and the suggested responses are the same, similarly as described herein for other blocks and methods determining correspondences.

In block 522, one or more suggested message stickers are determined and provided based on the comparisons of block 520, e.g., displayed on the second user device. In some implementations with respect to FIG. 2, the second user device 208 can determine and rank the one or more suggested message stickers. For example, the message stickers having descriptors that have been determined to correspond to suggested responses (e.g., suggested text responses) for the received message can be included in the set of suggested message stickers.

In some implementations, the device descriptors of the message stickers on the second user device are compared to the generated suggested responses, and if any device descriptor corresponds to (e.g., matches) a suggested response, the message sticker that corresponds to that matching device descriptor is selected as a suggested message sticker. matches are checked for the correspondence, e.g., matches between the letters of words that are in the same sequence, and/or matches of multiple words in the same sequence. In some implementations, exact and inexact matches are used or allowed for the correspondences, and a similarity between the device descriptors and suggested responses can be checked (e.g., differences caused by past tense and plural forms of words can be ignored, etc.). In some examples, a similarity score can be determined for device descriptors with respect to suggested responses (e.g., each device descriptor with respect to each suggested response), which indicates the degree of similarity between a descriptor and a suggested response. For example, the similarity score can be based on the number or percentage of letters in a particular order that match.

In some implementations, the system checks for a semantic similarity as the correspondence, e.g., using an accessible dictionary, thesaurus, knowledge graph, and/or other reference information to determine whether the meanings of the device descriptors and the suggested responses are the same. In some implementations, a sticker similarity score can be determined for a message sticker and a suggested response, based on individual similarity scores determined for each descriptor of that message sticker. For example, the sticker similarity score can be a sum of the individual similarity scores determined for the descriptors.

In some implementations, the message sticker having the highest similarity to a suggested response is selected for that suggested response, e.g., based on the similarity score. In some examples, the message sticker having the highest similarity score for a suggested response is selected for that response. In further examples, message stickers can be selected based on a degree of similarity, where higher similarity can be determined based on, e.g., the greater number of matching words in the device descriptors of the message sticker corresponding to words in the suggested response, and/or the higher score in a determination of semantic similarity between device descriptors and the suggested response. In some implementations, multiple message stickers are determined to correspond to a particular message suggestion, e.g., a particular number of message stickers having the highest similarity to the message suggestion.

In some implementations, the semantic concepts that were determined in the received message (message concepts) are provided to the second user device, and the second user device can compare these message concepts to stored semantic concepts that have been associated directly with particular suggested message sticker responses. These suggested stickers have been stored in association with the stored concepts as suggested responses to the stored concepts. For example, the message concepts can be checked for correspondence to the stored concepts similarly as described herein (e.g., checked for matches, semantic similarity, partial matches, etc.), and if the message concept matches or corresponds to a stored concept, then the suggested sticker response(s) that are associated with that stored concept are selected for block 418. In some examples, the device descriptors of the message stickers on the second device can be used as the stored semantic concepts.

The determined suggested message stickers can be ranked with respect to each other. For example, the placement or rank of a message sticker in the ranking can be based on a rank of the message suggestion associated with that message sticker with respect to other message suggestions. In further examples, the ranks of suggested message stickers can be based on a strength of correspondence between the suggested message stickers and their associated suggested responses. For example, the placement or rank of a message sticker in the ranking can be based on the number of matches (correspondences) between the associated suggested response and the device descriptors of that message sticker.

In some examples, the number of matches can be the number of words or phrases in the device descriptors that match the words of a suggested response. In some examples, if there are multiple matches between the words suggested response and the device descriptors of a first message sticker, the first message sticker has a stronger (e.g., higher) rank than a second message sticker that has a single device descriptor that matches the words of the suggested response.

In some implementations, confidence scores are used in determining correspondence between suggested responses and message stickers (e.g., to determine correspondence of semantic meaning), and these scores are used to rank the message stickers based on the confidence of the correspondence between message stickers and the suggested responses. In some implementations, a particular number of the top-ranking message stickers are determined as suggested message stickers and provided by the second device. For example, in some implementations with respect to FIG. 2, the second client device is caused to display a particular number of the top-ranking message stickers, e.g., in a user interface as requested by the second user in block 516. For example, the top-ranking message stickers can be displayed in an order or configuration based on their ranks.

In block 524, a selection of one or more of the displayed suggested message stickers is received, e.g., to send in response to the received message (or to a newly-designated recipient user). For example, the selection can be based on user input provided by the user at the user device, e.g., via an input device such as a touchscreen or trackpad receiving a user touch, a microphone receiving a voice command, a button, mouse, or joystick receiving user manipulation, etc. In some implementations with respect to FIG. 2, the second user 206 provides the user input at the second user device 208. In some implementations, one or more of the suggested message stickers are selected automatically (without user input), e.g., based on user preferences, user context (e.g., geographic location, time or date, etc., if user consent has been obtained), or other predefined conditions.

In block 526, the selected suggested message sticker(s) are output as one or more messages to one or more recipient devices. For example, a message including the selected message sticker can be sent over the network 140 to one or more other client devices 115 via messaging server 101 and/or directly to the other client devices 115. In some implementations, the message is sent to the user device that sent the image obtained in block 408. For example, with respect to FIG. 2, the second user device 208 sends the selected message sticker(s) to the first user device 204. The method can then return to block 508 in some implementations, e.g., if another message has been received.

In some implementations, personalized or custom stickers can be available for the suggested message sticker responses described for the implementations herein. In some examples, a custom sticker may have a similar sticker ID and sticker set ID as a corresponding standardized sticker, and may also be associated with image data customized for a particular user. For example, such a custom message sticker can be displayed with the custom image data when displayed on the user's device, and can be displayed with the standard image data on other devices (or be displayed customized for those user devices, if applicable). For example, customized image data can be stored in association with standardized sticker information stored on the device(s) used by the user. In some implementations, custom message stickers can be stored and displayed as new stickers for the user's device.

In any of the implementations described herein, metadata files containing information about sticker sets and individual stickers can be maintained by a system, e.g., to allow consistent data to be referenced related to message stickers. For example, metadata about sticker sets can be stored in a global metadata file (or other collection of data). In some examples, the global metadata file can be stored in sticker data module 214. The metadata can include sticker ID, sticker set ID, and version number as described above. In some implementations, sticker metadata is designated that it cannot be changed once it has been referenced by the global metadata file. In some implementations, client devices are notified to update message stickers that have a version newer than the version stored at the client devices.

Some implementations can allow users to download message stickers and sticker sets that are relevant to their device's capabilities, e.g., low resolution (e.g., DPI) devices can download low resolution sticker sets and need not download not higher resolution sticker sets.

Current version data can be maintained for message stickers. In some implementations, version polling can be used. The latest version of a message sticker can reference the latest version of a global metadata file, where the global metadata file can reference the version of each sticker set to be used by users. In some implementations, client devices can determine when and/or how often to poll for the latest version of message stickers. Client devices can request new metadata or message stickers for sticker sets whose versions have changed. In some implementations, if a message sticker is added, removed, or updated in the sticker data module 214, users who have downloaded that sticker may be required to re-download the entire sticker set in which that message sticker is included.

In some implementations, one or more client devices are responsible for managing the device's own versioned stickers. In some cases, e.g., during a time period when a sticker set is updated, client devices may send and receive messages that refer to message stickers from a previous version, or a version the devices do not currently have. In the former case, client devices can retain previously stored versions of message stickers so that the devices can render sticker messages that reference older versions without having to re-download those message stickers. If a device does not have stored a newer version of a message sticker, in some implementations, when the device receives such a sticker message that references a newer sticker set version, the device can first download the message sticker data (e.g., image data) to display, and then can trigger a sticker version synchronization in order to retrieve updated metadata and/or other data (e.g., thumbnail versions of the message sticker).

In some implementations, message stickers are sent by reference. For example, instead of sending the actual message sticker data (e.g., pixel data or frames for a sticker image or animation), sticker ID information can be sent, e.g., parameters such as sticker ID, sticker set ID, and version number. This may reduce latency in sending sticker messages and reduce message payload size. Utilizing such parameters, client devices can determine whether the devices have a particular message sticker stored in their local cache or other local storage, or whether the devices need to retrieve (e.g., download) that message sticker and metadata from a different device storing the message sticker. In some examples, if a message sticker is to be retrieved, a URL or other network address at which to retrieve the message sticker can be generated using the values of the parameters.

Some implementations can perform validation and testing of message stickers, e.g., to validate the fidelity of the sticker messages and references to the data stored in the sticker data module. Tests can be performed, e.g., on changes to a message sticker directory or other data collection. For example, it can be checked that the current version data references an existing sticker set metadata file, that the global metadata file references sticker set versions that exist, that a downloadable sticker set includes a thumbnail image for each message sticker in the set, that the message sticker image data is appropriately sized (e.g., low resolution or high resolution according to predefined sizes), etc.

Implementations generally relate to messaging applications. Certain implementations may automatically analyze image content of one or more messaging conversations and/or user information to automatically provide message suggestions to a user within a messaging application. In certain examples, the automatic suggestions may provide one or more appropriate responses to be selected by a user to respond in the messaging application, and/or may automatically send one or more appropriate responses on behalf of a user. In certain other examples, the suggestions may automatically incorporate particular non-messaging functionality into the messaging application.

While the foregoing description includes techniques to provide message suggestions in response to receiving a message or message sticker, message suggestions may be provided in response to any type of media content that is received in a conversation. For example, such content may include stickers (e.g., in a chat application), animated images (e.g., cinemagraphs, GIF images, etc.), and videos. Further, while the foregoing description describes message suggestions as text or sticker responses, other types of responses may also be suggested, e.g., based on analysis of a received message or sticker. For example, other responses may include one or more of a suggested image, a suggested animated image (e.g., cinemagraph, GIF image, etc.), a suggested video, and a suggested audio segment or clip.

To provide these suggestions, suggestion generator 216 may perform, e.g., a comparison of identified concepts in a received item (e.g., text, image, video, sticker, animated image, etc.) with concepts in different types of responses, and select a suitable response, as described herein with reference to message suggestions. In different implementations where users provide consent, the type of response may be selected or prioritized based on context, e.g., a sticker may be selected as a suggested message in response to an incoming sticker, a video may be selected as a suggested response in response to an incoming image, etc.

Certain implementations enable messaging with human users and/or chat bots. In certain implementations, automatic message suggestions may be customized based on whether a chat bot is participating in the messaging conversation. In some examples, a first set of automatic message suggestions may be provided if a chat bot is absent in a messaging conversation, while a second set of automatic message suggestions may be provided if a chat bot is present in the messaging conversation, where the first and second sets of responses are at least partially different. For example, these implementations may employ conversational rules followed by the chat bot, and suggest messages to a user based on the rules. This can mitigate challenges that users may have in communicating with chat bots in a language and in a format that is easily understood by the chat bots.

Some implementations can include determining one or more trending responses (e.g., message responses including popular message content sent by many different users) based on other messages in at least one of a region, market, and country related to a location of a user. One or more determined message suggestions may include one or more trending responses. In some implementations, a user context, e.g., a geographic location, holiday or an event, etc., are used to generate and determine for presentation one or more of the message suggestions.

Determining the suggested response may be further based on using machine learning to develop a personalized model for a user. Determining suggested responses may be based on preferences of the user and/or prior actions of the user in communications (if user consent for use of such actions and data has been obtained). For example, user preferences may include a whitelist indicating particular words (or other media content items) which can be included and/or a blacklist indicating particular words which cannot be included in message suggestions. If user consent has been obtained, message suggestions can be generated or modified based on one or more of punctuation use, emoji use, or other content provided by the user on previous occasions.

Models used to provide message suggestions may be implemented by a client device 115 and/or a messaging server 101. In some implementations, conversations may be encrypted such that only client devices of participants in the conversation can access conversation content. In these implementations, models implemented by a respective client device may be used to provide message suggestions and models implemented by a server are not used. Models implemented by a client device may also be used, e.g., when the user does not provide consent for use of models implemented by a server. In some implementations, client implemented models may be based on or derived from server implemented models. In some implementations, server models may be used and client models may not be used, e.g., when a client device lacks capability to implement client models. In some implementations, a combination of client and server models may be used.

While the examples described in this document utilize concepts illustrated in English, suggestions may be provided in any language, e.g., a language, locale or other geographic configured for a client device 115, a language selected based on a user preference, etc. In some implementations, where users provide consent for analysis of context of a conversation, a language that is used in various conversations (e.g., in recent messages) involving the user can be detected and message suggestions are provided in that language.

Figure 6:
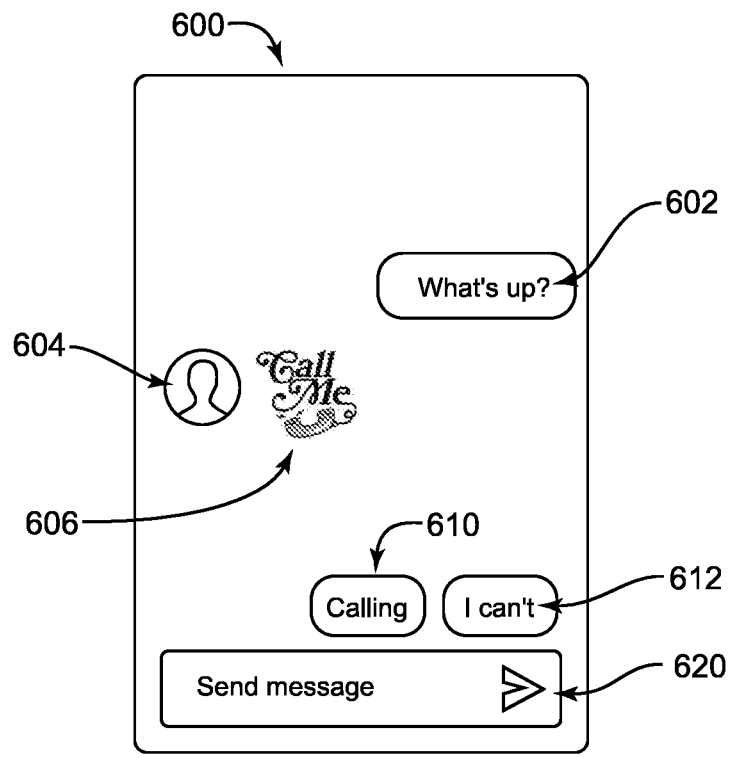
FIGS. 6-7 are graphic representations of an example displayed user interface in which suggested responses are provided in response to receiving a message sticker, according to some implementations.

FIG. 6 shows an example user interface 600 with message suggestions in response to receiving a message sticker. User interface 600 can be displayed on a user device, e.g., a client device in some implementations. In the example shown in FIG. 6, a first user using the user interface 600 displayed on a first user device sends a message "What's up?" 602 over a network to a second user device. The second user 604 responds with a message sticker 606 that is received by the first user device and is displayed in the user interface 600. In the example shown in FIG. 6, the message sticker is an image that includes stylized text "Call Me" along with a depiction of a telephone.

In response to receiving the message sticker, one or more suggested responses are provided in the first user interface. For example, the suggested responses may include a text response "Calling" 610 and another text response "I can't" (612). The user interface 600 permits the first user to select from the suggested responses 610 and 612 or compose their own response using a message box 620 in which the first user may enter text or other information, or select other content items to send. In the example shown in FIG. 6, one or more of the suggested responses may be based on receiving the message sticker 606. In some implementations, if the first user provides consent, the suggested responses may be personalized for the first user. For example, the suggested responses may be determined based on a frequency of use of different responses by the first user, a conversation style of the first user (e.g., playful, formal, etc.) In some examples, the first user 702 is a human user. In some implementations, the first user 702 may be a bot.

Figure 7:
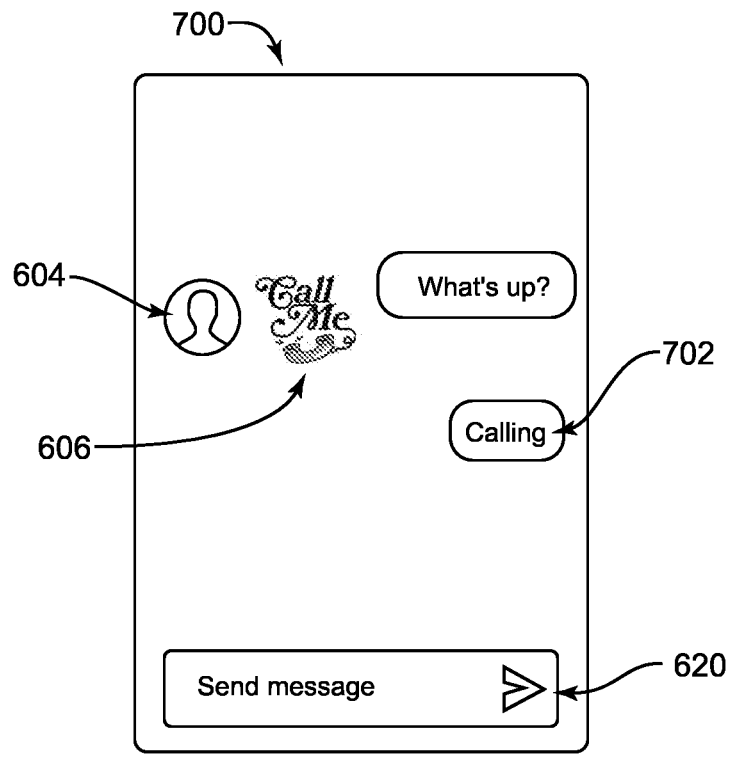

FIG. 7 shows an example user interface 700 which follows from FIG. 7 and that may be displayed when the first user selects a suggested response, e.g., element 610 of FIG. 6. The user interface of FIG. 7 includes elements 602-606 and 620 described above in connection with FIG. 6. For ease of illustration, some reference numerals are omitted from FIG. 7. Upon user selection of the element 610, the response "Calling" 702 is sent to the second user device.

Figure 8:
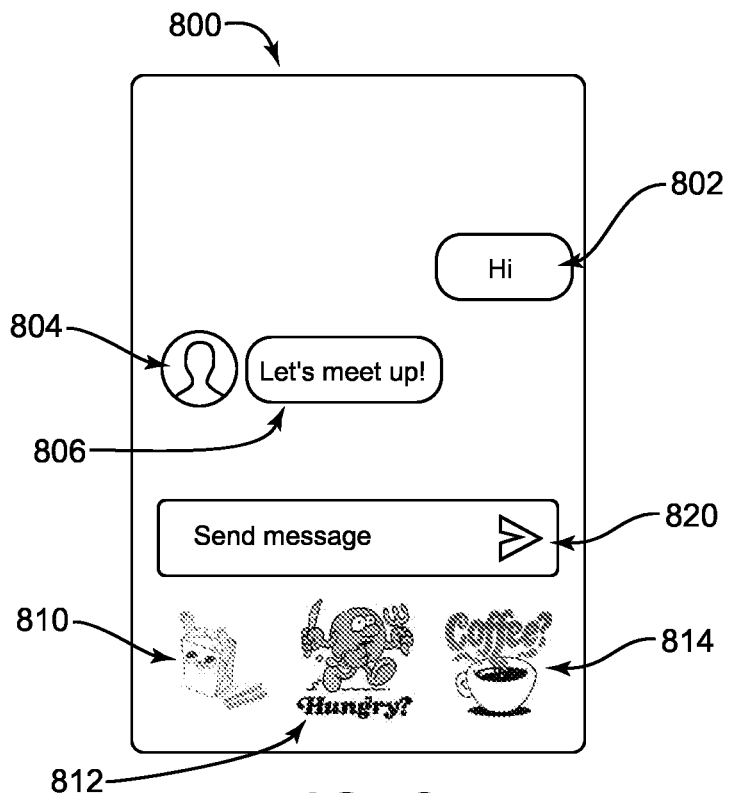
FIGS. 8-9 are graphic representations of an example displayed user interface providing suggested responses that include location suggestions, according to some implementations.

FIG. 8 shows an example user interface 800 with suggested responses that include one or more message stickers. In the example shown in FIG. 8, a first user sends a message "Hi?" 802 to a second user device. The second user 804 responds by sending a message "Let's meet up!" 806 to the first user device, which is displayed in user interface 800.

In response to receiving the message, one or more suggested responses that include message stickers are provided in the first user interface 800. For example, the suggested responses include message sticker responses 810, 812 and 814 which each indicate the displayed appearance (e.g., image data) of the message sticker that will be transmitted if the message sticker response is selected. The user interface permits the user to select a particular message sticker from the suggested responses or compose their own response using a message box 820 in which the user may enter text and/or other information, e.g., select from one or more stickers available in the messaging application. In the example shown in FIG. 8, message sticker responses 810, 812 and 814 may be selected by the system and provided as suggested responses based on the conversational context. For example, it may be determined that a likelihood of the message sticker responses 810, 812 and 814 being selected by the first user is high, based on the received message 806.

In some implementations, if the user has provided consent, the message stickers included as suggested responses may be personalized for the first user. For example, the suggested message stickers may be determined based on sticker sets that are available locally on the user's device (e.g., client device 115), sticker sets that the user has purchased, sticker sets that are popular among users at the time the message 806 is received, a location of the first user, a language setting of the first user, a language used by the user in communicating via the messaging application, popularity of various sticker sets, etc.

Figure 9:
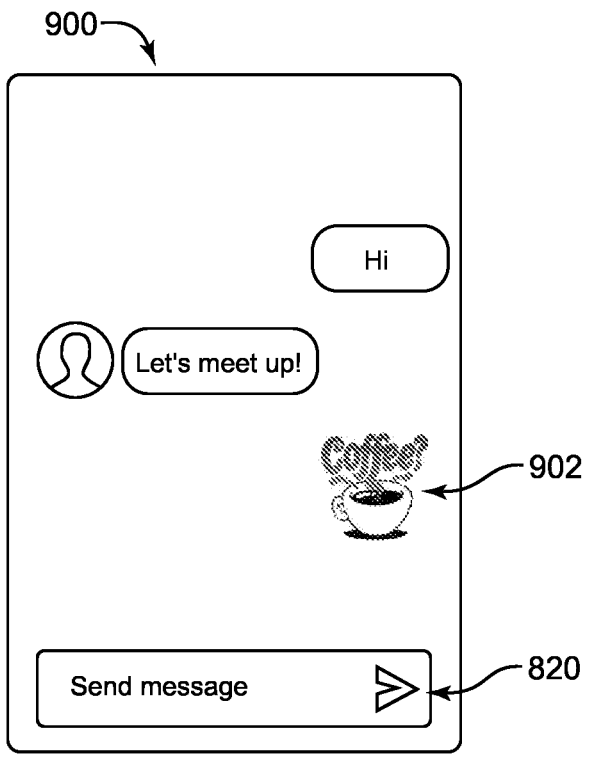

FIG. 9 shows an example user interface 900 which follows from FIG. 8 and that may be displayed when the user selects a suggested response, e.g., suggested message sticker response 814 of FIG. 8. The user interface of FIG. 9 includes elements 802-806 and 820 described above in connection with FIG. 8. For ease of illustration, some reference numerals are omitted from FIG. 9. Upon user selection of the element 814, the response 902 that includes the message sticker 814 is sent to the second user device.

Figure 10:
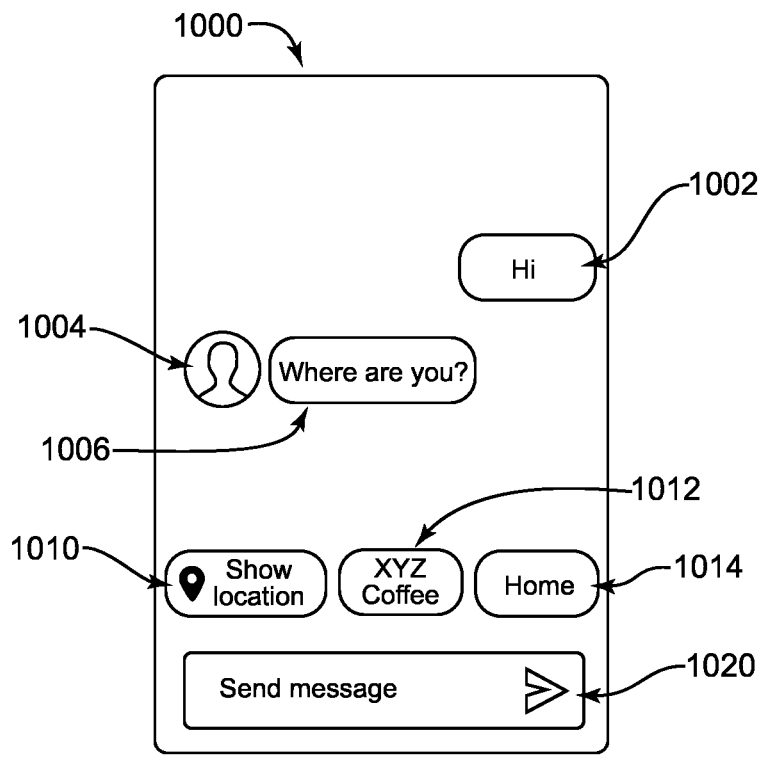
FIGS. 10-11 are graphic representations of example of user interfaces displaying suggested responses to received images, according to some implementations.

FIG. 10 shows an example user interface 1000 with message suggestions that include one or more location suggestions. The location suggestions can be based on one or more messages sent in a communication. In the example shown in FIG. 10, a first user using user interface 1000 on a first user device sends a message "Hi" (1002) to a second user device. A second user 1004 responds to the message with a message "Where are you?" (1006) that has been sent from the second user device to the first user device and displayed in user interface 1000.

Based on analysis of this message context, if the users have provided consent for such analysis, it is determined whether a location response may be appropriate. In some implementations, it is determined that a location response is appropriate, e.g., based on determining that the conversation is about locations, e.g., messages in the conversation include particular phrases (stored in accessible storage and compared to) such as "where are you," "let's meet up," etc. In some implementations, the conversation context may be analyzed to determine that the conversation is about a specific location. For example, if a message in the conversation is "Where is the game tonight?" a suggested response may be a stadium associated with a user's city. In another example, if a message in the conversation is "Where is Jim's house?" a suggested response may be an address associated with a contact "Jim" in the user's associated address book. In some implementations, a location suggestion may be triggered, e.g., based on one or more entities in the conversation, e.g., "Let's meet at XYZ Coffee."

When it is determined that a location response is appropriate and that the user has provided consent to obtaining and sharing their location, the messaging application may provide a suggested response that shares the user's location. For example, in FIG. 10, user interface elements 1010, 1012 and 1014 that each correspond to a suggested response are caused to be displayed in the user interface 1000. The first user can select any of the elements 1010, 1012, and 1014 to respond to the message 1006. Alternatively, the user can compose a message using a message box 1020 in which the user may enter text and/or other information.

If the user selects element 1010, in some implementations, the user's location may be obtained, e.g., using GPS, cellular triangulation, or other mechanisms involving the first user device. In some implementations, a link to a map (e.g., a URL) may be determined based on the user's location and sent in a message, in response to user selection of the element 1010. In some implementations, an image or diagram is sent as a message showing a map that indicates the location of the first user device, in response to user selection of the element 1010.

In some implementations, the messaging application may look up maps and other location information sources (e.g., accessible over a network and Internet) with the first user device's current geographical coordinates to obtain a place name (e.g., "XYZ Coffee", "Football Stadium," etc.) which may then be provided as a suggested response. For example, element 1012 in this example has been determined by the first user device referencing map and location information with the current location of the first user device and finding the name of the establishment in which the device is currently located. If the user selects element 1012, a response may be sent that includes the text "XYZ Coffee."

In some implementations, upon selection of the element 1012, a formatted response may be sent, e.g., the response may be formatted as a card that includes information about XYZ Coffee (e.g., an image, a phone number, operating hours, etc.). In some implementations, upon selection of the element 1012, a response may be sent that includes a link to "XYZ Coffee" (e.g., to cause reception of data for, and display of, a website or social media account of "XYZ Coffee" over the network), where the link is displayed and is selectable by user input on device(s) receiving the response.

In various implementations, location suggestions may be provided in a language, e.g., a language of the conversation, or a language determined based on a user's location or other factors. In different implementations, conversation context may be determined by using a machine learning model that can analyze strings in multiple languages. In some implementations, conversations in a language other than English may be translated to English for processing by the machine learning model. In some implementations, the machine learning model may be trained on a native corpus of the detected language.

Figure 11:
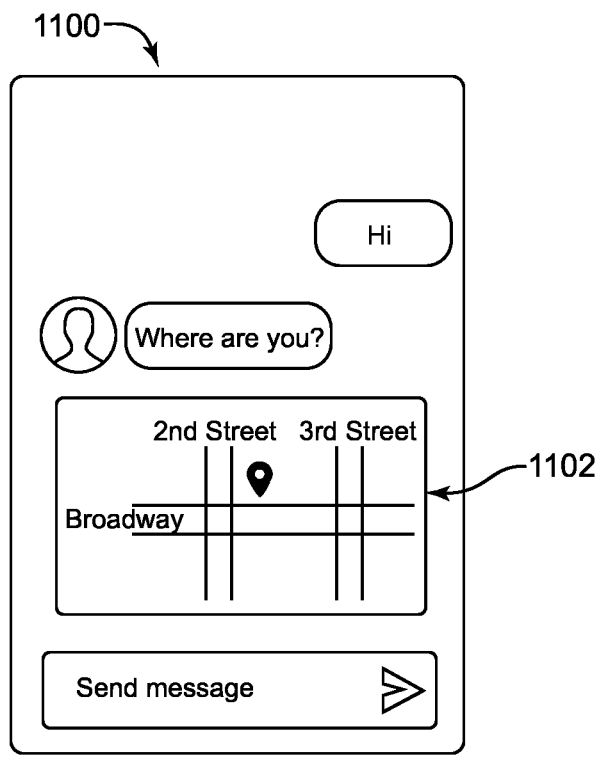

FIG. 11 shows an example user interface 1100 which follows from FIG. 10 and that may be displayed when the user selects a suggested response, e.g., element 1010 of FIG. 10. The user interface of FIG. 11 includes elements 1002-1006 and 1020 described above in connection with FIG. 10. For ease of illustration, some reference numerals are omitted from FIG. 11. Upon user selection of the element 1010, a map 1102 (e.g., a thumbnail, an interactive map, etc.) is sent as the response, where the map can indicate the user's location, e.g., graphically with a pointer as shown. Some implementations can provide suggestions of geographic locations for a future meeting place, event, or other location indicated in the conversation of the messaging application, if user consent has been obtained to use such data, and such locations can be displayed in the messaging interface in response to selection of the location suggestion.

Bot Implementations

One or more bots can be implemented with one or more features described herein, e.g., bots can be implemented by or accessed by one or more components of environment 100 of FIG. 1. A bot is an automated service, implemented on one or more computers, that users interact with, e.g., through text, such as via messaging application 103a/103b (see FIG. 1) or other applications, etc. A bot may be implemented by a bot provider such that the bot can interact with users of various messaging applications. In some implementations, a provider of messaging application 103a/103b may also provide one or more bots. In some implementations, bots provided by the provider of messaging application 103a/103b may be configured such that the bots can be included in other messaging applications, e.g., provided by other providers.

A bot may provide several advantages over other modes. For example, a bot may permit a user to try a new service (e.g., a taxi booking service, a restaurant reservation service, etc.) without having to install an application on a client device, or accessing a website. Further, a user may interact with a bot via text, which requires minimal or no learning compared with services used via a web site, software application, a telephone call, e.g., to an interactive voice response (IVR) service, or other manners of interacting with a service. Incorporating a bot within a messaging service or application may also permit users to collaborate with other users to accomplish various tasks such as travel planning, shopping, scheduling events, obtaining information, etc. within the messaging service, and eliminate cumbersome operations such as switching between various applications (e.g., a taxi booking application, a restaurant reservation application, a calendar application, etc.) or websites to accomplish the tasks.

A bot may be implemented as a computer program or application (e.g., a software application) that is configured to interact with one or more users (e.g., any of the users 125a-n) via messaging application 103a/103b to provide information or to perform specific actions within the messaging application 103. As one example, an information retrieval bot may search for information on the Internet and present the most relevant search result within the messaging app. As another example, a travel bot may have the ability to make travel arrangements via messaging application 103, e.g., by enabling purchase of travel and hotel tickets within the messaging app, making hotel reservations within the messaging app, making rental car reservations within the messaging app, and the like. As another example, a taxi bot may have the ability to call a taxi, e.g., to the user's location (obtained by the taxi bot from client device 115, when a user 125 permits access to location information) without having to invoke or call a separate taxi reservation app. As another example, a coach/tutor bot may tutor a user to instruct the user in some subject matter within a messaging app, e.g., by asking questions that are likely to appear on an examination and providing feedback on whether the user's responses were correct or incorrect. As another example, a game bot may play a game on the opposite side or the same side as a user within a messaging app. As another example, a commercial bot may provide services from a specific merchant, e.g., by retrieving product information from the merchant's catalog and enabling purchase through a messaging app. As another example, an interface bot may interface a remote device or vehicle so that a user of a messaging app can chat with, retrieve information from, and/or provide instructions to the remote device or vehicle.

A bot's capabilities may include understanding a user's intent and executing on it. The user's intent may be understood by analyzing and understanding the user's conversation and its context. A bot may also understand the changing context of a conversation or the changing sentiments and/or intentions of the users based on a conversation evolving over time. For example, if user A suggests meeting for coffee but if user B states that he does not like coffee, then a bot may assign a negative sentiment score for coffee to user B and may not suggest a coffee shop for the meeting.

Implementing bots that can communicate with users of messaging application 103a/103b may provide many advantages. Conventionally, a user may utilize a software application or a website to perform activities such as paying bills, ordering food, booking tickets, etc. A problem with such implementations is that a user is required to install or use multiple software applications, and web sites, in order to perform the multiple activities. For example, a user may have to install different software applications to pay a utility bill (e.g., from the utility company), to buy movie tickets (e.g., a ticket reservation application from a ticketing service provider), to make restaurant reservations (e.g., from respective restaurants), or may need to visit a respective website for each activity. Another problem with such implementations is that the user may need to learn a complex user interface, e.g., a user interface implemented using multiple user interface elements, such as windows, buttons, checkboxes, dialog boxes, etc.

Consequently, an advantage of one or more described implementations is that a single application enables a user to perform activities that involve interaction with any number of parties, without being required to access a separate website or install and run software applications, which has a technical effect of reducing consumption of memory, storage, and processing resources on a client device. An advantage of the described implementations is that the conversational interface makes it easier and faster for the user to complete such activities, e.g., without having to learn a complex user interface, which has a technical effect of reducing consumption of computational resources. Another advantage of the described implementations is that implementing bots may enable various participating entities to provide user interaction at a lower cost, which has a technical effect of reducing the need for computational resources that are deployed to enable user interaction, such as a toll-free number implemented using one or more of a communications server, a website that is hosted on one or more web servers, a customer support email hosted on an email server, etc. Another technical effect of described features is a reduction in the problem of consumption of system processing and transmission resources required for completing user tasks across communication networks.

While certain examples herein describe interaction between a bot and one or more users, various types of interactions, such as one-to-one interaction between a bot and a user 125, one-to-many interactions between a bot and two or more users (e.g., in a group messaging conversation), many-to-one interactions between multiple bots and a user, and many-to-many interactions between multiple bots and multiple users are be possible. Further, in some implementations, a bot may also be configured to interact with another bot (e.g., bots 107a/107b, 109a/109b, 111, 113, etc.) via messaging application 103, via direct communication between bots, or a combination. For example, a restaurant reservation bot may interact with a bot for a particular restaurant in order to reserve a table.

In certain embodiments, a bot may use a conversational interface to use natural language to interact conversationally with a user. In certain embodiments, a bot may use a template-based format to create sentences with which to interact with a user, e.g., in response to a request for a restaurant address, using a template such as "the location of restaurant R is L." In certain cases, a user may be enabled to select a bot interaction format, e.g., whether the bot is to use natural language to interact with the user, whether the bot is to use template-based interactions, etc.

In cases in which a bot interacts conversationally using natural language, the content and/or style of the bot's interactions may dynamically vary based on one or more of: the content of the conversation determined using natural language processing, the identities of the users in the conversations, and one or more conversational contexts (e.g., historical information on the user's interactions, connections between the users in the conversation based on a social graph), external conditions (e.g., weather, traffic), the user's schedules, related context associated with the users, and the like. In these cases, the content and style of the bot's interactions is varied based on only such factors for which users participating in the conversation have provided consent.

As one example, if the users of a conversation are determined to be using formal language (e.g., no or minimal slang terms or emojis), then a bot may also interact within that conversation using formal language, and vice versa. As another example, if a user in a conversation is determined (based on the present and/or past conversations) to be a heavy user of emojis, then a bot may also interact with that user using one or more emojis. As another example, if it is determined that two users in a conversation are in remotely connected in a social graph (e.g., having two or more intermediate nodes between them denoting, e.g., that they are friends of friends of friends), then a bot may use more formal language in that conversation. In the cases where users participating in a conversation have not provided consent for the bot to utilize factors such as the users' social graph, schedules, location, or other context associated with the users, the content and style of interaction of the bot may be a default style, e.g., a neutral style, that doesn't require utilization of such factors.

Further, in some implementations, one or more bots may include functionality to engage in a back-and-forth conversation with a user. For example, if the user requests information about movies, e.g., by entering "@moviebot Can you recommend a movie?", the bot "moviebot" may respond with "Are you in the mood for a comedy?" The user may then respond, e.g., "nope" to which the bot may respond with "OK. The sci-fi movie entitled Space and Stars has got great reviews. Should I book you a ticket?" The user may then indicate "Yeah, I can go after 6 pm. Please check if Steve can join". Upon user's consent to the bot accessing information about their contacts and upon the friend Steve's consent to receiving messages from the bot, the bot may send a message to user's friend Steve and perform further actions to book movie tickets at a suitable time.

In certain embodiments, a user participating in a conversation may be enabled to invoke a specific bot or a bot performing a specific task, e.g., by typing a bot name or bot handle (e.g., taxi, @taxibot, @movies, etc.), by using a voice command (e.g., "invoke bankbot", etc.), by activation of a user interface element (e.g., a button or other element labeled with the bot name or handle), etc. Once a bot is invoked, a user 125 may send a message to the bot via messaging application 103a/103b in a manner similar to sending messages to other users 125. For example, to order a taxi, a user may type "@taxibot get me a cab"; to make hotel reservations, a user may type "@hotelbot book a table for 4 at a Chinese restaurant near me."

In certain embodiments, a bot may automatically suggest information or actions within a messaging conversation without being specifically invoked. That is, the users may not need to specifically invoke the bot. In these embodiments, if user consent has been obtained, the bot may depend on analysis and understanding of the conversation on a continual basis or at discrete points of time. The analysis of the conversation may be used to understand specific user needs and to identify when assistance should be suggested by a bot. As one example, a bot may search for some information and suggest the answer if it is determined that a user needs information (e.g., based on the user asking a question to another user, based on multiple users indicating they don't have some information). As another example, if it is determined that multiple users have expressed interest in eating Chinese food, a bot may automatically suggest a set of Chinese restaurants in proximity to the users, including optional information such as locations, ratings and links to the websites of the restaurants.

In certain embodiments, rather than automatically invoking a bot or waiting for a user to explicitly invoke a bot, an automatic suggestion may be made to one or more users in a messaging conversation to invoke one or more bots. In these embodiments, if user content has been obtained, the conversation may be analyzed on a continual basis or at discrete points of time, and the analysis of the conversation may be used to understand specific user needs and to identify when a bot should be suggested within the conversation. For example, particular keywords, phrases, or exchanges of words or phrases in the messaging conversation can be detected by a program executing on a device participating in the message conversation, where such keywords or phrases can indicate to invoke a bot and add the bot to the messaging conversation.

In the embodiments in which a bot may automatically suggest information or actions within a messaging conversation without being specifically invoked, such functionality is disabled, e.g., if one or more users participating in the messaging conversation do not provide consent to a bot performing analysis of the user's conversation. Further, such functionality may also be disabled temporarily based on user input. For example, when the users indicate that a conversation is private, analysis of conversational context is suspended until users provide input for the bot to be activated. Further, indications that analysis functionality is disabled may be provided to participants in the conversation, e.g., with a user interface element.

In various implementations, a bot may be implemented in a variety of configurations. For example, as shown in FIG. 1, bot 105 is implemented on client device 115a. In this example, the bot may be a module in a software application that is local to client device 115a. For example, if a user has installed a taxi hailing application on client device 115a, bot functionality may be incorporated as a module in the taxi hailing application. In this example, a user may invoke a taxi bot, e.g., by sending a message "@taxibot get me a cab." Messaging application 103b may automatically cause the bot module in the taxi hailing application be launched. In this manner, a bot may be implemented locally on a client device such that the user can engage in conversation with the bot via messaging application 103.

In another example shown in FIG. 1, bot 107a is shown implemented on client device 115a and bot 107b is shown as implemented on messaging server 101. In this example, the bot may be implemented, e.g., as a client-server computer program, with portions of the bot functionality provided by each of bot 107a (server module) and bot 107b (client module). For example, if the bot is a scheduling bot with the handle @calendar, user 125a may schedule a reminder, by typing "@calendar remind me to pick up laundry in the evening," which may be handled by bot 107b (client module). Continuing with this example, if user 125a tells the bot "check if Jim is free to meet at 4," bot 107a (server module) may contact user Jim (or Jim's scheduling bot) to exchange messages, and provide a response to user 125a.

In another example, bot 109a (server module) is implemented on server 135 and bot 109b (client module) is implemented on client devices 115. In this example, the bot functionality is provided by modules implemented on client devices 115 and server 135, which is distinct from messaging server 101. In some implementations, a bot may be implemented as a distributed application, e.g., with modules distributed across multiple client devices and servers (e.g., client devices 115, server 135, messaging server 101, etc.). In some implementations, a bot may be implemented as a server application, e.g., bot 111 that is implemented on messaging server 101 and bot 113 that is implemented on server 135.

Different implementations such as client-only, server-only, client-server, distributed, etc. may provide different advantages. For example, client-only implementations permit bot functionality to be provided locally, e.g., without network access, which may be advantageous in certain contexts, e.g., when a user is outside of network coverage area or in any area with low or limited network bandwidth. Implementations that include one or more servers, such as server-only, client-server, or distributed configurations may permit certain functionality, e.g., financial transactions, ticket reservations, etc. that may not be possible to provide locally on a client device.

While FIG. 1 shows bots as distinct from messaging application 103, in some implementations, one or more bots may be implemented as part of messaging application 103. In the implementations in which bots are implemented as part of messaging application 103, user permission is obtained before implementing bots. For example, where bots are implemented as part of messaging application 103a/103b, messaging application 103a/103b may provide bots that can perform certain activities, e.g., a translation bot that translates incoming and outgoing messages, a scheduling bot that schedules events on a user's calendar, etc. In this example, translation bot is activated only upon user's specific permission. If the user does not provide consent, bots within messaging application 103a/103b are not implemented (e.g., disabled, removed, etc.). If the user provides consent, a bot or messaging application 103a/103b may make limited use of messages exchanged between users via messaging application 103a/103b to provide specific functionality, e.g., translation, scheduling, etc.

In some implementations, third parties distinct from a provider of messaging application 103a/103b and users 125, may provide bots that can communicate with users 125 via messaging application 103a/103b for specific purposes. For example, a taxi service provider may provide a taxi bot, a ticketing service may provide a bot that can book event tickets, a bank bot may provide capability to conduct financial transactions, etc.

In implementing bots via messaging application 103, bots are permitted to communicate with users only upon specific user authorization. For example, if a user invokes a bot, the bot can reply, e.g., based on the user's action of invoking the bot. In another example, a user may indicate particular bots or types of bots that may contact the user. For example, a user may permit travel bots to communicate with her, but not provide authorization for shopping bots. In this example, messaging application 103a/103b may permit travel bots to exchange messages with the user, but filter or deny messages from shopping bots.

Further, in order to provide some functionality (e.g., ordering a taxi, making a flight reservation, contacting a friend, etc.), bots may request that the user permit the bot to access user data, such as location, payment information, contact list, etc. In such instances, a user is presented with options to permit or deny access to the bot. If the user denies access, the bot may respond via a message, e.g., "Sorry, I am not able to book a taxi for you." Further, the user may provide access to information on a limited basis, e.g., the user may permit the taxi bot to access a current location only upon specific invocation of the bot, but not otherwise. In different implementations, the user can control the type, quantity, and granularity of information that a bot can access, and is provided with the ability (e.g., via a user interface) to change such permissions at any time. In some implementations, user data may be processed, e.g., to remove personally identifiable information, to limit information to specific data elements, etc. before a bot can access such data. Further, users can control usage of user data by messaging application 103a/103b and one or more bots. For example, a user can specify that a bot that offers capability to make financial transactions require user authorization before a transaction is completed, e.g., the bot may send a message "Tickets for the movie Space and Starts are $12 each. Shall I go ahead and book?" or "The best price for this shirt is $125, including shipping. Shall I charge your credit card ending 1235?" etc.

Implementations described herein generally relate to messaging applications. Certain implementations may automatically analyze image content of one or more messaging conversations and/or user information to automatically provide message suggestions to a user within a messaging application. In certain examples, the automatic suggestions may provide one or more appropriate responses to be selected by a user to respond in the messaging application, and/or may automatically send one or more appropriate responses on behalf of a user. In certain other examples, the suggestions may automatically incorporate particular non-messaging functionality into the messaging application.

The foregoing description includes techniques to provide message suggestions in response to receiving a message. Message suggestions may be provided in response to any type of media content that is received in a conversation. For example, such content may include stickers (e.g., in a chat application), animated images (e.g., cinemagraphs, GIF images, etc.), videos, and audio data (e.g., segments or clips). Message suggestions of various types may be suggested, e.g., based on analysis of a received message. For example, other responses may include one or more of a suggested image, a suggested sticker, a suggested animated image (e.g., cinemagraph, GIF image, etc.) and a suggested video. To provide these suggestions, suggestion module 212 may perform, e.g., a comparison of identified concepts in a received item (e.g., text, image, video, sticker, animated image, etc.) with concepts in different types of responses, and select a suitable response, as described above with reference to message suggestions that include text and/or message stickers. In different implementations where users provide consent, the type of response may be selected or prioritized based on context, e.g., a type of response can be selected that is the same type as the received message; for example, a message sticker may be selected as a suggested message in response to an incoming message sticker, a video may be selected as a suggested response in response to an incoming image, etc.

Certain implementations enable messaging with human users and/or chat bots. In certain implementations, automatic message suggestions may be customized based on whether a chat bot is participating in the messaging conversation. In some examples, a first set of automatic message suggestions may be provided if a chat bot is absent in a messaging conversation, while a second set of automatic message suggestions may be provided if a chat bot is present in the messaging conversation, where the first and second sets of responses are at least partially different. For example, these implementations may employ conversational rules followed by the chat bot, and suggest messages to a user based on the rules. This can mitigate challenges that users may have in communicating with chat bots in a language and in a format that is easily understood by the chat bots.

Some implementations can include determining one or more trending responses (e.g., message responses including popular message content sent by many different users) based on other messages in at least one of a region, market, and country related to a location of a user. One or more determined message suggestions may include one or more trending responses. In some implementations, a user context, e.g., a geographic location, holiday or an event, etc., are used to generate and determine for presentation one or more of the message suggestions.

Determining the suggested response may be further based on using machine learning to develop a personalized model for a user. Determining suggested responses may be based on preferences of the user and/or prior actions of the user in communications (if user consent for use of such actions and data has been obtained). For example, user preferences may include a whitelist indicating particular words which can be included and/or a blacklist indicating particular words which cannot be included in message suggestions. If user consent has been obtained, message suggestions can be generated or modified based on one or more of punctuation use, emoji use, or other content provided by the user on previous occasions.

Models, e.g., mapping models (machine-learned models, grammars, associations, etc.), message suggestion models, etc., used to provide message suggestions may be implemented by a client device 115 and/or a messaging server 101. In some implementations, conversations may be encrypted such that only client devices of participants in the conversation can access conversation content. In these implementations, models implemented by a respective client device may be used to provide message suggestions and models implemented by a server are not used. Models implemented by a client device may also be used, e.g., when the user does not provide consent for use of models implemented by a server. In some implementations, client implemented models may be based on or derived from server implemented models. In some implementations, server models may be used and client models may not be used, e.g., when a client device lacks capability to implement client models. In some implementations, a combination of client and server models may be used.

While the examples described in this document utilize concepts illustrated in English, suggestions may be provided in any language, e.g., a language, locale or other geographic configured for a client device 115, a language selected based on a user preference, etc. In some implementations, where users provide consent for analysis of context of a conversation, a language that is used in various conversations (e.g., in recent messages) involving the user may be detected and message suggestions are provided in that language.

Figure 12:
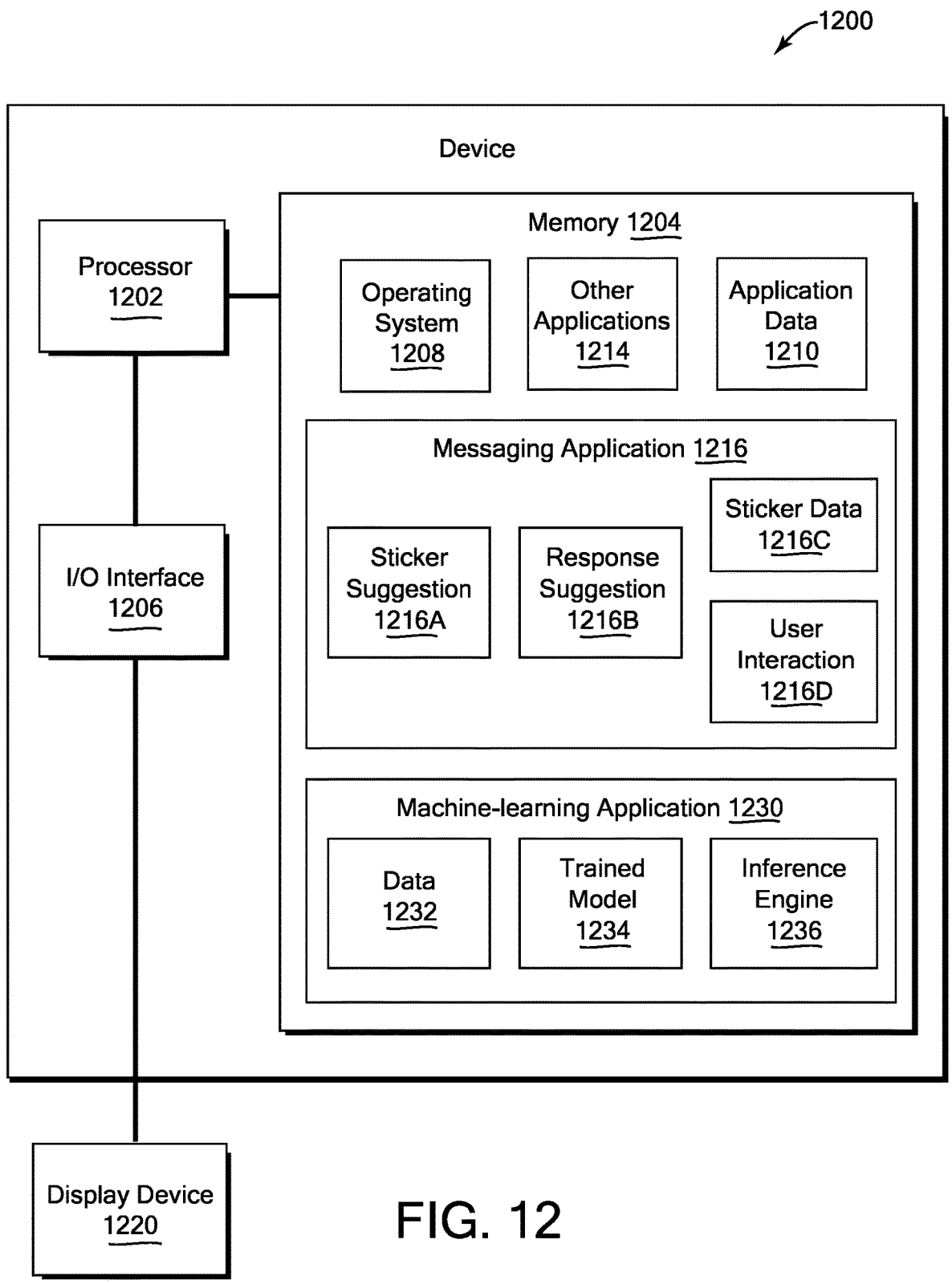
FIG. 12 is a block diagram of an example device which may be used for one or more implementations described herein.

FIG. 12 is a block diagram of an example device 1200 which may be used to implement one or more features described herein. In one example, device 1200 may be used to implement a client device, e.g., any of client devices 115 shown in FIG. 1. Alternatively, device 1200 can implement a server device, e.g., messaging server 101, concept identifier 120, content classifier 130, and query synthesizer 132 of FIG. 1. Device 1200 can be any suitable computer system, server, or other electronic or hardware device as described above.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 1200 includes a processor 1202, a memory 1204, and input/output (I/O) interface 1206. Processor 1202 can be one or more processors and/or processing circuits to execute program code and control basic operations of the device 1200. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1204 is typically provided in device 1200 for access by the processor 1202, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 1202 and/or integrated therewith. Memory 1204 can store software operating on the server device 1200 by the processor 1202, including an operating system 1208, messaging application 1216 and other applications 1214 such as a data display engine, web hosting engine, image display engine, notification engine, social networking engine, etc. Application data 1210 can be stored in memory 1204 and input to and/or output from messaging application 1216 and/or 1214. For example, application data can include data described herein, such as exchanged messages, images, database data, configuration data, user preferences, etc.

In some implementations, the messaging application 1216 can include instructions that enable processor 1202 to perform functions described herein, e.g., some or all of the method of FIG. 2. For example, messaging application 1216 can provide message suggestions as described herein. In some implementations, messaging application 1216 includes one or more modules, such as sticker suggestion module 1216A, response suggestion module 1216B, sticker data module 1216C, and user interaction module 1216D, and/or these modules are implemented in other applications or devices in communication with the device 1200. Other applications 1214 (or engines) can also or alternatively be included, e.g., image editing applications, media display applications, communication applications, web hosting engine or application, etc. One or more methods disclosed herein can operate in several environments and platforms, e.g., as a standalone computer program that can run on any type of computing device, as a web application having web pages, as a mobile application ("app") run on a mobile computing device, etc. One or more of the operating system 1208 and applications 1216 and 1214 can, for example, provide a displayed user interface responsive to user input to display selectable options or controls, and display data based on selected options.

A machine-learning application 1230 is stored in memory 1204 in some implementations. In various implementations, machine-learning application 1230 may utilize Bayesian classifiers, support vector machines, neural networks, or other learning techniques. In some implementations, machine-learning application 1230 may include a trained model 1234, an inference engine 1236, and data 1232. In some implementations, data 1232 may include training data, e.g., data used to generate trained model 1234. For example, training data may include any type of data such as text, images, audio, video, etc. Training data may be obtained from any source, e.g., a data repository specifically marked for training, data for which permission is provided for use as training data for machine-learning, etc. In implementations where one or more users permit use of their respective user data to train a machine-learning model, e.g., trained model 1234, training data may include such user data. In implementations where users permit use of their respective user data, data 1232 may include permitted data such as images (e.g., photos or other user-generated images), communications (e.g., e-mail; chat data such as text messages, voice, video, etc.), documents (e.g., spreadsheets, text documents, presentations, etc.)

In some implementations, data 1232 may include collected data such as map data, image data (e.g., satellite imagery, overhead imagery, etc.), game data, etc. In some implementations, training data may include synthetic data generated for the purpose of training, such as data that is not based on user input or activity in the context that is being trained, e.g., data generated from simulated conversations, computer-generated images, etc. In some implementations, machine-learning application 1230 excludes data 1232. For example, in these implementations, the trained model 1234 may be generated, e.g., on a different device, and be provided as part of machine-learning application 1230. In various implementations, the trained model 1234 may be provided as a data file that includes a model structure or form, and associated weights. Inference engine 1236 may read the data file for trained model 834 and implement a neural network with node connectivity, layers, and weights based on the model structure or form specified in trained model 1234.

Machine-learning application 1230 also includes a trained model 1234. In some implementations, the trained model may include one or more model forms or structures. For example, model forms or structures can include any type of neural-network, such as a linear network, a deep neural network that implements a plurality of layers (e.g., "hidden layers" between an input layer and an output layer, with each layer being a linear network), a convolutional neural network (e.g., a network that splits or partitions input data into multiple parts or tiles, processes each tile separately using one or more neural-network layers, and aggregates the results from the processing of each tile), a sequence-to-sequence neural network (e.g., a network that takes as input sequential data, such as words in a sentence, frames in a video, etc. and produces as output a result sequence), etc.

The model form or structure may specify connectivity between various nodes and organization of nodes into layers. For example, nodes of a first layer (e.g., input layer) may receive data as input data 1232 or application data 1210. Such data can include, for example, one or more pixels per node, e.g., when the trained model is used for image analysis. Subsequent intermediate layers may receive, as input, output of nodes of a previous layer per the connectivity specified in the model form or structure. These layers may also be referred to as hidden layers. A final layer (e.g., output layer) produces an output of the machine-learning application. For example, the output may be a set of labels for an image, a representation of the image that permits comparison of the image to other images (e.g., a feature vector for the image), an output sentence in response to an input sentence, one or more categories for the input data, etc. depending on the specific trained model. In some implementations, model form or structure also specifies a number and/or type of nodes in each layer.

In different implementations, trained model 1234 can include a plurality of nodes, arranged into layers per the model structure or form. In some implementations, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. In some implementations, the computation performed by a node may also include applying a step/activation function to the adjusted weighted sum. In some implementations, the step/activation function may be a nonlinear function. In various implementations, such computation may include operations such as matrix multiplication. In some implementations, computations by the plurality of nodes may be performed in parallel, e.g., using multiple processors cores of a multicore processor, using individual processing units of a GPU, or special-purpose neural circuitry. In some implementations, nodes may include memory, e.g., may be able to store and use one or more earlier inputs in processing a subsequent input. For example, nodes with memory may include long short-term memory (LSTM) nodes. LSTM nodes may use the memory to maintain "state" that permits the node to act like a finite state machine (FSM). Models with such nodes may be useful in processing sequential data, e.g., words in a sentence or a paragraph, frames in a video, speech or other audio, etc.

In some implementations, trained model 1234 may include embeddings or weights for individual nodes. For example, a model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The model may then be trained, e.g., using data 1232, to produce a result.

For example, training may include applying supervised learning techniques. In supervised learning, the training data can include a plurality of inputs (e.g., a set of images) and a corresponding expected output for each input (e.g., one or more labels for each image). Based on a comparison of the output of the model with the expected output, values of the weights are automatically adjusted, e.g., in a manner that increases a probability that the model produces the expected output when provided similar input.

In some implementations, training may include applying unsupervised learning techniques. In unsupervised learning, only input data may be provided and the model may be trained to differentiate data, e.g., to cluster input data into a plurality of groups, where each group includes input data that are similar in some manner. For example, the model may be trained to differentiate images such that the model distinguishes abstract images (e.g., synthetic images, human-drawn images, etc.) from natural images (e.g., photos).

In another example, a model trained using unsupervised learning may cluster words based on the use of the words in input sentences. In some implementations, unsupervised learning may be used to produce knowledge representations, e.g., that may be used by machine-learning application 1230. In various implementations, a trained model includes a set of weights, or embeddings, corresponding to the model structure. In implementations where data 1232 is omitted, machine-learning application 1230 may include trained model 1234 that is based on prior training, e.g., by a developer of the machine-learning application 1230, by a third-party, etc. In some implementations, trained model 1234 may include a set of weights that are fixed, e.g., downloaded from a server that provides the weights.

Machine-learning application 1230 also includes an inference engine 1236. Inference engine 1236 is configured to apply the trained model 1234 to data, such as application data 1210, to provide an inference. In some implementations, inference engine 1236 may include software code to be executed by processor 1202. In some implementations, inference engine 1236 may specify circuit configuration (e.g., for a programmable processor, for a field programmable gate array (FPGA), etc.) enabling processor 1202 to apply the trained model. In various implementations, inference engine 1236 includes software instructions, hardware instructions, or a combination. In some implementations, inference engine 1236 offers an application programming interface (API) that can be used by operating system 1208 and/or other applications 1214 and/or 1216 to invoke inference engine 1236, e.g., to apply trained model 1234 to application data 1210 to generate an inference.

Machine-learning application 1230 may provide several technical advantages. For example, when trained model 1234 is generated based on unsupervised learning, trained model 1234 can be applied by inference engine 1236 to produce knowledge representations (e.g., numeric representations) from input data, e.g., application data 1210. For example, a model trained for image analysis may produce representations of images that have a smaller data size (e.g., 1 KB) than input images (e.g., 10 MB). In some implementations, such representations may be helpful to reduce processing cost (e.g., computational cost, memory usage, etc.) to generate an output (e.g., a label, a classification, a sentence descriptive of the image, etc.). In some implementations, such representations may be provided as input to a different machine-learning application that produces output from the output of inference engine 1236. In some implementations, knowledge representations generated by machine-learning application 1230 may be provided to a different device that conducts further processing, e.g., over a network. In such implementations, providing the knowledge representations rather than the images may provide a technical benefit, e.g., enable faster data transmission with reduced cost. In another example, a model trained for clustering documents may produce document clusters from input documents. The document clusters may be suitable for further processing (e.g., determining whether a document is related to a topic, determining a classification category for the document, etc.) without the need to access the original document, and therefore, save computational cost.

In some implementations, machine-learning application 1230 may be implemented in an offline manner. In these implementations, trained model 1234 may be generated in a first stage, and provided as part of machine-learning application 1230. In some implementations, machine-learning application 1230 may be implemented in an online manner. For example, in such implementations, an application that invokes machine-learning application 1230 (e.g., operating system 1208, one or more of other applications 1214, etc.) may utilize an inference produced by machine-learning application 1230, e.g., provide the inference to a user, and may generate system logs (e.g., if permitted by the user, an action taken by the user based on the inference; or if utilized as input for further processing, a result of the further processing). System logs may be produced periodically, e.g., hourly, monthly, quarterly, etc. and may be used, with user permission, to update trained model 1234, e.g., to update embeddings for trained model 1234.

In some implementations, machine-learning application 1230 may be implemented in a manner that can adapt to particular configuration of device 1200 on which the machine-learning application 1230 is executed. For example, machine-learning application 1230 may determine a computational graph that utilizes available computational resources, e.g., processor 1202. For example, if machine-learning application 1230 is implemented as a distributed application on multiple devices, machine-learning application 1230 may determine computations to be carried out on individual devices in a manner that optimizes computation. In another example, machine-learning application 1230 may determine that processor 1202 includes a GPU with a particular number of GPU cores (e.g., 1,000) and implement the inference engine accordingly (e.g., as 1,000 individual processes or threads).

In some implementations, machine-learning application 1230 may implement an ensemble of trained models. For example, trained model 1234 may include a plurality of trained models that are each applicable to same input data. In these implementations, machine-learning application 1230 may choose a particular trained model, e.g., based on available computational resources, success rate with prior inferences, etc. In some implementations, machine-learning application 1230 may execute inference engine 1236 such that a plurality of trained models is applied. In these implementations, machine-learning application 1230 may combine outputs from applying individual models, e.g., using a voting-technique that scores individual outputs from applying each trained model, or by choosing one or more particular outputs. Further, in these implementations, machine-learning application may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the machine-learning application, e.g., by operating system 1208 or one or more applications 1214 and/or 1216.

In different implementations, machine-learning application 1230 can produce different types of outputs. For example, machine-learning application 1230 can provide representations or clusters (e.g., numeric representations of input data), labels (e.g., for input data that includes images, documents, etc.), phrases or sentences (e.g., descriptive of an image or video, suitable for use as a response to an input sentence, etc.), images (e.g., generated by the machine-learning application in response to input), audio or video (e.g., in response an input video, machine-learning application 1230 may produce an output video with a particular effect applied, e.g., rendered in a comic-book or particular artist's style, when trained model 1234 is trained using training data from the comic book or particular artist, etc. In some implementations, machine-learning application 1230 may produce an output based on a format specified by an invoking application, e.g. operating system 1208 or one or more applications 1214 and/or 1216. In some implementations, an invoking application may be another machine-learning application. For example, such configurations may be used in generative adversarial networks, where an invoking machine-learning application is trained using output from machine-learning application 1230 and vice-versa.

Any of software in memory 1204 can alternatively be stored on any other suitable storage location or computer-readable medium. In addition, memory 1204 (and/or other connected storage device(s)) can store one or more messages, message stickers and sticker information (e.g., metadata), message sticker descriptions and keywords, one or more taxonomies, electronic encyclopedia, dictionaries, thesauruses, message data, grammars, user preferences, and/or other instructions and data used in the features described herein (e.g., such instructions and/or data can be included in application data 1210 in some implementations). Memory 1204 and any other type of storage (magnetic disk, optical disk, magnetic tape, or other tangible media) can be considered "storage" or "storage devices."

I/O interface 1206 can provide functions to enable interfacing the server device 1200 with other systems and devices. Interfaced devices can be included as part of the device 1200 or can be separate and communicate with the device 1200. For example, network communication devices, storage devices (e.g., memory and/or database 106), and input/output devices can communicate via I/O interface 1206. In some implementations, the I/O interface can connect to interface devices such as input devices (keyboard, pointing device, touchscreen, microphone, camera, scanner, sensors, etc.) and/or output devices (display device, speaker devices, printer, motor, etc.).

Some examples of interfaced devices that can connect to I/O interface 1206 can include a display device 1220 that can be used to display content, e.g., images, video, and/or a user interface of an output application as described herein. Display device 1220 can be connected to device 1200 via local connections (e.g., display bus) and/or via networked connections and can be any suitable display device. The display device 1220 can include any suitable display device such as an LCD, LED, or plasma display screen, CRT, television, monitor, touchscreen, 3-D display screen, or other visual display device. For example, display device 1220 can be a flat display screen provided on a mobile device, multiple display screens provided in a goggles device, or a monitor screen for a computer device.

The I/O interface 1206 can interface to other input and output devices. Some examples include one or more cameras which can capture images. Some implementations can provide a microphone for capturing sound (e.g., as a part of captured images, voice commands, etc.), audio speaker devices for outputting sound, or other input and output devices.

For ease of illustration, FIG. 12 shows one block for each of processor 1202, memory 1204, I/O interface 1206, and software blocks 1208, 1214, and 1216. These blocks may represent one or more processors or processing circuitries, operating systems, memories, I/O interfaces, applications, and/or software modules. In other implementations, device 1200 may not have all of the components shown and/or may have other elements including other types of elements instead of, or in addition to, those shown herein. While some components are described as performing blocks and operations as described in some implementations herein, any suitable component or combination of components of environment 100, device 1200, similar systems, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Further implementations are summarized in the following examples.

Example 1: A computer-implemented method to provide message suggestions in a messaging application, the method comprising detecting a first message sent by a first user device to a second user device over a communication network; programmatically analyzing the first message to determine a semantic concept associated with the first message; identifying one or more message stickers based at least in part on the semantic concept; and transmitting instructions to cause the one or more message stickers to be displayed in a user interface displayed on the second user device.

Example 2: The computer-implemented method of example 1, wherein the first message is part of a communication between a first user of the first user device and a second user of the second user device in the messaging application, the method further comprising programmatically analyzing the communication to determine one or more additional semantic concepts associated with the communication, wherein identifying the one or more message stickers is further based on the one or more additional semantic concepts.

Example 3: The computer-implemented method of one of examples 1 and 2, wherein identifying the one or more message stickers comprises determining one or more suggested responses based on the semantic concept; comparing one or more descriptors associated with a plurality of message stickers with the one or more suggested responses; and selecting the one or more message stickers from the plurality of message stickers based on the comparing.

Example 4: The computer-implemented method of example 3, wherein the one or more message stickers include multiple message stickers, and further comprising determining respective ranks of the multiple message stickers based on one or more correspondences between a description of each of the multiple message stickers and the one or more suggested responses, wherein transmitting instructions to cause the multiple message stickers to be displayed includes transmitting instructions indicating the respective ranks of the plurality of message stickers.

Example 5: The computer-implemented method of one of examples 3 and 4, wherein selecting the one or more message stickers from the plurality of message stickers based on the comparing includes checking for correspondence between the one or more descriptors and the one or more suggested responses, wherein the correspondence includes at least one of: letter matches between words of the one or more descriptors and the one or more suggested responses, and semantic similarities between the one or more descriptors and the one or more suggested responses; and determining that the one or more message stickers have the correspondence between the one or more descriptors and the one or more suggested responses.

Example 6: The computer-implemented method of one of examples 1-5, wherein selecting the one or more message stickers from the plurality of message stickers based on the comparing includes determining similarity scores between the one or more descriptors and the one or more suggested responses; and selecting the one or more message stickers based on the similarity scores of the one or more message stickers.

Example 7: The computer-implemented method of one of examples 1-6, wherein at least one message sticker of the one or more message stickers includes image data to be displayed and a sticker identification (ID) effective to identify the at least one message sticker.

Example 8: The computer-implemented method of one of examples 1-7, further comprising receiving a selection via user input of a particular message sticker of the one or more message stickers; and in response to receiving the selection, providing the particular message sticker to the first user device in the messaging application, wherein providing the particular message sticker includes one or more of: sending a sticker ID of the message sticker to the first user device over the communication network; and sending image data of the message sticker to the first user device over the communication network.

Example 9: The computer-implemented method of one of examples 1-8, wherein identifying the one or more message stickers comprises determining that the first message is part of a conversation between the first user device and the second user device in the messaging application, the method further comprising: identifying the one or more message stickers based at least in part on one or more semantic concepts in one or more messages received previously in the conversation.

Example 10: A computer-implemented method to provide message suggestions in a messaging application, the method comprising detecting a first message sent by a first user device to a second user device over a communication network, wherein the first message includes a message sticker; programmatically analyzing the message sticker to determine a semantic concept associated with the first message; determining one or more suggested responses based at least in part on the semantic concept; and transmitting instructions to cause the one or more suggested responses to be displayed by the second user device.

Example 11: The computer-implemented method of example 10, wherein the one or more suggested responses include at least one suggested message sticker response that includes a message sticker.

Example 12: The computer-implemented method of example 11, wherein determining the one or more suggested responses further comprises: comparing one or more descriptors associated with a plurality of message stickers with the one or more suggested responses; and selecting the at least one suggested message sticker response from the plurality of message stickers based on the comparing.

Example 13: The computer-implemented method of one of examples 11-12, further comprising determining that the message sticker is stored on the second user device.

Example 14: The computer-implemented method of one of examples 10-13, wherein the method further comprises receiving a selection of at least one suggested response of the one or more suggested responses based on received user input to the second user device; and in response to receiving the selection, transmitting the at least one suggested response to the first user device over the communication network.

Example 15: The computer-implemented method of one of examples 10-14, wherein the message sticker is associated with image data and a sticker identification (ID).

Example 16: A system to provide message suggestions in a messaging application comprising: a memory; and at least one processor configured to access the memory and configured to perform operations comprising: receiving, at a second user device, a first message sent by a first user device over a communication network; obtaining a suggested response associated with the first message, wherein the suggested response is based on a semantic concept determined by programmatically analyzing the first message; identifying one or more message stickers based at least in part on the suggested response, wherein the one or more message stickers are stored on the second user device; and causing the one or more message stickers to be displayed in a user interface displayed on the second user device.

Example 17: The system of example 16, wherein the operation to obtain the suggested response comprises receiving the suggested response from a server device, wherein the server device programmatically analyzes the first message to determine the semantic concept and determines the suggested response based on a mapping of the semantic concept to a library of stored suggested responses.

Example 18: The system of one of examples 16-17, wherein the at least one processor is further configured to perform operations comprising: obtaining a plurality of semantic concepts associated with a plurality of message stickers stored on the second user device; and comparing the plurality of semantic concepts with the suggested response, wherein identifying the one or more message stickers based at least in part on the suggested response includes selecting the one or more message stickers from the plurality of semantic concepts based on the comparing.

Example 19: The system of one of examples 16-18, wherein the at least one processor further performs operations comprising receiving a selection of at least one suggested response of the one or more suggested responses based on received user input to the second user device; and in response to receiving the selection, transmitting the at least one suggested response to the first user device over the communication network.

Example 20: The system of one of examples 16-19, wherein at least one message sticker of the one or more message stickers includes image data to be displayed and a sticker identification (ID) to identify the at least one message sticker.

Although the description has been described with respect to particular implementations thereof, these particular implementations are merely illustrative, and not restrictive. Concepts illustrated in the examples may be applied to other examples and implementations.

In situations in which certain implementations discussed herein may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method to provide message suggestions in a messaging application, the method comprising:
   detecting a first message sent from a first user device to a second user device over a communication network;
   programmatically analyzing the first message to determine a semantic concept associated with the first message;
   determining multiple suggested text responses to the first message based on the semantic concept;
   comparing each of the multiple suggested text responses to respective descriptors associated with a plurality of message stickers;
   selecting at least one descriptor of the respective descriptors that matches at least a portion of at least one suggested text response of the multiple suggested text responses; and
   transmitting instructions to cause the at least one selected descriptor to be displayed in a user interface on the second user device as a suggested response to the first message.

2. The computer-implemented method of claim 1, wherein the at least one selected descriptor is a word included in the at least one suggested text response.

3. The computer-implemented method of claim 1, wherein the at least one suggested text response includes at least two words, and wherein the at least one selected descriptor includes a first selected descriptor that matches a first word of the at least two words and a second selected descriptor that matches a second word of the at least two words.

4. The computer-implemented method of claim 1, wherein the plurality of message stickers are in a predefined set of available message stickers stored locally on the second user device.

5. The computer-implemented method of claim 1, further comprising transmitting instructions to cause one or more message stickers that have the at least one descriptor to be displayed as one or more additional suggested responses in the user interface displayed on the second user device.

6. The computer-implemented method of claim 1, wherein determining the multiple suggested text responses includes receiving the multiple suggested text responses from a server device, wherein the server device determines the multiple suggested text responses based on a mapping of the semantic concept to a library of suggested text responses stored on the server device.

7. The computer-implemented method of claim 1, wherein the first message includes a received message sticker, wherein programmatically analyzing the first message to determine the semantic concept associated with the first message includes using sticker identification information received with the received message sticker to retrieve an associated descriptor that is associated with the received message sticker from sticker data storage, and wherein the associated descriptor is included in the semantic concept.

8. The computer-implemented method of claim 1, further comprising:
   receiving selection of the suggested response based on user input to the second user device; and
   in response to receiving the selection, transmitting the selected suggested response to the first user device over the communication network via the messaging application.

9. The computer-implemented method of claim 1, wherein comparing each of the multiple suggested text responses to the respective descriptors includes at least one of:
checking for letter matches between words of the respective descriptors and the multiple suggested text responses; or
checking for semantic similarity between the respective descriptors and the multiple suggested text responses.

10. The computer-implemented method of claim 1, wherein the plurality of message stickers includes at least one of images, animated images, or videos.

11. A system to provide message suggestions in a messaging application comprising:
at least one processor; and
memory coupled to the at least one processor and storing instructions that, when executed by the at least one processor, cause the at least one processor to perform operations comprising:
detecting a first message sent from a first user device to a second user device over a communication network;
programmatically analyzing the first message to determine a semantic concept associated with the first message;
determining multiple suggested text responses to the first message based on the semantic concept;
comparing each of the multiple suggested text responses to respective descriptors associated with a plurality of message stickers;
selecting at least one descriptor of the respective descriptors that matches at least a portion of at least one suggested text response of the multiple suggested text responses; and
transmitting instructions to cause the at least one selected descriptor to be displayed in a user interface on the second user device as a suggested response to the first message.

12. The system of claim 11, wherein the at least one selected descriptor is a word included in the at least one suggested text response.

13. The system of claim 11, wherein the at least one suggested text response includes at least two words, and wherein the at least one selected descriptor includes a first selected descriptor that matches a first word of the at least two words and a second selected descriptor that matches a second word of the at least two words.

14. The system of claim 11, wherein the plurality of message stickers are in a predefined set of available message stickers stored locally on the second user device.

15. The system of claim 11, wherein the operation of determining the multiple suggested text responses includes receiving the multiple suggested text responses from a server device, wherein the server device determines the multiple suggested text responses based on a mapping of the semantic concept to a library of suggested text responses stored on the server device.

16. The system of claim 11, wherein the first message includes a received message sticker, wherein the operation of programmatically analyzing the first message to determine the semantic concept associated with the first message includes using sticker identification information received with the received message sticker to retrieve an associated descriptor that is associated with the received message sticker from sticker data storage, and wherein the associated descriptor is included in the semantic concept.

17. The system of claim 11, wherein the at least one processor performs further operations of:
receiving selection of the suggested response based on user input to the second user device; and
in response to receiving the selection, transmitting the selected suggested response to the first user device over the communication network via the messaging application.

18. The system of claim 11, wherein the operation of comparing each of the multiple suggested text responses to the respective descriptors includes at least one of:
checking for letter matches between words of the respective descriptors and the multiple suggested text responses; or
checking for semantic similarity between the respective descriptors and the multiple suggested text responses.

19. The system of claim 11, wherein the plurality of message stickers includes at least one of images, animated images, or videos.

20. A non-transitory computer usable medium including computer program instructions that, when executed on a computer, cause the computer to perform operations comprising:
detecting a first message sent from a first user device to a second user device over a communication network;
programmatically analyzing the first message to determine a semantic concept associated with the first message;
determining multiple suggested text responses to the first message based on the semantic concept;
comparing each of the multiple suggested text responses to respective descriptors associated with a plurality of message stickers;
selecting at least one descriptor of the respective descriptors that matches at least a portion of at least one suggested text response of the multiple suggested text responses; and
transmitting instructions to cause the at least one selected descriptor to be displayed in a user interface on the second user device as a suggested response to the first message.

* * * * *